(12) United States Patent
Taguchi et al.

(10) Patent No.: US 7,083,668 B2
(45) Date of Patent: *Aug. 1, 2006

(54) INK SET, INK CARTRIDGE, INK JET PRINTER AND RECORDING METHOD

(75) Inventors: Toshiki Taguchi, Shizuoka (JP); Yoshiharu Yabuki, Kanagawa (JP); Toru Harada, Kanagawa (JP); Naotaka Wachi, Shizuoka (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 185 days.

This patent is subject to a terminal disclaimer.

(21) Appl. No.: 10/645,795

(22) Filed: Aug. 22, 2003

(65) Prior Publication Data

US 2004/0050291 A1    Mar. 18, 2004

(30) Foreign Application Priority Data

Aug. 22, 2002   (JP) .................. P.2002-242238

(51) Int. Cl.
C09D 11/02    (2006.01)

(52) U.S. Cl. .................. 106/31.46; 106/31.48; 106/31.49; 106/31.5

(58) Field of Classification Search ........ 106/31.27, 106/31.46, 31.48, 31.49, 31.5; 347/100
See application file for complete search history.

(56) References Cited

U.S. PATENT DOCUMENTS

| | | | |
|---|---|---|---|
| 5,482,546 A | 1/1996 | Eida | |
| 2001/0029869 A1* | 10/2001 | Fujiwara | 106/31.49 |
| 2003/0213405 A1* | 11/2003 | Harada et al. | 106/31.47 |
| 2003/0217671 A1* | 11/2003 | Ozawa | 106/31.49 |
| 2003/0232902 A1* | 12/2003 | Takahashi et al. | 523/160 |
| 2004/0020408 A1* | 2/2004 | Yabuki | 106/31.27 |
| 2004/0024085 A1* | 2/2004 | Ishizuka et al. | 523/160 |
| 2004/0053988 A1* | 3/2004 | Taguchi et al. | 514/419 |
| 2004/0066438 A1* | 4/2004 | Taguchi et al. | 347/100 |
| 2004/0089200 A1* | 5/2004 | Fujiwara et al. | 106/31.48 |

FOREIGN PATENT DOCUMENTS

| | | |
|---|---|---|
| GB | 2 346 618 A | 8/2000 |
| JP | 2002-249677 A | 9/2002 |
| JP | 2002-256167 A | 9/2002 |
| JP | 2002-275386 A | 9/2002 |
| JP | 2002-285050 A | 10/2002 |
| JP | 2002-294097 A | 10/2002 |
| JP | 2002-302623 A | 10/2002 |
| JP | 2002-309115 A | 10/2002 |
| JP | 2002-309116 A | 10/2002 |
| JP | 2002-309118 A | 10/2002 |
| JP | 2002-322151 A | 11/2002 |
| JP | 2002-327132 A | 11/2002 |
| JP | 2002-371079 A | 12/2002 |
| JP | 2002-371214 A | 12/2002 |
| JP | 2003-3086 A | 1/2003 |
| JP | 2003-3099 A | 1/2003 |
| JP | 2003-3109 A | 1/2003 |
| JP | 2003-12952 A | 1/2003 |
| JP | 2003-12956 A | 1/2003 |
| JP | 2003-49100 A | 2/2003 |
| JP | 2003-64275 A | 3/2003 |
| JP | 2003-64287 A | 3/2003 |
| JP | 2003-119415 A | 4/2003 |

OTHER PUBLICATIONS

European Search Report dated Jan. 9, 2004.

* cited by examiner

*Primary Examiner*—Helene Klemanski
(74) *Attorney, Agent, or Firm*—Sughrue Mion, PLLC

(57) ABSTRACT

The ink set of the present invention provides a high ejection stability, gives an image having an excellent hue, light-resistance and waterproofness and improves the image preservability under severe conditions in ink jet recording, in which the ink set comprising a plurality of inks different in hues, wherein the plurality of inks includes a yellow ink containing a coloring agent that is a dye having: a $\lambda$max of from 390 nm to 470 nm; an $I(\lambda max+70\ nm)/I(\lambda max)$ ratio of not greater than 0.4, in which $I(\lambda max)$ is the absorbance at $\lambda$max and $I(\lambda max+70\ nm)$ is the absorbance at $(\lambda max+70\ nm)$; and a forced fading rate constant of not greater than $5.0 \times 10^{-2}$ [hour$^{-1}$], an ink cartridge having the ink set received therein, an ink jet printer comprising the ink cartridge mounted therein and an image recording method.

11 Claims, No Drawings

INK SET, INK CARTRIDGE, INK JET PRINTER AND RECORDING METHOD

FIELD OF THE INVENTION

The present invention relates to an ink set for ink jet recording which gives an image having a high quality and exhibits an excellent preservability and ejection stability, a cartridge comprising same and an image recording method using same.

BACKGROUND OF THE INVENTION

In recent years, with the spread of computers, ink jet printers have been widely used to print on paper, film, cloth, etc. at offices as well as at home.

Examples of ink jet recording method include a method which allows a piezoelectric element to give pressure that causes a droplet to be ejected, a method which comprises heating the ink to generate bubbles, causing a droplet to be ejected, a method involving the use of ultrasonic wave, and a method which uses electrostatic force to suck and discharge a droplet. As inks for these ink jet recording methods there are used aqueous inks, oil-based inks and solid (melt type) inks. Among these inks, aqueous inks are mainly used from the standpoint of producibility, handleability, odor, safety, etc.

The dyes to be incorporated in these inks for ink jet recording are required to exhibit a high solubility in solvents, allow a high density recording and have a good hue and an excellent fastness to light, heat, air, water and chemical, a good fixability to image-receiving materials, difficulty in running, an excellent preservability, no toxicity and a high purity and be available at a low cost. However, it is extremely difficult to seek coloring agents meeting these requirements to a high extent. In particular, dyes having a good magenta hue and an excellent light fastness have been keenly desired.

Various dyes and pigments have been already proposed for ink jet recording and have been actually used. However, no coloring agents meeting all these requirements have been found yet. Known dyes and pigments provided with color index (C.I.) can difficultly satisfy both the hue and fastness requirements for inks for ink jet recording. As dyes capable of enhancing fastness there have been proposed azo dyes derived from aromatic amines and 5-membered heterocyclic amines in JP-A-55-161856. However, these dyes are disadvantageous in that they have an undesirable hue in yellow and cyan ranges, causing deterioration of color reproducibility. JP-A-61-36362 and JP-A-2-212566 disclose inks for ink jet recording intended to meet both the requirements for hue and light-fastness. However, the dyestuffs used in the above cited patents exhibit an insufficient water solubility when used as water-soluble inks. These dyestuffs are also disadvantageous in that when used as water-soluble inks for ink jet recording, they also cause problems of wet heat fastness. As means for solution to these problems there have been proposed compounds and ink compositions in JP-T-11-504958. Further, inks for ink jet recording which comprise pyrazoloaniline azo incorporated therein to improve hue or light-fastness are disclosed in Japanese Patent Application No. 2000-80733. However, these inks for ink jet recording have been found disadvantageous in that they can cause image deterioration under severe conditions such as prolonged storage at high temperatures or in the presence of gas such as nitrogen oxide and ozone. In order to eliminate these difficulties, the kind of dyes to be used have been studied. For secondary colors such as blue or gray, however, the effect of enhancing fastness cannot be sufficiently observed due to ill-balanced hues merely by changing one dye. Further, the mixing of two dyes causes interaction that can further deteriorate fastness. It has thus been desired to provide an ink set, cartridge and printer capable of remarkably enhancing fastness to give a high fastness image.

SUMMARY OF THE INVENTION

It is therefore an aim of the invention to provide an ink excellent in handleability, odor, safety, etc. which exhibits a high ejection stability and gives an image having an excellent hue, light-resistance and waterproofness free of defectives of image quality such as running of fine line and having an improved preservability under severe conditions. It is another aim of the invention to provide an ink set, cartridge and image recording method which exhibit a high ejection stability over an extended period of time even after aged under severe conditions.

The inventors made studies. As a result, it was found that the use of a specific yellow ink as an ink for ink jet recording makes it possible to obtain a high fastness printed matter without any image deterioration even under severe conditions such as prolonged storage at high temperatures or in the presence of gas or the like. The image deterioration under severe conditions and/or in the presence of gas occur remarkably with an image-receiving paper comprising a white inorganic pigment incorporated in an image-receiving layer. It is presumed that this image deterioration is attributed to the reaction with the white inorganic pigment itself or the effect of the gas component adsorbed to the white inorganic pigment besides the heat deterioration reaction.

In other words, the invention concerns an ink cartridge having a specific yellow ink received therein integrally or independently at least partly, wherein a magenta ink and a cyan ink are used in combination. The invention further concerns an ink jet printer and an image recording method using the ink set or ink cartridge.

In other words, the invention concerns the following ink set, ink cartridge, ink jet printer and image recording method.

1. An ink set comprising a plurality of inks different in hues, wherein the plurality of inks includes a yellow ink containing a coloring agent that is a dye having:

a $\lambda$max of from 390 nm to 470 nm;

an I($\lambda$max+70 nm)/I($\lambda$max) ratio of not greater than 0.4, in which I($\lambda$max) is the absorbance at $\lambda$max and I($\lambda$max+70 nm) is the absorbance at ($\lambda$max+70 nm); and a forced fading rate constant of not greater than $5.0 \times 10^{-2}$ [hour$^{-1}$], in which the forced fading rate constant is decided by dissolving and/or dispersing the dye in an aqueous medium to form an ink composition for ink jet recording, printing the ink composition on a reflection type medium, thereafter measuring a reflection density through a Status A filter, specifying one point having a reflection density (DB) in an yellow region of 0.90 to 1.10 as an initial density of the ink, forcedly fading the printed matter by use of an ozone fading tester that can regularly generate 5 ppm of ozone, and determining the time taken until the reflection density reaches 80% of the initial density.

2. The ink set as described in the item 1, wherein the dye has the $\lambda$max of from 390 nm to 470 nm and the I ($\lambda$max+70 nm)/I($\lambda$max) ratio of not greater than 0.2.

3. The ink set as described in the item 1, wherein the dye has an oxidation potential of higher than 1.0 V (vs SCE).

4. An ink set comprising a plurality of inks different in hues, wherein the plurality of inks includes a yellow ink containing a coloring agent that is a dye represented by the following general formula (1), the dye having a $\lambda$max of from 390 nm to 470 nm:

$$A\text{—}N\text{=}N\text{—}B \quad (1)$$

wherein A and B each independently represent a heterocyclic group which may be substituted.

5. The ink set described in the item 1 or 4, which further comprises at least a coloring agent represented by the following general formula (M-I) as the magenta ink:

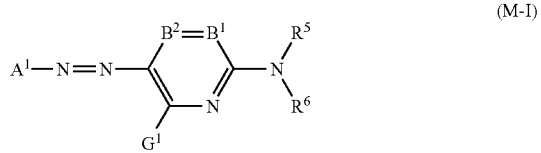

wherein $A^1$ represents a residue of a 5-membered heterocyclic diazo component $A^1$—$NH_2$; $B^1$ and $B^2$ each represent a nitrogen atom, —$CR^1$= or —$CR^2$=, and when one of $B^1$ and $B^2$ represents a nitrogen atom, the other represents —$CR^1$= or —$CR^2$=; $R^5$ and $R^6$ each independently represents a hydrogen atom, an aliphatic group, an aromatic group, a heterocyclic group, an acyl group, an alkoxycarbonyl group, an aryloxycarbonyl group, a carbamoyl group, an alkyl- or arylsulfonyl group or a sulfamoyl group, which may further have a substituent group; $G^1$, $R^1$ and $R^2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxyl group, an aryloxy group, a heterocyclic oxy group, a silyloxy group, an acyloxy group, a carbamoyloxy group, an alkoxycarbonyloxy group, an aryloxycarbonyloxy group, an amino group (containing a heterocyclic amino group and an anilino group), an acylamino group, a ureido group, a sulfamoylamino group, an alkoxycarbonylamino group, an aryloxycarbonylamino group, an alkyl- or arylsulfonylamino group, a heterocyclic sulfonylamino group, a nitro group, an alkyl- or arylthio group, an alkyl- or arylsulfonyl group, a heterocyclic sulfonyl group, an alkyl- or arylsulfinyl group, a heterocyclic sulfinyl group, a sulfamoyl group, a sulfo group or a heterocyclic thio group, which may be further substituted; and $R^1$ and $R^5$, or $R^5$ and $R^6$ may combine with each other to form a 5- or 6-membered ring.

6. The ink set described in the item 1 or 4, which further comprises a coloring agent represented by the following general formula (C-I) as the cyan ink:

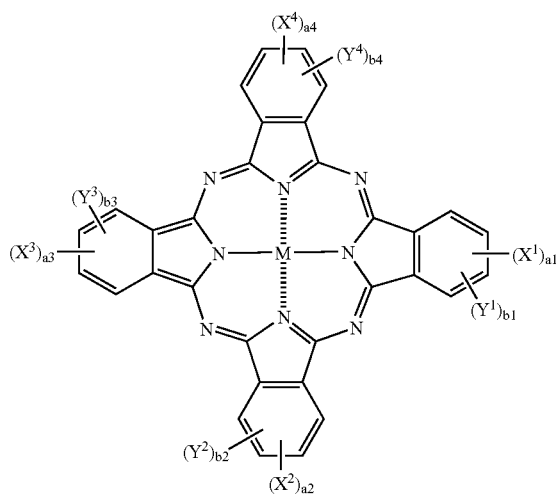

wherein $X^1$, $X^2$, $X^3$ and $X^4$ each independently represent —SO—$Z^1$, —$SO_2Z^1$, —$SO_2NR^{21}R^{22}$, —$CONR^{21}R^{22}$ or —$CO_2R^{21}$ in which $Z^1$ represents a substituted or unsubstituted alkyl, cycloalkyl, alkenyl, aralkyl, aryl or heterocyclic group; and $R^{21}$ and $R^{22}$ each independently represent a hydrogen atom or a substituted or unsubstituted alkyl, cycloalkyl, alkenyl, aralkyl, aryl or heterocyclic group; $Y^1$, $Y^2$, $Y^3$ and $Y^4$ each independently represent a monovalent substituent; a1 to a4 and b1 to b4 each independently represent an integer of from 0 to 4 indicating the number of substituents $X^1$ to $X^4$ and $Y^1$ to $Y^4$, with the proviso that a1 to a4 are not 0 at the same time and when a1 to a4 and b1 to b4 each represent an integer of not smaller than 2, the plurality of $X^1$'s to $X^4$'s and $Y^1$'s to $Y^4$'s may be the same or different; and M represents a hydrogen atom or a metal atom, or oxide, hydroxide or halide thereof.

7. The ink set as described in the item 5, wherein the magenta ink includes a set of two or more inks different in ink concentration, and the ink concentration of one magenta ink is 0.05 to 0.5 time that of the other magenta ink.

8. The ink set as described in the item 6, wherein the cyan ink includes a set of two or more inks different in ink concentration, and the ink concentration of one cyan ink is 0.05 to 0.5 time that of the other magenta ink.

9. A color ink cartridge comprising at least a yellow ink, wherein the yellow ink includes the coloring agent described in the item 1 or 4.

10. The ink cartridge described in the item 9, which further comprises: a coloring agent represented by the following general formula (M-I) as the magenta ink; and a coloring agent represented by the following general formula (C-I) as the cyan ink:

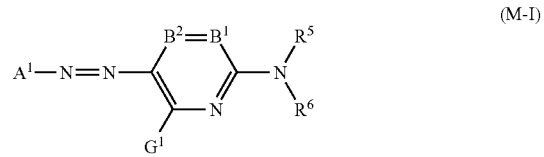

wherein $A^1$ represents a residue of a 5-membered heterocyclic diazo component $A^1$—$NH_2$; $B^1$ and $B^2$ each represent a nitrogen atom, —$CR^1$= or —$CR^2$=, and when one of $B^1$ and $B^2$ represents a nitrogen atom, the other represents —$CR^1$= or —$CR^2$=; $R^5$ and $R^6$ each independently represents a hydrogen atom, an aliphatic group, an aromatic group, a heterocyclic group, an acyl group, an alkoxycarbonyl group, an aryloxycarbonyl group, a carbamoyl group, an alkyl- or arylsulfonyl group or a sulfamoyl group, which may further have a substituent group; $G^1$, $R^1$ and $R^2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxyl group, an aryloxy group, a heterocyclic oxy group, a silyloxy group, an acyloxy group, a carbamoyloxy group, an alkoxycarbonyloxy group, an aryloxycarbonyloxy group, an amino group (containing a heterocyclic amino group and an anilino group), an acylamino group, a ureido group, a sulfamoylamino group, an alkoxycarbonylamino group, an aryloxycarbonylamino group, an alkyl- or arylsulfonylamino group, a heterocyclic sulfonylamino group, a nitro group, an alkyl- or arylthio group, an alkyl- or arylsulfonyl group, a heterocyclic sulfonyl group, an alkyl- or arylsulfinyl group, a heterocyclic sulfinyl group, a sulfamoyl group, a sulfo group or a heterocyclic thio group, which may be further substituted; and $R^1$ and $R^5$, or $R^5$ and $R^6$ may combine with each other to form a 5- or 6-membered ring,

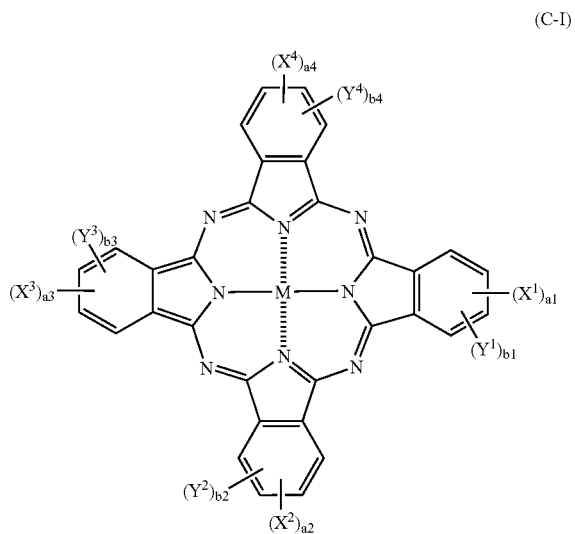

(C-I)

wherein $X^1$, $X^2$, $X^3$ and $X^4$ each independently represent —SO—$Z^1$, —$SO_2Z^1$, —$SO_2NR^{21}R^{22}$, —$CONR^{21}R^{22}$ or —$CO_2R^{21}$ in which $Z^1$ represents a substituted or unsubstituted alkyl, cycloalkyl, alkenyl, aralkyl, aryl or heterocyclic group; and $R^{21}$ and $R^{22}$ each independently represent a hydrogen atom or a substituted or unsubstituted alkyl, cycloalkyl, alkenyl, aralkyl, aryl or heterocyclic group; $Y^1$, $Y^2$, $Y^3$ and $Y^4$ each independently represent a monovalent substituent; a1 to a4 and b1 to b4 each independently represent an integer of from 0 to 4 indicating the number of substituents $X^1$ to $X^4$ and $Y^1$ to $Y^4$, with the proviso that a1 to a4 are not 0 at the same time and when a1 to a4 and b1 to b4 each represent an integer of not smaller than 2, the plurality of $X^1$'s to $X^4$'s and $Y^1$'s to $Y^4$'s may be the same or different; and M represents a hydrogen atom or a metal atom, or oxide, hydroxide or halide thereof.

11. An ink jet printer using the ink set as described in the item 1 or 4.

12. An image recording method which comprises using the ink set described in the item 1 or 4 to conduct color printing.

DETAILED DESCRIPTION OF THE INVENTION

The invention will be further described hereinafter.

<Yellow Ink>

From the standpoint of fastness, particularly to ozone gas, the yellow dye which is a coloring agent of the invention has a forced fading rate constant (k) of not greater than $5.0 \times 10^{-2}$ [hour$^{-}$], preferably not greater than $3.0 \times 10^{-2}$ [hour–1], more preferably not greater than $1.0 \times 10^{-2}$ [hour–1] as determined by the equation $0.8 = e^{-kt}$ from the time required until the reflection density of a printed matter obtained by printing an ink for ink jet recording comprising the dye dissolved and/or dispersed in an aqueous medium on a reflective medium reaches 80% of the initial density when the printed matter is forcedly faded using an ozone fading tester capable of always generating 5 ppm ozone wherein the initial density of the ink is defined by one of the values of reflection density ($D_B$) ranging from 0.90 to 1.10 in the yellow range as measured with a status A filter (e.g., Type X-rite 310 TR densitometer).

The yellow dye preferably exhibits an oxidation potential of higher than 1.0 V (vs SCE), more preferably higher than 1.1 V (vs SCE), particularly higher than 1.2 V (vs SCE). It is particularly preferred that the kind of the yellow dye be an azo dye satisfying the aforementioned requirements for physical properties.

The oxidation potential (Eox) can be easily measured by those skilled in the art. For the details of the method for measuring the oxidation potential, reference can be made to P. Delahay, "New Instrumental Methods in Electrochemistry", 1954, Interscience Publishers, A. J. Bard et al, "Electrochemical Methods", 1980, John Wiley & Sons, and Akiya Fujishima, "Denki Kagaku Sokuteiho (Electrochemical Measuring Methods)", 1984, Gihodo Shuppansha.

In some detail, the measurement of oxidation potential is carried out by dissolving the test specimen in a solvent such as dimethylformamide and acetonitrile containing a supporting electrolyte such as sodium perchlorate and tetrapropylammonium perchlorate in a concentration of from $1 \times 10^{-4}$ to $1 \times 10^{-6}$ mol/l, and then measuring the test solution for oxidation potential with respect to SCE (saturated calomel electrode) using cyclic voltammetry or DC polarography. This value may deviate by scores of millivolts due to the effect of difference in potential between solutions or resistivity of test solution. However, the incorporation of a standard specimen (e.g., hydroquinone) makes it possible to assure the reproducibility of potential.

In order to unequivocally define potential, the potential (vs SCE) measured in dimethylformamide containing 0.1 mol dm$^{-3}$ of tetrapropylammonium perchlorate as a supporting electrolyte (concentration of dye: 0.001 mol dm$^{-3}$) using DC polarography is defined as oxidation potential of dye.

The value of Eox indicates the transferability of electrons from the specimen to the electrode. The greater this value is (the higher the oxidation potential is), the more difficultly can be transferred electrons from the specimen to the electrode, i.e., the more difficultly can be oxidized the specimen. With regard to the structure of the compound, the incorporation of electron-withdrawing group causes the oxidation potential to be higher while the incorporation of electron-donative group causes the oxidation potential to be lower. In the invention, in order to deteriorate the reactivity with ozone, which is an electron-withdrawing agent, it is preferred that an electron-withdrawing group be incorporated in the yellow dye skeleton to cause the oxidation potential to be higher.

The dye to be used in the invention preferably exhibits a good fastness as well as a good hue. It is particularly preferred that the absorption spectrum of the dye to be used in the invention have a short skirt to longer wavelengths. Accordingly, a yellow dye having λmax of from 390 nm to 470 nm and an I(λmax+70 nm)/I(λmax) ratio of not greater than 0.2, preferably not greater than 0.1 in which I(λmax) is the absorbance at λmax and I(λmax+70 nm) is the absorbance at λmax+70 nm (hereinafter referred to as "ratio I") is preferred. The lower limit of the ratio I is about 0.01. The values of λmax, etc. are determined with an aqueous solution.

The dye satisfying these requirements for oxidation potential and absorption characteristics is preferably one represented by the following general formula (1).

However, the compound represented by the general formula (1) only needs to have λmax of from 390 nm to 470 nm and doesn't necessarily need to satisfy the above defined oxidation potential and I(λmax+70 nm)/I(λmax) ratio. The yellow dye defined in The item 1 and the yellow dye represented by the general formula (1) defined in The item 4 are generally termed herein as "yellow dye of the invention".

$$A-N=N-B \quad (1)$$

wherein A and B each independently represent a heterocyclic group which may be substituted.

The aforementioned heterocyclic group is preferably one formed by a 5- or 6-membered ring and may have a monocyclic structure or a polycyclic structure having two or more rings condensed thereto. The aforementioned heterocyclic group may be an aromatic heterocyclic group or non-aromatic heterocyclic group. Preferred examples of the hetero atoms constituting the aforementioned heterocyclic group include N, O and S atoms.

Preferred examples of the heterocyclic group represented by A in the general formula (1) include 5-pyrazolone, pyrazole, triazole, oxazolone, isooxazolone, barbituric acid, pyridone, pyridine, rhodanine, pyrazolinedione, pyrazolopyridone, Meldrum's acid, and condensed heterocyclic group having an aromatic hydrocarbon ring or heterocyclic group condensed to these heterocyclic groups. Preferred among these heterocyclic groups are 5-pyrazolone, 5-aminopyrazole, pyridone, 2,6-diaminopyridine, and pyrazoloazoles. Particularly preferred among these heterocyclic groups are 5-aminopyrazole, 2-hydroxy-6-pyridone, 2,6-diaminopyridine, and pyrazoloazoles.

Examples of the heterocyclic group represented by B include pyridine, pyrazine, pyrimidine, pyridazine, triazine, quinoline, isoquinoline, quinazoline, cinnoline, phthaladine, quinoxaline, pyrrole, indole, furane, benzofurane, thiophene, benzothiophene, pyrazole, imidazole, benzoimidazole, triazole, oxazole, isoxazole, benzoxazole, thiazole, benzothiazole, benzothiazole, isothiazole, benzoisothiazole, thiadiazole, benzoisoxazole, pyrrolidine, piperidine, piperazine, imidazolidine, and thiazoline. Preferred among these heterocyclic groups are pyridine, quinoline, thiophene, pyrazole, imidazole, benzoimidazole, triazole, oxazole, isoxazole, benzoxazole, thiazole, benzothiazole, isothiazole, benzoisothiazole, thiadiazole, and benzoisoxazole. More desirable among these heterocyclic groups are quinoline, thiophene, pyrazole, benzoxazole, benzoisoxazole, isothiazole, imidazole, benzothiazole, and thiadiazole. Particularly preferred among these heterocyclic groups are pyrazole, benzoxazole, benzoxazole, imidazole, 1,2,4-thiadiazole, and 1,3,4-thiadiazole.

Examples of the substituents on A and B include halogen atoms, alkyl groups, cycloalkyl groups, aralkyl groups, alkenyl groups, alkinyl groups, aryl groups, heterocyclic groups, cyano groups, hydroxyl groups, nitro groups, alkoxy groups, aryloxy groups, silyloxy groups, heterocyclic oxy groups, acyloxy groups, carbamoyloxy groups, alkoxycarbonyloxy groups, aryloxycarbonyloxy groups, amino groups, acylamino groups, aminocarbonylamino groups, alkoxycarbonylamino groups, aryloxycarbonylamino groups, sulfamoylamino groups, alkylsulfonylamino groups, arylsulfonylamino groups, mercapto groups, alkylthio groups, arylthio groups, heterocyclic thio groups, sulfamoyl groups, alkylsulfinyl groups, arylsulfinyl groups, alkylsulfonyl groups, arylsulfonyl groups, acyl groups, aryloxycarbonyl groups, alkoxycarbonyl groups, carbamoyl groups, imide groups, phosphino groups, phosphinyl groups, phosphinyloxy groups, phosphinylamino groups, silyl groups, and ionic hydrophilic groups.

The dye of the general formula (1), if used as a water-soluble dye, preferably has at least one ionic hydrophilic group incorporated therein per molecule. Examples of the ionic hydrophilic group include sulfo groups, carboxyl groups, phosphono groups, and quaternary ammonium groups. Preferred among these ionic hydrophilic groups are carboxyl groups, phosphono groups, and sulfo groups. Particularly preferred among these ionic hydrophilic groups are carboxyl groups and sulfo groups. The carboxyl groups, phosphono groups and sulfo groups may be in the form of salt. Examples of the counter ion forming the salt include ammonium ion, alkaline metal ion (e.g., lithium ion, sodium ion, potassium ion), and organic cation (e.g., tetramethylammonium ion, tetramethylguanidium ion, tetramethylphosphonium ion). Preferred among these counter ions are alkaline metal salts.

Preferred among these dyes represented by the general formula (1) are those of the following general formulae (2), (3) and (4).

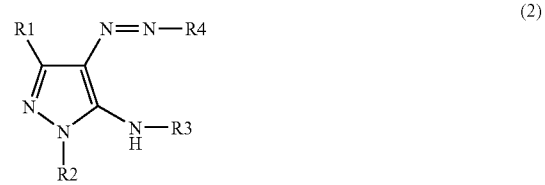

wherein R1 and R3 each represent a hydrogen atom, cyano group, alkyl group, cycloalkyl group, aralkyl group, alkoxy group, alkylthio group, arylthio group, aryl group or ionic hydrophilic group; R2 represents a hydrogen atom, alkyl group, cycloalkyl group, aralkyl group, carbamoyl group, acyl group, aryl group or heterocyclic group; and R4 represents a heterocyclic group.

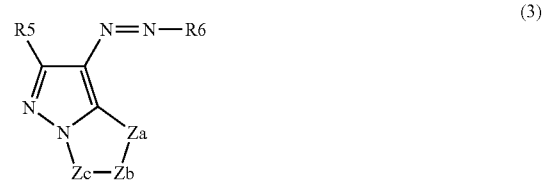

wherein R5 represents a hydrogen atom, cyano group, alkyl group, cycloalkyl group, aralkyl group, alkoxy group, alkylthio group, arylthio group, aryl group or ionic hydrophilic group; Za represents —N═, —NH— or —C(R11)═; Zb and Zc each independently represent —N═ or —C(R11) in which R11 represents a hydrogen atom or non-metallic substituent; and R6 represents a heterocyclic group.

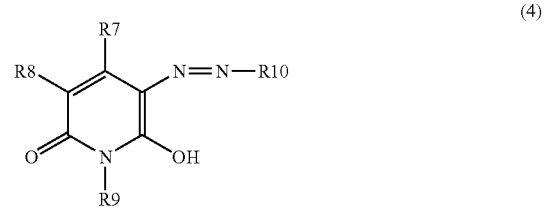

wherein R7 and R9 each independently represent a hydrogen atom, cyano group, alkyl group, cycloalkyl group, aralkyl group, aryl group, alkylthio group, arylthio group, alkoxycarbonyl group, carbamoyl group or ionic hydrophilic group; R8 represents a hydrogen atom, halogen atom, alkyl group, alkoxy group, aryl group, aryloxy group, cyano group, acylamino group, sulfonylamino group, alkoxycarbonylamino group, ureide group, alkylthio group, arylthio group, alkoxycarbonyl group, carbamoyl group, sulfamoyl group, alkylsulfonyl group, arylsulfonyl group, acyl group, amino group, hydroxy group or ionic hydrophilic group; and R10 represents a heterocyclic group.

In the general formulae (2), (3) and (4), the alkyl groups represented by R1, R2, R3, R5, R7, R8 and R9 contain a substituted or unsubstituted alkyl group. These alkyl groups each preferably have from 1 to 20 carbon atoms. Examples of the aforementioned substituents include hydroxyl groups, alkoxy groups, cyano groups, halogen atoms, and ionic hydrophilic groups. Examples of the alkyl groups include methyl, ethyl, butyl, isopropyl, t-butyl, hydroxyethyl, methoxyethyl, cyanoethyl, trifluoromethyl, 3-sulfopropyl, and 4-sulfobutyl.

The cycloalkyl groups represented by R1, R2, R3, R5, R7, R8 and R9 include a substituted or unsubstituted cycloalkyl group. These cycloalkyl groups each preferably have from 5 to 12 carbon atoms. Examples of the substituents on the cycloalkyl group include ionic hydrophilic groups. Examples of the cycloalkyl group include cyclohexyl groups.

Examples of the aralkyl groups represented by R1, R2, R3, R5, R7, R8 and R9 include substituted and unsubstituted aralkyl groups. These aralkyl groups each preferably have from 7 to 20 carbon atoms. Examples of the substituents on the aralkyl group include ionic hydrophilic groups. Examples of the aralkyl group include benzyl, and 2-phenethyl.

Examples of the aryl groups represented by R1, R2, R3, R5, R7, R8 and R9 include substituted and unsubstituted aryl groups. These aryl groups each preferably have from 6 to 20 carbon atoms. Examples of the substituents on the aryl group include alkyl groups, alkoxy groups, halogen atoms, alkylamino groups, and ionic hydrophilic groups. Examples of the aryl group include phenyl, p-tollyl, p-methoxyphenyl, o-chlorophenyl, and m-(3-sulfopropylamino)phenyl.

Examples of the alkylthio groups represented by R1, R2, R3, R5, R7, R8 and R9 include substituted and unsubstituted alkylthio groups. These alkylthio groups each preferably have from 1 to 20 carbon atoms. Examples of the substituents on the alkylthio group include ionic hydrophilic groups. Examples of the alkylthio group include methylthio, and ethylthio group.

Examples of the arylthio groups represented by R1, R2, R3, R5, R7, R8 and R9 include substituted and unsubstituted arylthio groups. These arylthio groups each preferably have from 6 to 20 carbon atoms. Examples of the substituents on the arylthio group include alkyl groups, and ionic hydrophilic groups. Examples of the arylthio group include phenylthio, and p-tolylthio group.

The heterocyclic groups represented by R2 and by R22 described later each preferably are a 5- or 6-membered heterocyclic group which may be further condensed. Preferred examples of the hetero atoms constituting the heterocyclic group include N, S and O atoms. The heterocyclic groups may be aromatic or non-aromatic. These heterocyclic groups may be further substituted. Examples of the substituents on the heterocyclic group include those listed with reference to the aryl group described later. Preferred examples of the heterocyclic groups include a 6-membered nitrogen-containing aromatic heterocyclic group. Particularly preferred examples of such a 6-membered nitrogen-containing aromatic heterocyclic group include triazine, pyrimidine, and phthaladine.

Examples of the halogen atom represented by R8 include fluorine atom, chlorine atom, and bromine atom.

Examples of the alkoxy groups represented by R1, R3, R5 and R8 include substituted and unsubstituted alkoxy groups. These alkoxy groups each preferably have from 1 to 20 alkoxy groups. Examples of the substituents include hydroxyl groups, and ionic hydrophilic groups. Examples of the alkoxy groups include methoxy, ethoxy, isopropoxy, methoxyethoxy, hydroxyethoxy, and 3-carboxypropoxy.

Examples of the aryloxy group represented by R8 include substituted and unsubstituted aryloxy groups. These aryloxy groups each preferably have from 6 to 20 carbon atoms. Examples of the substituents on the aryloxy group include alkoxy groups, and ionic hydrophilic groups. Examples of the aryloxy groups include phenoxy, p-methoxyphenoxy, and o-methoxyphenoxy.

Examples of the acylamino group represented by R8 include substituted and unsubstituted acylamino groups. These acylamino groups each preferably have from 2 to 20 carbon atoms. Examples of the substituents on the acylamino group include ionic hydrophilic groups. Examples of the acylamino group include acetamide, propionamide, benzamide, and 3,5-disulfobenzamide.

Examples of the sulfonylamino group represented by R8 include substituted and unsubstituted sulfonylamino groups. These sulfonylamino groups each preferably have from 1 to 20 carbon atoms. Examples of the sulfonylamino group include methylsulfonylamino, and ethylsulfonylamino.

Examples of the alkoxycarbonylamino group represented by R8 include substituted and unsubstituted alkoxycarbonylamino groups. These alkoxycarbonylamino groups each preferably have from 2 to 20 carbon atoms. Examples of the substituents on the alkoxycarbonylamino group include ionic hydrophilic groups. Examples of the alkoxycarbonylamino group include ethoxycarbonylamino.

Examples of the ureide group represented by R8 include substituted and unsubstituted ureide groups. These ureide groups each preferably have from 1 to 20 carbon atoms. Examples of the substituents on the ureide group include alkyl groups, and aryl groups. Examples of the ureide group include 3-methylureide, 3,3-dimethylureide, and 3-phenylureide.

Examples of the alkoxycarbonyl groups represented by R7, R8 and R9 include substituted and unsubstituted alkoxycarbonyl groups. These alkoxycarbonyl groups each preferably have from 2 to 20 carbon atoms. Examples of the substituents on the alkoxycarbonyl group include ionic hydrophilic groups. Examples of the alkoxycarbonyl group include methoxycarbonyl, and ethoxycarbonyl.

Examples of the carbamoyl groups represented by R2, R7, R8 and R9 include substituted and unsubstituted carbamoyl groups. Examples of the substituents on the carbamoyl group include alkyl groups. Examples of the carbamoyl group include methylcarbamoyl group, and dimethylcarbamoyl group.

Examples of the sulfamoyl group represented by R8 include substituted and unsubstituted sulfamoyl groups. Examples of the substituents on the sulfamoyl group include alkyl groups. Examples of the sulfamoyl group include dimethylsulfamoyl group, and di-(2-hydroxyethyl)sulfamoyl group.

Examples of the alkylsulfinyl and arylsulfonyl groups represented by R8 include methylsulfonyl, and phenylsulfonyl.

Examples of the acyl groups represented by R2 and R8 include substituted and unsubstituted acyl groups. These acyl groups each preferably have from 1 to 20 carbon atoms. Examples of the substituents on the acyl group include ionic hydrophilic groups. Examples of the acyl group include acetyl, and benzoyl.

Examples of the amino group represented by R8 include substituted and unsubstituted amino groups. Examples of the substituents on the amino group include alkyl groups, aryl groups, and heterocyclic groups. Examples of the amino group include methylamino, diethylamino, anilino, and 2-chloroanilino.

The heterocyclic groups represented by R4, R6 and R10 are the same as the heterocyclic groups represented by B in the general formula (1) which may be substituted. Preferred examples of the heterocyclic groups include those listed with reference to B in the general formula (1). Even more desirable examples of the heterocyclic groups include those listed with reference to B in the general formula (1). Particularly preferred examples of the heterocyclic groups include those listed with reference to B in the general formula (1). Examples of the substituents on the heterocyclic group include ionic hydrophilic groups, $C_1$–$C_{12}$ alkyl, aryl and arylthio groups, halogen atoms, cyano groups, sulfamoyl groups, sulfonamide groups, carbamoyl groups, and acylamino groups. These alkyl and aryl groups may further contain substituents.

In the general formula (3), Za represents —N=, —NH— or —C(R11)=. Zb and Zc each independently represent —N= or —C(R11)= in which R11 represents a hydrogen atom or non-metallic substituent. Preferred examples of the non-metallic substituent represented by R11 include cyano groups, cycloalkyl groups, aralkyl groups, aryl groups, alkylthio groups, arylthio groups, and ionic hydrophilic groups. These substituents each have the same meaning as those represented by R1. Preferred examples of these substituents include those listed with reference to R1. Examples of the skeleton of the heterocyclic group composed of two 5-membered rings contained in the general formula (3) will be given below.

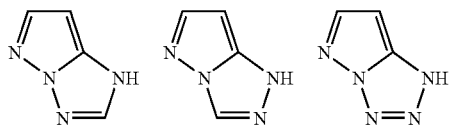

Examples of the substituents on the aforementioned substituents which may further have substituents include substituents which may substitute the heterocyclic groups A and B in the general formula (1).

The dyes represented by the general formulae (2) to (4), if used as a water-soluble dye, preferably contain at least one ionic hydrophilic group per molecule. Besides the dyes of the general formulae (2) to (4) wherein at least any one of R1, R2, R3, R5, R7, R8 and R9 is an ionic hydrophilic group, dyes of the general formulae (2) to (4) wherein R1 to R11 further contain an ionic hydrophilic group as a substituent may be used.

Preferred among the dyes of the general formulae (2), (3) and (4) are those represented by the general formula (2). Particularly preferred among the dyes of the general formula (2) is one represented by the following general formula (2-1).

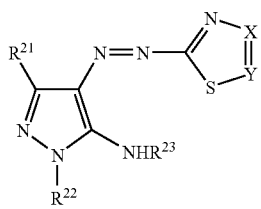

(2-1)

wherein $R^{21}$ and $R^{23}$ each represent a hydrogen atom, alkyl group, cycloalkyl group, alkoxy group or aryl group; $R^{22}$ represents an aryl group or heterocyclic group; and one of X and Y represents a nitrogen atom and the other represents —$CR^{24}$ in which R24 represents a hydrogen or halogen atom or a cyano, alkyl, alkylthio, alkylsulfonyl, alkylsulfinyl, alkyloxycarbonyl, carbamoyl, alkoxy, aryl, arylthio, arylsulfonyl, arylsulfinyl, aryloxy or acylamino group which may be further substituted.

In the general formula (2-1), $R^{22}$ is preferably a heterocyclic group (e.g., triazine ring, pyrimidine ring), more preferably a triazine ring or pyrimidine ring, particularly a triazine ring. The dye of the general formula (2-1) preferably has an ionic hydrophilic group. More preferably, $R^{22}$ is a heterocyclic group (e.g., triazine ring, pyrimidine ring).

Specific examples of the dye to be used in the invention will be given below, but the dye to be used in the invention is not limited thereto. These compounds can be synthesized according to JP-A-2-24191, JP-A-2001-279145, and Japanese Patent Application No. 2000-124832.

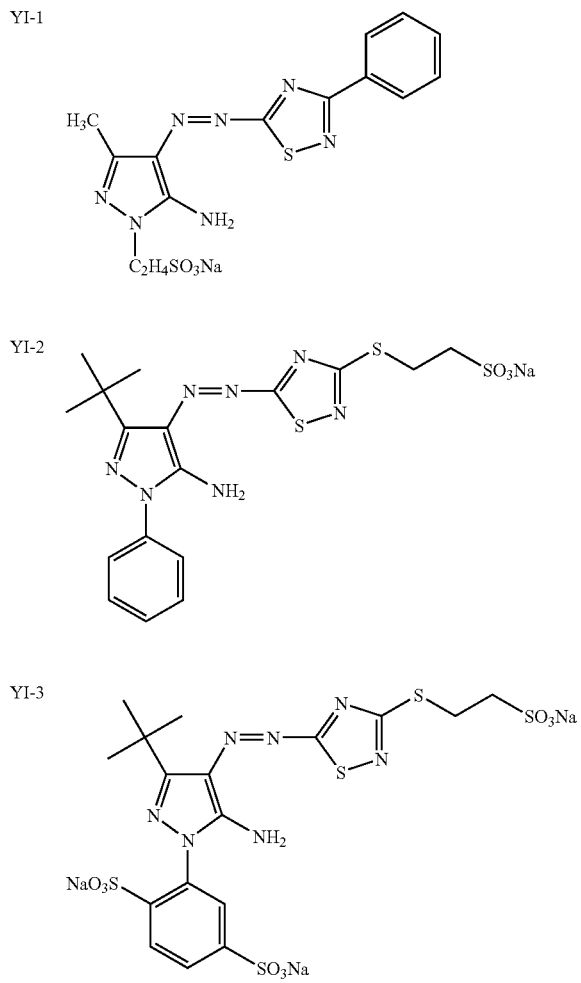

YI-4
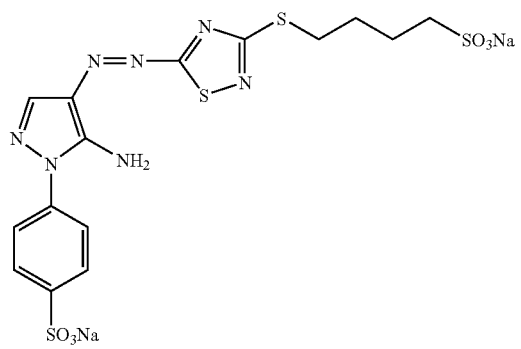
YI-5
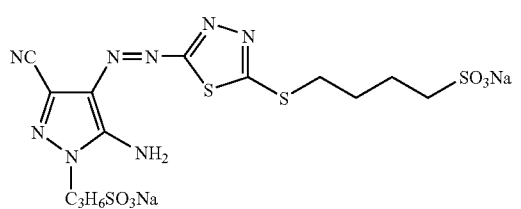
YI-6
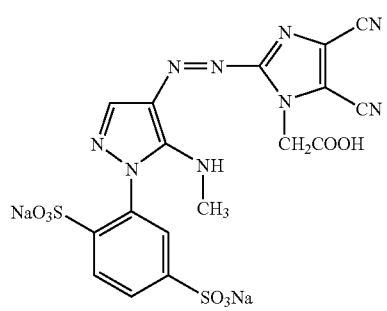
YI-7
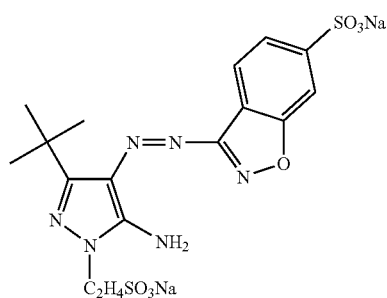
YI-8
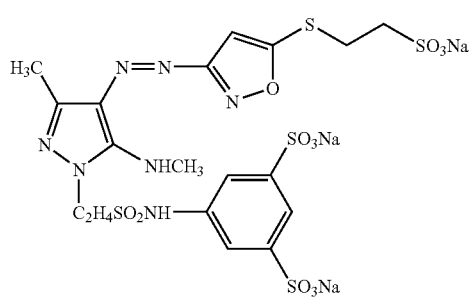
YI-9
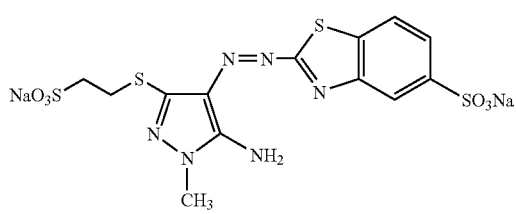
YI-10
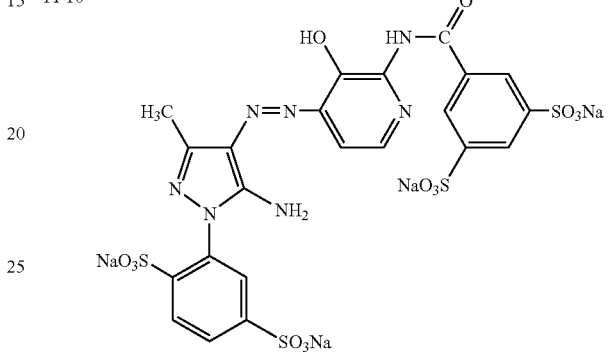
YI-11
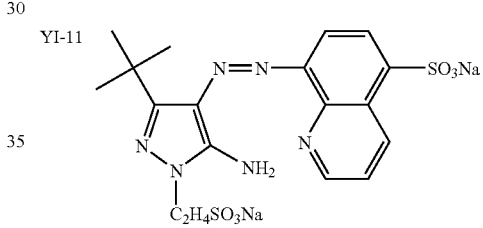
YI-12
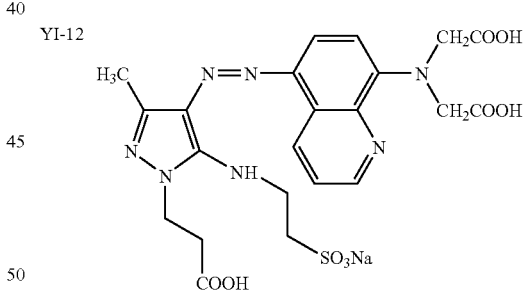
YI-13
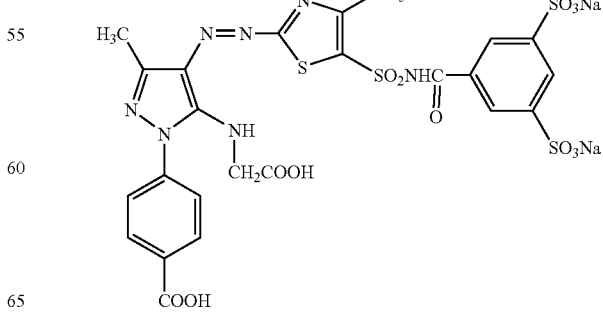

-continued
| | |
|---|---|
| YI-14 | 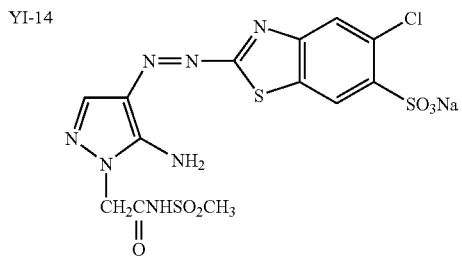 |
| YI-15 | 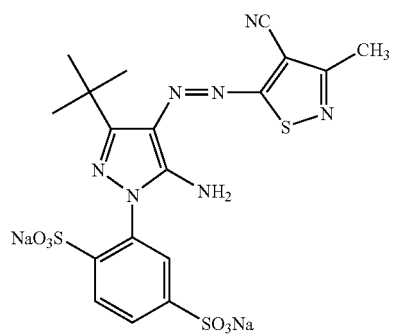 |
| YI-16 | 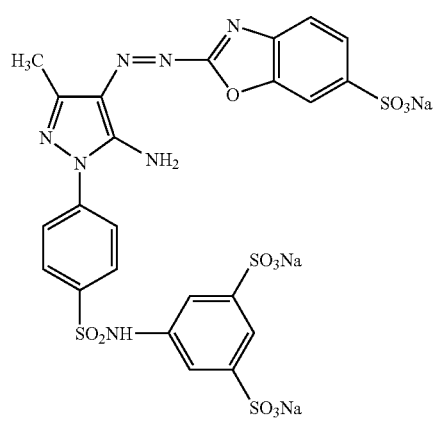 |
| YI-17 | 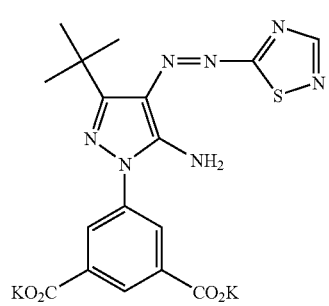 |
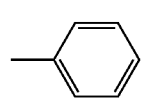
| | R |
|---|---|
| YI-18 | CH$_3$ |
| YI-19 | C$_3$H$_6$SO$_3$Na |
-continued
| | |
|---|---|
| YI-20 | H |
| YI-21 | C$_2$H$_4$CN |
| YI-22 | 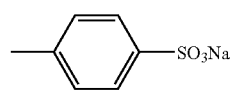 |
| YI-23 | 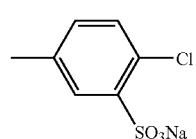 |
| YI-24 | 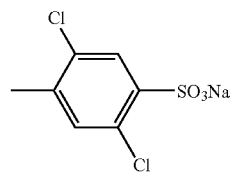 |
| YI-25 | 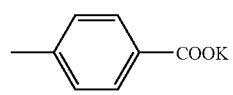 |
| YI-26 | 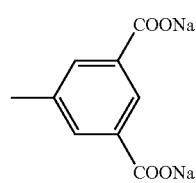 |
| YI-27 | 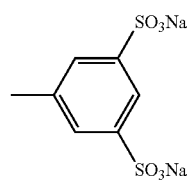 |
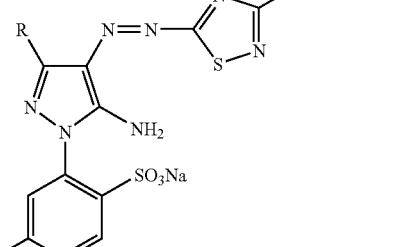
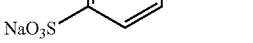
| | R |
|---|---|
| YI-28 | CH$_3$ |
| YI-29 | 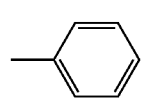 |
| YI-30 | OC$_2$H$_5$ |

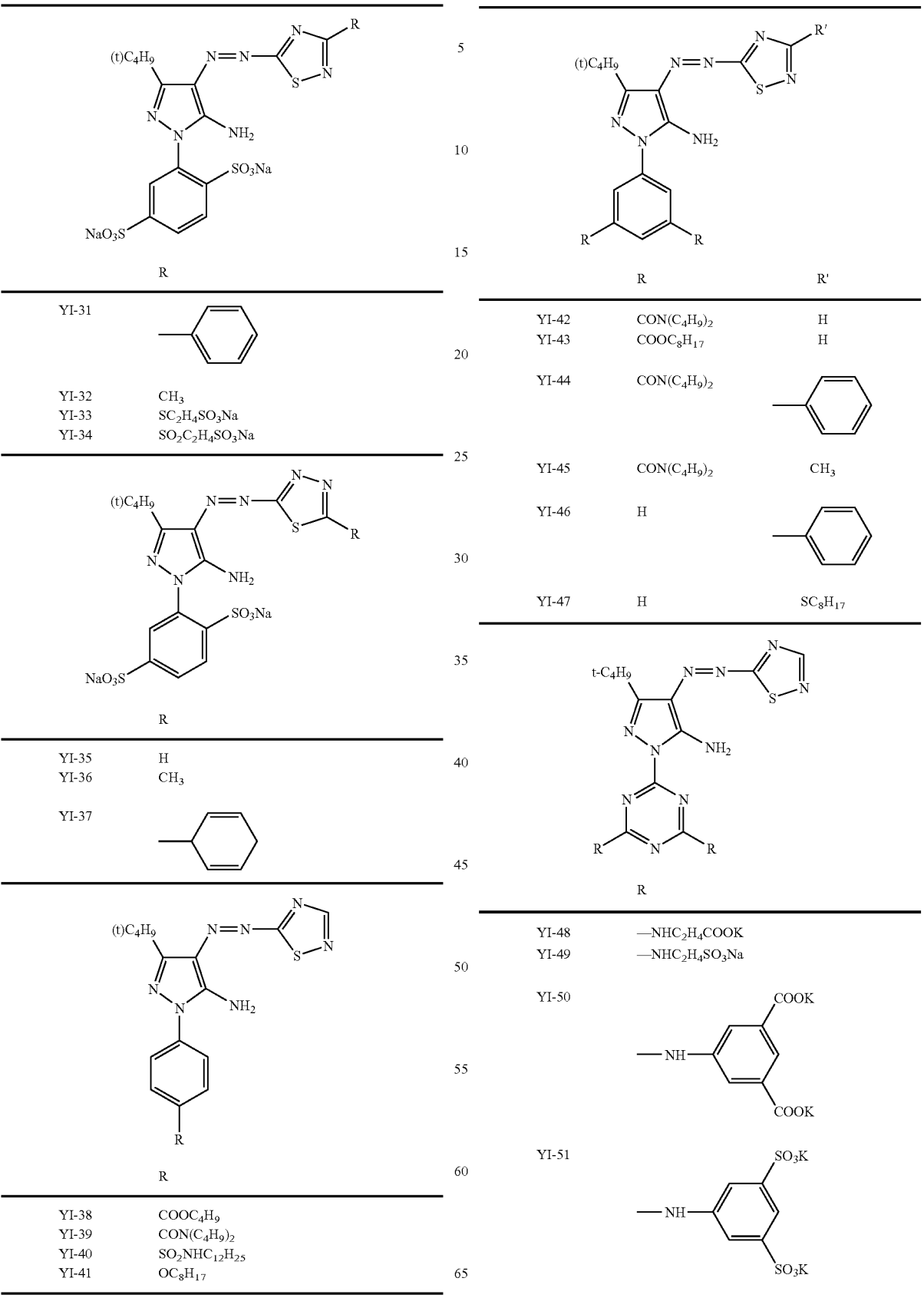

-continued
| | |
|---|---|
| YI-52 | 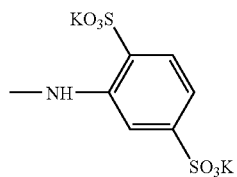 |
| YI-53 | —N(CH₂COONa)₂ |
| YI-54 | 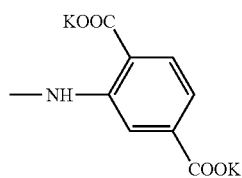 |
| YI-55 | 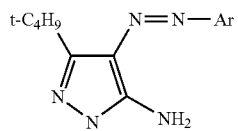 |
| YI-56 | —NHC₆H₁₃ |
| YI-57 | —N(C₄H₉)₂ |
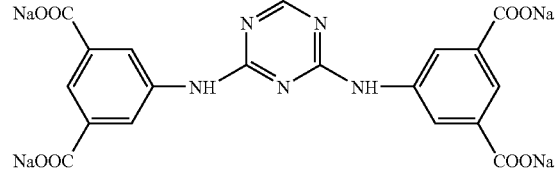
| Ar | |
|---|---|
| YI-58 | 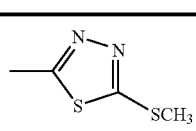 |
| YI-59 | |
| YI-60 | |
| YI-61 | 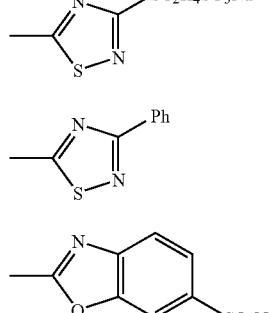 |
| YI-62 | 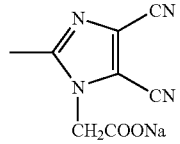 |
-continued
| | |
|---|---|
| YI-63 | 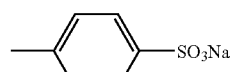 |
| YI-64 | 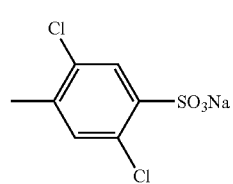 |
| YI-65 | 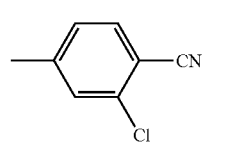 |
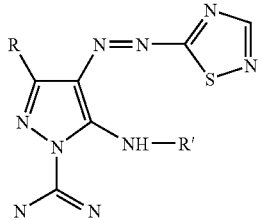
| | R | R' |
|---|---|---|
| YI-66 | Ph | H |
| YI-67 | OC₂H₅ | C₂H₅ |
| YI-68 | CH₃ | H |
| YI-69 | t-C₄H₉ | H |
| YI-70 | t-C₄H₉ | —C₂H₄COOH |
| YI-71 | | |
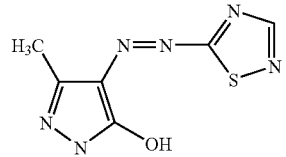
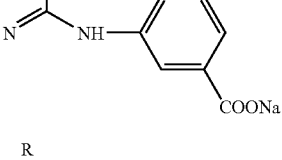
R -continued
| | |
|---|---|
| YI-72 | H |
| YI-73 | OCH₃ |
| YI-74 | OH |
| YI-75 | SO₃Na |
| YI-76 | F |
| YI-77 | 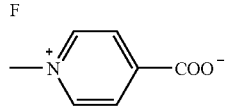 |
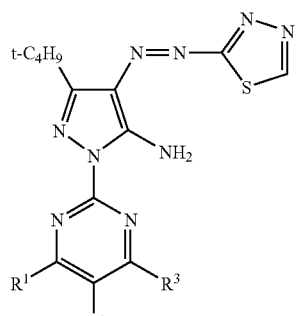
| | R¹ | R² | R³ |
|---|---|---|---|
| YI-78 | Cl | Cl | Cl |
| YI-79 | Cl | Cl | F |
| YI-80 | Cl | —CONHPh | Cl |
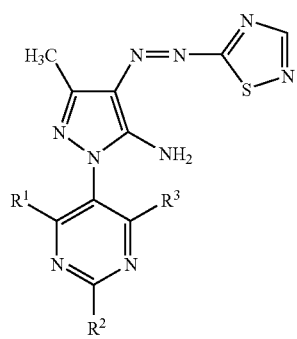
| | R¹ | R² | R³ |
|---|---|---|---|
| YI-81 | F | H | H |
| YI-82 | Cl | H | F |
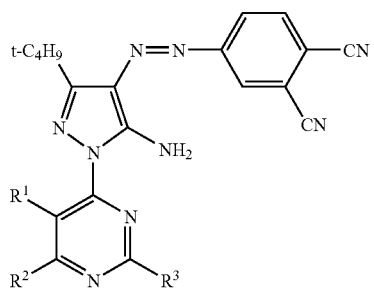
| | R¹ | R² | R³ |
|---|---|---|---|
| YI-83 | H | F | F |
| YI-84 | F | F | H |
-continued
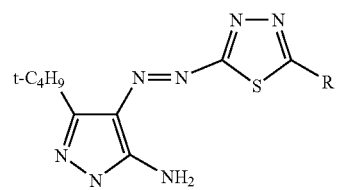
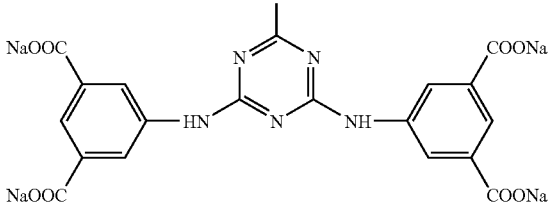
R
| | |
|---|---|
| YI-85 | H |
| YI-86 | CH₃ |
| YI-87 | Ph |
| YI-88 | SCH₂COONa |
| YI-89 | SC₂H₅ |
| YI-90 | SC₄H₉-n |
| YI-91 | SCH₂CHMe₂ |
| YI-92 | SCHMeEt |
| YI-93 | SC₄H₉-t |
| YI-94 | SC₇H₁₅-n |
| YI-95 | SC₂H₄OC₂H₅ |
| YI-96 | SC₂H₄OC₄H₉-n |
| YI-97 | SCH₂CF₃ |
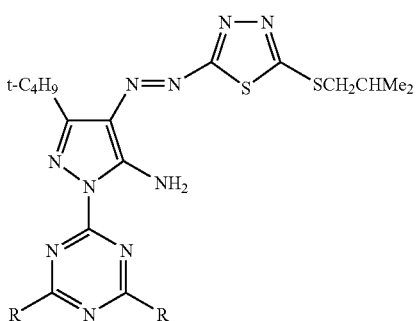
R
| | |
|---|---|
| YI-98 | —NHC₂H₄COOK |
| YI-99 | —NHC₂H₄SO₃Na |
| YI-100 | 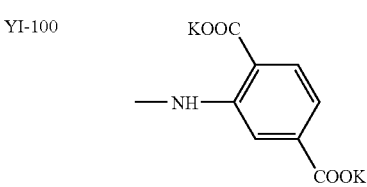 |
| YI-101 | 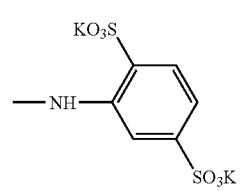 |

-continued

YI-102
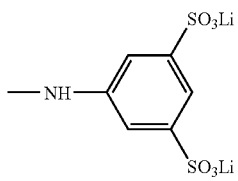

YI-103
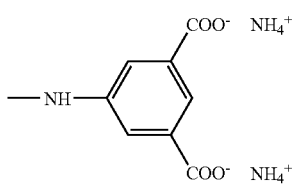

YI-104 —NHC$_6$H$_{13}$-n
YI-105 —N(C$_4$H$_9$-n)$_2$
YI-106 —N$+$CH$_2$COONa)$_2$

YI-107
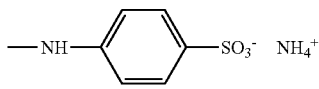

YI-108
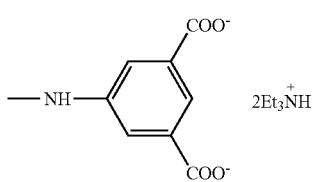

The ink for ink jet recording of the invention preferably contains a yellow dye of the invention in an amount of from 0.2% to 20% by weight, more preferably from 0.5% to 15% by weight.

<Magenta Ink>

The coloring agent represented by the general formula (M-I) which is preferably used in the invention will be described hereinafter.

In the general formula (M-I), $A^1$ represents a 5-membered heterocyclic group.

$B^1$ and $B^2$ represent =CR$^1$— or —CR$^2$=, respectively. Alternatively, one of $B^1$ and $B^2$ represents a nitrogen atom and the other represents =CR$^1$— or —CR$^2$=. $R^5$ and $R^6$ each independently represent a hydrogen atom or substituent. Examples of the substituent represented by $R^5$ and $R^6$ include aliphatic groups, aromatic groups, heterocyclic groups, acyl groups, alkoxycarbonyl groups, aryoxycarbonyl groups, carbamoyl groups, alkylsulfinyl groups, arylsulfonyl groups, and sulfamoyl groups. The hydrogen atoms in these substituents may be substituted.

$G^1$, $R^1$ and $R^2$ each independently represent a hydrogen atom or substituent. Examples of the substituents represented by $G^1$, $R^1$ and $R^2$ include halogen atoms, aliphatic groups, aromatic groups, heterocyclic groups, cyano groups, carboxyl groups, carbamoyl groups, alkoxycarbonyl groups, aryloxycarbonyl groups, heterocyclic oxycarbonyl groups, acyl groups, hydroxy groups, alkoxy groups, aryloxy groups, heterocyclic oxy groups, silyloxy groups, acyloxy groups, carbamoyloxy groups, alkoxycarbonyloxy groups, aryloxycarbonyloxy groups, amino groups (including alkylamino groups, arylamino groups and heterocyclic amino groups), acylamino groups, ureide groups, sulfamoylamino groups, alkoxycarbonylamino groups, aryloxycarbonyl amino groups, alkylsulfonylamino groups, arylsulfonylamino groups, heterocyclic sulfonylamino groups, nitro groups, alkylthio groups, arylthio groups, heterocyclic thio groups, alkylsulfonyl groups, arylsulfonyl groups, heterocyclic sulfonyl groups, alkylsulfinyl groups, arylsulfinyl groups, heterocyclic sulfinyl groups, sulfamoyl groups, and sulfo groups. The hydrogen atoms in these substituents may be substituted.

$R^1$ and $R^5$ or $R^5$ and $R^6$ may be connected to each other to form a 5- or 6-membered ring.

The dye of the general formula (M-1) will be further described hereinafter.

In the general formula (M-1), $A^1$ represents a 5-membered heterocyclic group. Examples of the hetero atoms constituting the heterocyclic group include N, O and S atoms. The heterocyclic group represented by $A^1$ is preferably a nitrogen-containing 5-membered heterocyclic group to which aliphatic or aromatic rings or other heterocyclic groups may be condensed. Preferred examples of the heterocyclic group include pyrazole rings, imidazole rings, thiazole rings, isothiazole rings, thiadiazole rings, benzothiadiazole rings, benzoxazole rings, and benzoisothiazole rings. These heterocyclic groups may further contain substituents. Preferred among these substituents are pyrazole ring, imidazole ring, isothiazole ring, thiadiazole ring and benzothiazole represented by the following general formulae (a) to (f).

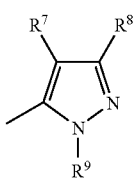
(a)

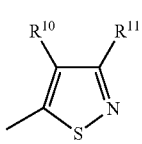
(b)

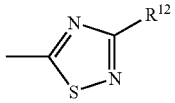
(c)

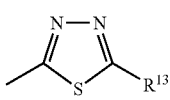
(d)

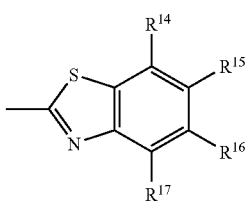
(e)

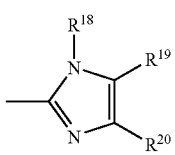
(f)

In the general formulae (a) to (f), $R^7$ to $R^{20}$ represent the same substituents as represented by $G^1$, $R^1$ and $R^2$ in the general formula (M-I).

Preferred among the substituents represented by the general formulae (a) to (f) are pyrazole ring and isothiazole ring represented by the general formulae (a) and (b). Particularly preferred among these substituents is pyrazole ring represented by the general formula (a).

In the general formula (M-I), $B^1$ and $B^2$ represent =$CR^1$— and —$CR^2$=, respectively. Alternatively, one of $B^1$ and $B^2$ represents a nitrogen atom and the other represents =$CR^1$— or —$CR^2$=. Preferably, $B^1$ and $B^2$ represent =$CR^1$— and —$CR^2$=, respectively.

$R^5$ and $R^6$ each independently represent a hydrogen atom or a substituent. Examples of the substituents represented by $R^5$ and $R^6$ include aliphatic groups, aromatic groups, heterocyclic groups, acyl groups, alkoxycarbonyl groups, aryloxycarbonyl groups, carbamoyl groups, alkylsulfonyl groups, arylsulfonyl groups, and sulfamoyl groups. The hydrogen atoms in these substituents may be substituted.

Preferred among the groups represented by $R^5$ and $R^6$ are hydrogen atom, aliphatic groups, aromatic groups, heterocyclic groups, acyl groups, alkylsulfonyl groups and arylsulfonyl groups. More desirable among these groups are hydrogen atom, aromatic groups, heterocyclic groups, acyl groups, alkylsulfonyl groups and arylsulfonyl groups. Most desirable among these groups are hydrogen atom, aryl groups and heterocyclic groups. The hydrogen atoms in these substituents may be substituted. However, $R^5$ and $R^6$ are not a hydrogen atom at the same time.

$G^1$, $R^1$ and $R^2$ each independently represent a hydrogen atom or a substituent. Examples of the substituents represented by $G^1$, $R^1$ and $R^2$ include a halogen atom or an aliphatic, aromatic, heterocyclic, cyano, carboxyl, carbamoyl, alkoxycarbonyl, aryloxycarbonyl, heterocyclic oxycarbonyl, acyl, hydroxyl, alkoxy, aryloxy, heterocyclic oxy, silyloxy, acyloxy, carbamoyloxy, alkoxycarbonyloxy, aryloxycarbonyloxy, amino (including heterocyclic amino group and anilino group), acylamino, ureide, sulfamoylamino, alkoxycarbonylamino, aryloxycarbonylamino, alkylsulfonylamino, arylsulfonylamino, heterocyclic sulfonylamino, nitro, alkylthio, arylthio, heterocyclic thio, alkylsulfonyl, arylsulfonyl, heterocyclic sulfonyl, alkylsulfinyl, arylsulfinyl, heterocyclic sulfinyl, sulfamoyl or sulfo group. The hydrogen atoms in these substituents may be substituted.

Preferred among the groups represented by $G^1$ are hydrogen atom, halogen atom, aliphatic groups, aromatic groups, hydroxy groups, alkoxy groups, aryloxy groups, acyloxy groups, heterocyclic oxy groups, amino groups (including alkylamino group, arylamino group, heterocyclic amino group), acylamino groups, ureide groups, sulfamoylamino groups, alkoxycarbonylamino groups, aryloxycarbonylamino groups, alkylthio groups, arylthio groups, and heterocyclic thio groups. More desirable among these groups are hydrogen atom, halogen atom, alkyl groups, hydroxy groups, alkoxy groups, aryloxy groups, acyloxy groups, amino groups, and acylamino groups. Most desirable among these groups are hydrogen atom, amino groups (preferably anilino group), and acylamino groups. The hydrogen atoms in these substituents may be substituted.

Preferred among the groups represented by $R^1$ and $R^2$ are hydrogen atom, alkyl groups, halogen atom, alkoxycarbonyl groups, carboxyl groups, carbamoyl groups, hydroxy groups, alkoxy groups, and cyano groups. The hydrogen atoms in these substituents may be substituted.

$R^1$ and $R^5$ or $R^5$ and $R^6$ may be connected to each other to form a 5- or 6-membered ring.

Examples of the substituents on $A^1$ or on the substituents by which the substituents of $R^1$, $R^2$, $R^5$ and G are substituted include those listed with reference to G, $R^1$ and $R^2$.

The dye of the general formula (M-I) of the invention, if it is water-soluble, preferably has an ionic hydrophilic group on any position on $A^1$, $R^1$, $R^2$, $R^5$, $R^6$ and $G^1$ as a substituent. Examples of the ionic hydrophilic group which is a substituent include sulfo groups, carboxyl groups, phosphono groups, and quaternary ammonium groups. Preferred among the ionic hydrophilic groups are carboxyl groups, phosphono groups, and sulfo groups. Particularly preferred among these ionic hydrophilic groups are carboxyl groups and sulfo groups. The carboxyl, phosphono and sulfo groups may be in the form of salt. Examples of the counter ion constituting the salt include ammonium ion, alkaline metal ion (e.g., lithium ion, sodium ion, potassium ion), and organic cation (e.g., tetramethyl ammonium ion, tetramethyl guanidium ion, tetramethyl phosphonium ion).

The terms (substituents) used herein will be described hereinafter. These terms are common to all different signs in the following general formula (M-I) and the general formula (M-Ia) described later.

Examples of the halogen atom include fluorine atom, chlorine atom and bromine atom.

The term "aliphatic group" as used herein is meant to include an alkyl group, substituted alkyl group, alkenyl group, substituted alkenyl group, alkinyl group, substituted alkinyl group, aralkyl group, and substituted aralkyl group. The term "substituted" as used in "substituted alkyl group" herein is meant to indicate that the hydrogen atoms present in "alkyl group", etc. are substituted by the substituents listed above with reference to $G^1$, $R^1$ and $R^2$.

The aliphatic group may have branches or may form a ring. The aliphatic group preferably has from 1 to 20 carbon atoms, more preferably from 1 to 16 carbon atoms. The aryl moiety of the aralkyl group or substituted aralkyl group is preferably a phenyl group or naphthyl group, particularly a phenyl group. Examples of the aliphatic group include methyl group, ethyl group, butyl group, isopropyl group, t-butyl group, hydroxyethyl group, methoxyethyl group, cyanoethyl group, trifluoromethyl group, 3-sulfopropyl group, 4-sulfobutyl group, cyclohexyl group, benzyl group, 2-phenethyl group, vinyl group, and allyl group.

The term "aromatic group" as used herein is meant to include an aryl group and substituted aryl group. The aryl group is preferably a phenyl group or naphthyl group, particularly a phenyl group. The aromatic group preferably has from 6 to 20 carbon atoms, more preferably from 6 to 16 carbon atoms.

Examples of the aromatic group include phenyl group, p-tollyl group, p-methoxyphenyl group, o-chlorophenyl group, and m-(3-sulfopropylamino)phenyl group.

The term "heterocyclic group" as used herein is meant to include substituted heterocyclic groups. The heterocyclic group may have aliphatic or aromatic rings or other heterocyclic groups condensed thereto. The heterocyclic group is preferably a 5- or 6-membered heterocyclic group. Examples of the substituents on the heterocyclic group include aliphatic groups, halogen atoms, alkylsulfonyl groups, arylsulfonyl groups, acyl groups, acylamino groups, sulfamoyl groups, carbamoyl groups, and ionic hydrophilic groups. Examples of the heterocyclic group include 2-pyridyl group, 2-chenyl group, 2-thiazolyl group, 2-benzothiazolyl group, 2-benzoxazolyl group, and 2-furyl group.

The term "carbamoyl group" as used herein is meant to include substituted carbamoyl groups. Examples of the substituents on the carbamoyl group include alkyl groups. Examples of the carbamoyl group include methylcarbamoyl group, and dimethylcarbamoyl group.

The term "alkoxycarbonyl group" as used herein is meant to include substituted alkoxycarbonyl groups. The alkoxycarbonyl group preferably has from 2 to 20 carbon atoms. Examples of the substituents on the alkoxycarbonyl group include ionic hydrophilic groups. Examples of the alkoxycarbonyl group include methoxycarbonyl group, and ethoxycarbonyl group.

The term "aryloxycarbonyl group" as used herein is meant to include substituted aryloxycarbonyl groups. The aryloxycarbonyl group preferably has from 7 to 20 carbon atoms. Examples of the substituents on the aryloxycarbonyl group include ionic hydrophilic groups. Examples of the aryloxycarbonyl group include phenoxycarbonyl group.

The term "heterocyclic oxycarbonyl group" as used herein is meant to include substituted heterocyclic oxycarbonyl groups. Examples of the heterocyclic group include those listed above with reference to the heterocyclic group. The heterocyclic oxycarbonyl group preferably has from 2 to 20 carbon atoms. Examples of the substituents on the heterocyclic oxycarbonyl group include ionic hydrophilic groups. Examples of the heterocyclic oxycarbonyl group include 2-pyridyloxycarbonyl group.

The term "acyl group" as used herein is meant to include substituted acyl groups. The acyl group preferably has from 1 to 20 carbon atoms. Examples of the substituents on the acyl group include ionic hydrophilic groups. Examples of the acyl group include acetyl group, and benzoyl group.

The term "alkoxy group" as used herein is meant to include substituted alkoxy groups. The alkoxy group preferably has from 1 to 20 carbon atoms. Examples of the substituents on the alkoxy group include alkoxy groups, hydroxyl groups, and ionic hydrophilic groups. Examples of the alkoxy group include methoxy group, ethoxy group, isopropoxy group, methoxyethoxy group, hydroxyethoxy group, and 3-carboxypropoxy group.

The term "aryloxy group" as used herein is meant to include substituted aryloxy groups. The aryoxy group preferably has from 6 to 20 carbon atoms. Examples of the substituents on the aryloxy group include alkoxy groups, and ionic hydrophilic groups. Examples of the aryloxy group include phenoxy group, p-methoxyphenoxy group, and o-methoxyphenoxy group.

The term "heterocyclic oxy group" as used herein is meant to include substituted heterocyclic oxy groups. Examples of the heterocyclic group include those listed above with reference to the heterocyclic group. The heterocyclic oxy group preferably has from 2 to 20 carbon atoms. Examples of the substituents on the heterocyclic oxy group include alkyl groups, alkoxy groups, alkoxy groups, and ionic hydrophilic groups. Examples of the heterocyclic oxy group include 3-pyridyloxy group, and 3-chenyloxy group.

The silyloxy group is preferably a $C_1$–$C_{20}$ silyloxy group having a substituted aliphatic or aromatic group. Examples of the silyloxy group include trimethylsilyloxy, and diphenylmethylsilyloxy.

The term "acyloxy group" as used herein is meant to include substituted acyloxy groups. The acyloxy group preferably has from 1 to 20 carbon atoms. Examples of the substituents on the acyloxy group include ionic hydrophilic groups. Examples of the acryloxy group include acetoxy group, and benzoyloxy group.

The term "carbamoyloxy group" as used herein is meant to include substituted carbamoyloxy groups. Examples of the substituents on the carbamoyloxy group include alkyl groups. Examples of the carbamoyloxy group include N-methylcarbamoyloxy group.

The term "alkoxycarbonyloxy group" as used herein is meant to include substituted alkoxycarbonyloxy groups. The alkoxycarbonyloxy group preferably has from 2 to 20 carbon atoms. Examples of the alkoxycarbonyloxy group include methoxycarbonyloxy group, and isopropoxycarbonyloxy group.

The term "aryloxycarbonyloxy group" as used herein is meant to include substituted aryloxycarbonyloxy groups. The aryloxycarbonyloxy preferably has from 7 to 20 carbon atoms. Examples of the aryloxycarbonyloxy group include phenoxycarbonyloxy group.

The term "amino group" as used herein is meant to include substituted amino groups. Examples of the substituents on the amino group include alkyl groups, aryl groups, and heterocyclic groups. The alkyl, aryl and heterocyclic groups may further have substituents. The term "alkylamino group" as used herein is meant to include substituted alkylamino groups. The alkylamino group preferably has from 1 to 20 carbon atoms. Examples of the substituents on the alkylamino group include ionic hydrophilic groups. Examples of the alkylamino group include methylamino group, and diethylamino group.

The term "arylamino group" as used herein is meant to include substituted arylamino groups. The arylamino group preferably has from 6 to 20 carbon atoms. Examples of the substituents on the arylamino group include halogen atoms, and ionic hydrophilic groups. Examples of the arylamino group include phenylamino group, and 2-chlorophenylamino group.

The term "heterocyclic amino group" as used herein is meant to include substituted heterocyclic amino groups. Examples of the heterocyclic group include those listed above with reference to the heterocyclic group. The heterocyclic amino group preferably has from 2 to 20 carbon atoms. Examples of the substituents on the heterocyclic amino group include alkyl groups, halogen atoms, and ionic hydrophilic groups.

The term "acylamino group" as used herein is meant to include substituted acylamino groups. The acylamino group preferably has from 2 to 20 carbon atoms. Examples of the substituents on the acylamino group include ionic hydrophilic groups. Examples of the acrylamino group include acetylamino group, propionylamino group, benzoylamino group, N-phenylacetylamino group, and 3,5-disulfobenzoylamino group.

The term "ureide group" as used herein is meant to include substituted ureide groups. The ureide group preferably has from 1 to 20 carbon atoms. Examples of the substituents on the ureide group include alkyl group, and aryl group. Examples of the ureide group include 3-methylureide group, 3,3-dimethylureide group, and 3-phenylureide group.

The term "sulfamoylamino group" as used herein is meant to include substituted sulfamoylamino groups. Examples of the substituents on the sulfamoylamino group include alkyl groups. Examples of the sulfamoylamino group include N,N-dipropylsulfamoylamino group.

The term "alkoxycarbonylamino group" as used herein is meant to include substituted alkoxycarbonylamino groups. The alkoxycarbonylamino group preferably has from 2 to 20 carbon atoms. Examples of the substituents on the alkoxycarbonylamino group include ionic hydrophilic groups. Examples of the alkoxycarbonylamino group include ethoxycarbonylamino group.

The term "aryoxycarbonylamino group" as used herein is meant to include substituted aryloxycarbonylamino groups. The aryloxycarbonylamino group preferably has from 7 to 20 carbon atoms. Examples of the substituents on the aryloxycarbonylamino group include ionic hydrophilic groups. Examples of the aryloxycarbonylamino group include phenoxycarbonylamino group.

The term "alkylsulfonylamino group and arylsulfonylamino group" as used herein is meant to include substituted alkylsulfonylamino groups and substituted or unsubstituted arylsulfonylamino groups, respectively. The alkylsulfonylamino group and arylsulfonylamino group each preferably have from 1 to 20 carbon atoms and from 7 to 20 carbon atoms, respectively. Examples of the substituents on the alkylsulfonylamino group and arylsulfonylamino group include ionic hydrophilic groups. Examples of the alkylsulfonylamino group and arylsulfonylamino group include methylsulfonylamino group, N-phenyl-methylsulfonylamino group, phenylsulfonylamino group, and 3-carboxyphenylsulfonylamino group.

The term "heterocyclic sulfonylamino group" as used herein is meant to include substituted heterocyclic sulfonylamino groups. The heterocyclic sulfonylamino group preferably has from 1 to 12 carbon atoms. Examples of the substituents on the heterocyclic sulfonylamino group include ionic hydrophilic groups. Examples of the heterocyclic sulfonylamino group include 2-chenylsulfonylamino group, and 3-pyridylsulfonylamino group.

The term "alkylthio group, arylthio group and heterocyclic thio group" as used herein is meant to include substituted alkyl groups, substituted arylthio groups and substituted heterocyclic thio groups, respectively. Examples of the heterocyclic group include those listed above with reference to the heterocyclic group. The alkylthio group, arylthio group and heterocyclic thio group each preferably have from 1 to 20 carbon atoms. Examples of the substituents on the alkylthio group, arylthio group and heterocyclic thio group include ionic hydrophilic groups. Examples of the alkylthio group, arylthio group and heterocyclic thio group include methylthio group, phenylthio group, and 2-pyridylthio group.

The term "alkylsulfonyl group and arylsulfonyl group" as used herein is meant to include substituted alkylsulfonyl, groups and substituted arylsulfonyl groups, respectively. Examples of the alkylsulfonyl group and arylsulfonyl group include methylsulfonyl group and phenylsulfonyl group.

The term "heterocyclic sulfonyl group" as used herein is meant to include substituted heterocyclic sulfonyl groups. Examples of the heterocyclic group include those listed above with reference to the heterocyclic group. The heterocyclic sulfonyl group preferably has from 1 to 20 carbon atoms. Examples of the substituents on the heterocyclic sulfonyl group include ionic hydrophilic groups. Examples of the heterocyclic sulfonyl group include 2-chenylsulfonyl group and 3-pyridylsulfonyl group.

The term "alkylsulfinyl group and arylsulfinyl group" as used herein is meant to include substituted alkylsulfinyl groups and substituted arylsulfinyl groups, respectively. Examples of the alkylsulfinyl group and arylsulfinyl group include methylsulfinyl group and phenylsulfinyl group.

The term "heterocyclic sulfinyl group" as used herein is meant to include substituted heterocyclic sulfinyl groups. Examples of the heterocyclic group include those listed above with reference to the heterocyclic group. The heterocyclic sulfinyl group preferably has from 1 to 20 carbon atoms. Examples of the substituents on the heterocyclic sulfinyl group include ionic hydrophilic groups. Examples of the heterocyclic sulfinyl group include 4-pyridylsulfinyl group.

The term "sulfamoyl group" as used herein is meant to include substituted sulfamoyl groups, Examples of the substituents on the sulfamoyl group include alkyl groups. Examples of the sulfamoyl group include dimethylsulfamoyl group and di-(2-hydroxyethyl)sulfamoyl group.

A particularly preferred structure of the dye of the invention is one represented by the following general formula (M-Ia).

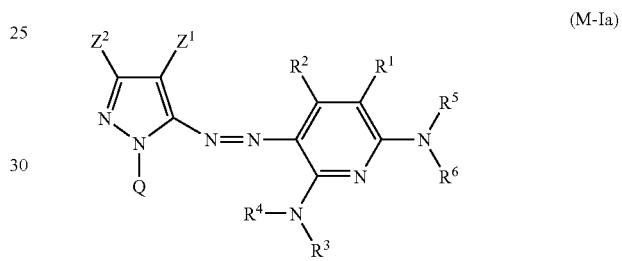

(M-Ia)

In the general formula (M-I), $R^1$, $R^2$, $R^5$ and $R^6$ are as defined in the general formula (M-I).

$R^3$ and $R^4$ each independently represent a hydrogen atom or substituent. Examples of the substituent include aliphatic groups, aromatic groups, heterocyclic groups, acyl groups, alkoxycarbonyl groups, aryloxycarbonyl groups, carbamoyl groups, alkylsulfonyl groups, arylsulfonyl groups, and sulfamoyl groups, preferred among these groups are hydrogen atom, aromatic groups, heterocyclic groups, acyl groups, alkylsulfonyl groups, and arylsulfonyl groups. Particularly preferred among these groups are hydrogen atom, aromatic groups, and heterocyclic groups.

$Z^1$ represents an electron-withdrawing group having a Hammett's substituent constant σp of not smaller than 0.20. $Z^1$ is preferably an electron-withdrawing group having a Hammett's substituent constant σp of not smaller than 0.30, more preferably not smaller than 0.45, particularly not smaller than 0.60. However, the Hammett's substituent constant σp of the electron-withdrawing group is preferably not greater than 1.0. Specific preferred examples of the substituents include electron-withdrawing substituents described later. Preferred among these electron-withdrawing substituents are $C_2$–$C_{20}$ acyl group, $C_2$–$C_{20}$ alkyloxycarbonyl group, nitro group, cyano group, $C_1$–$C_{20}$ alkylsulfonyl group, $C_6$–$C_{20}$ arylsulfonyl group, $C_1$–$C_{20}$ carbamoyl group, and $C_1$–$C_{20}$ halogenated alkyl group. Particularly preferred among these electron-withdrawing substituents are cyano group, $C_1$–$C_{20}$ alkylsulfonyl group, and $C_6$–$C_{20}$ arylsulfonyl group. Cyano group is most desirable.

$Z^2$ represents a hydrogen atom or a substituent such as aliphatic group, aromatic group and heterocyclic group. $Z^2$ is preferably an aliphatic group, more preferably a $C_1$–$C_6$ alkyl group.

Q represents a hydrogen atom or a substituent such as aliphatic group, aromatic group and heterocyclic group. Q is preferably a group formed by a group of non-metallic atoms required to form a 5- to 8-membered ring. The aforementioned 5- to 8-membered ring may be substituted, may be a saturated ring or may have an unsaturated bond. Particularly preferred among these 5- to 8-membered rings are aromatic group and heterocyclic group. Preferred examples of the non-metallic atom include nitrogen atom, oxygen atom, sulfur atom, and carbon atom. Specific examples of these cyclic structures include benzene ring, cyclopentane ring, cyclohexane ring, cycloheptane ring, cyclooctane ring, cyclohexene ring, pyridine ring, pyrimidine ring, pyrazine ring, pyridazine ring, triazine ring, imidazole ring, benzoimidazole ring, oxazole ring, benzoxazole ring, thiazole ring, benzothiazole ring, oxane ring, sulfolane ring, and thiane ring.

The hydrogen atoms in the substituents described with reference to the general formula (M-I) may be substituted. Examples of the substituents on these substituents include substituents listed with reference to the general formula (M-I), and ionic hydrophilic groups exemplified with reference to G, $R^1$ and $R^2$.

The Hammett's substituent constant σp as used herein will be further described hereinafter. Hammett's rule is an empirical rule which L. P. Hammett proposed in 1935 to quantitatively discuss the effect of substituents on the reaction or equilibrium of benzene derivatives. The validity of this empirical rule has been widely accepted today. Substituent constants required in Hammett's rule are σp value and σm value. These values are found in many general literatures. For the details of these values, reference can be made to J. A. Dean, "Lange's Handbook of Chemistry", 12th ed., 1979 (Mc Graw-Hill), and "Kagaku no Ryoiki (Region of Chemistry)", extra edition, No. 122, pp. 96–103, 1979 (Nankodo). In the invention, these substituents are defined or described by Hammett's substituent constant σp. However, this doesn't mean that the known values found in the aforementioned literatures are not limited to certain substituents. It goes without saying that even if the values are unknown in literatures, they contain substituents which may fall within the defined range when measured according to Hammett's rule. The compounds of the general formula (1a) of the invention contain those which are not benzene derivatives. As a measure for indicating the electron effect of substituents there is used σp value regardless of substitution position. In the invention, σp value is used in this sense.

Examples of the electron-withdrawing group having a Hammett's substituent constant σp of not smaller than 0.60 include cyano group, nitro group, and alkylsulfonyl group (e.g., methylsulfonyl, arylsulfonyl (e.g., phenylsulfonyl group)).

Examples of the electron-withdrawing group having a Hammett's substituent constant σp of not smaller than 0.45 include acyl groups (e.g., acetyl group), alkoxycarbonyl groups (e.g., dodecyloxycarbonyl group), aryloxycarbonyl groups (e.g., m-chlorophenoxycarbonyl), alkylsulfinyl groups (e.g., n-propylsulfinyl), arylsulfinyl groups (e.g., phenylsulfinyl), sulfamoyl groups (e.g., N-ethylsulfamoyl, N,N-dimethylsulfamoyl), and halogenated alkyl groups (e.g., trifluoromethyl), in addition to the aforementioned groups.

Examples of the electron-withdrawing group having a Hammett's substituent constant σp of not smaller than 0.30 include acyloxy groups (e.g., acetoxy group), carbamoyl groups (e.g., N-ethylcarbamoyl groups, N,N-dibutylcarbamoyl group), halogenated alkoxy groups (e.g., trifluoromethyloxy group), halogenated aryloxy groups (e.g., pentafluorophenyloxy group), sulfonyloxy groups (e.g., methylsulfonyloxy group), halogenated alkylthio groups (e.g., difluoromethylthio group), aryl groups substituted by two or more electron-withdrawing groups having a σp value of not smaller than 0.15 (e.g., 2,4-dinitrophenyl group, pentafluorophenyl group), and heterocyclic groups (e.g., 2-benzooxazolyl group, 2-benzothiazolyl group, 1-phenyl-2-benzoimidazolyl group), in addition to the aforementioned groups.

Specific examples of the electron-withdrawing group having a σp value of not smaller than 0.20 include halogen atoms, in addition to the aforementioned groups.

Referring to a particularly preferred combination of azo dyes represented by the general formula (M-I), $R^5$ and $R^6$ each are preferably a hydrogen atom, alkyl group, aryl group, heterocyclic group, sulfonyl group or acyl group, more preferably hydrogen atom, aryl group, heterocyclic group or sulfonyl group, most preferably hydrogen atom, aryl group or heterocyclic group, with the proviso that $R^5$ and $R^6$ are not a hydrogen atom at the same time.

$G^1$ is preferably a hydrogen atom, halogen atom, alkyl group, hydroxyl group, amino group or acylamino group, more preferably hydrogen atom, halogen atom, amino group or acylamino group, most preferably hydrogen atom, amino group or acylamino group.

$A^1$ is preferably a pyrazole rings imidazole ring, isothiazole ring, thiadiazole ring or benzothiazole ring, more preferably pyrazole ring or isothiazole ring, most preferably pyrazole ring.

$B^1$ and $B^2$ are =$CR^1$— and —$CR^2$=, respectively, in which $R^1$ and $R^2$ each are preferably a hydrogen atom, alkyl group, halogen atom, cyano group, carbamoyl group, carboxyl group, hydroxyl group, alkoxy group or alkoxycarbonyl group, more preferably hydrogen atom, alkyl group, carboxyl group, cyano group or carbamoyl group.

Referring to a preferred combination of substituents on the compound represented by the general formula (M-I), at least one of the various substituents is preferably a compound which is a preferred group as mentioned above. More preferably, more of the various substituents are compounds which are preferred groups as mentioned above. Most preferably, all the various substituents are compounds which are preferred groups as mentioned above.

Specific examples of the compound (azo dye) represented by the general formula (M-I) will be given below, but the azo dye to be used herein is not limited thereto.

TABLE 1
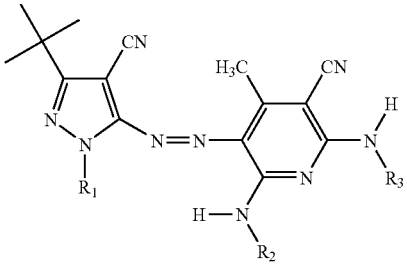
| | R₁ | R₂ | R₃ |
|---|---|---|---|
| a-1 | 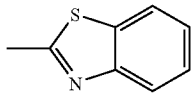 | 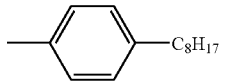 | 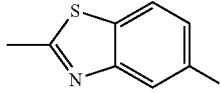 |
| a-2 | 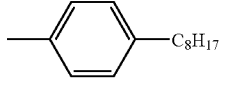 | 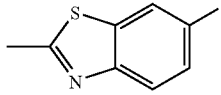 | 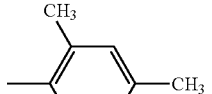 |
| a-3 | 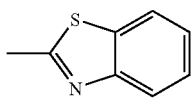 | 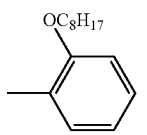 | 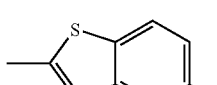 |
| a-4 | 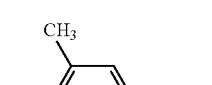 | | |
| a-5 | | | |

TABLE 2
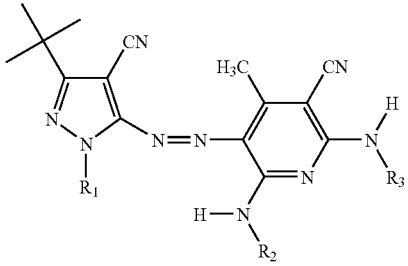
| | R₁ | R₂ | R₃ |
|---|---|---|---|
| a-6 | 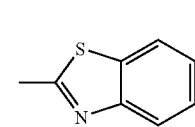 | 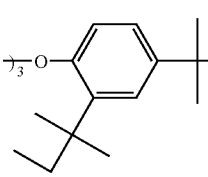 | 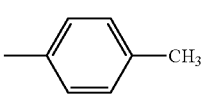 |
| a-7 | 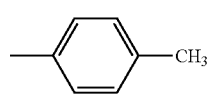 | 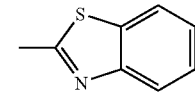 | 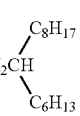 |
| a-8 | 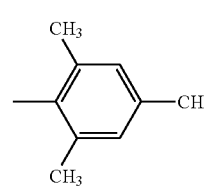 | 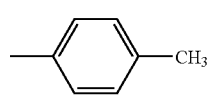 | 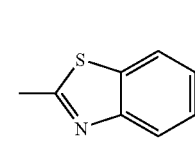 |
| a-9 | 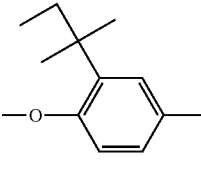 | 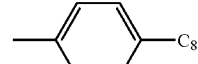 | $C_8H_{17}(t)$ |
| a-10 | 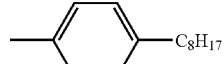 | 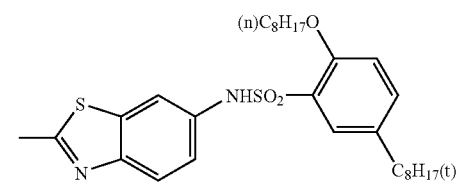 | 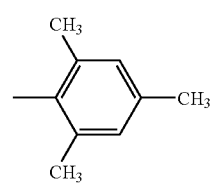 |

TABLE 3
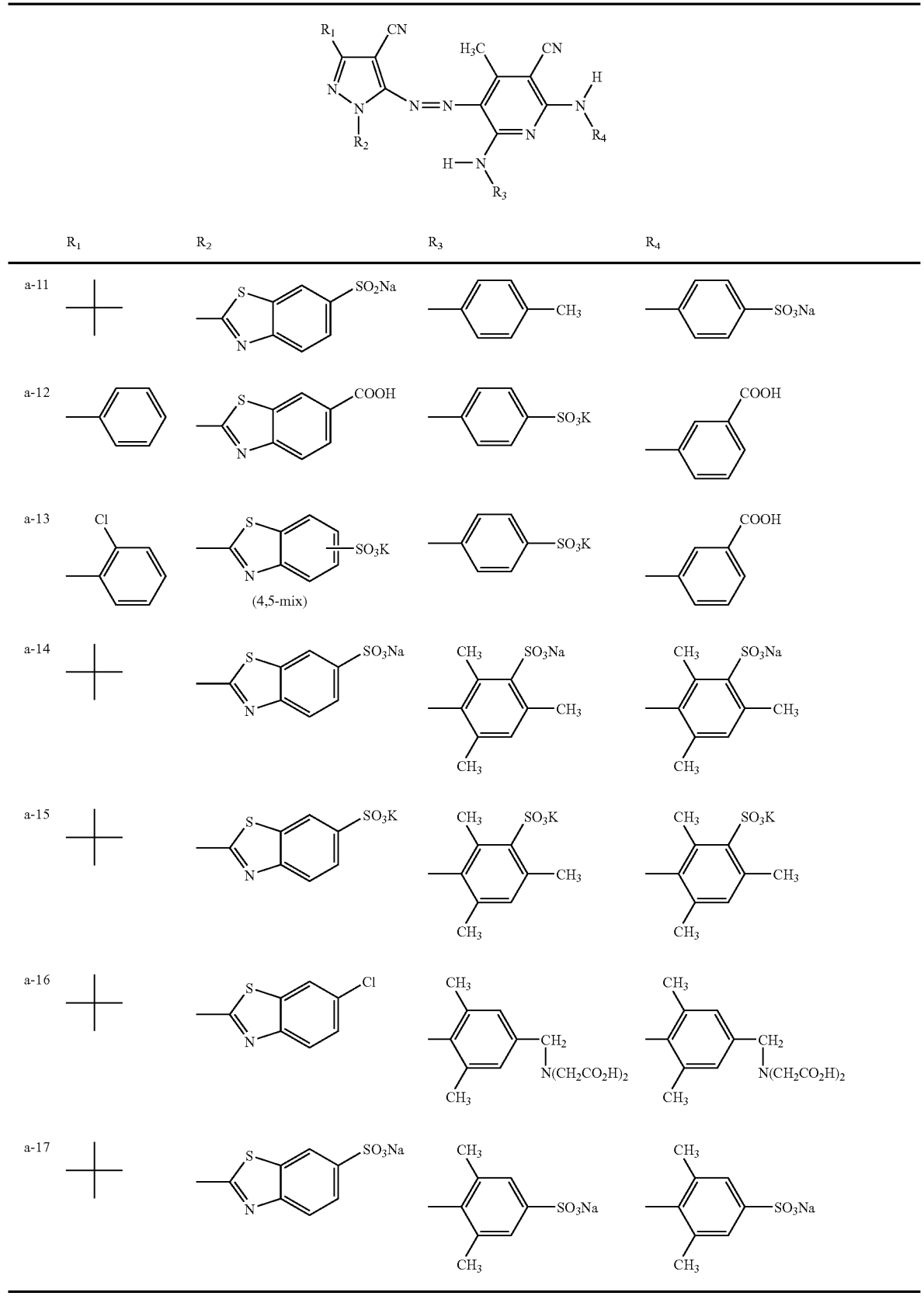

TABLE 4
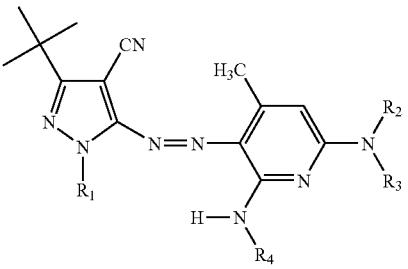
| | $R_1$ | $R_2$ | $R_3$ | $R_4$ |
|---|---|---|---|---|
| a-18 | 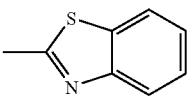 | 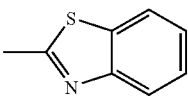 | 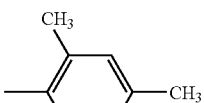 | 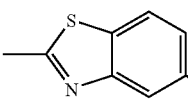 |
| a-19 |  | —SO$_2$CH$_3$ | 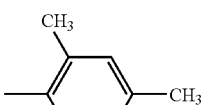 | 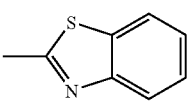 |
| a-20 |  | —COCH$_3$ | C$_8$H$_{17}$(t) | C$_8$H$_{17}$(t) |
| a-21 |  | —SO$_2$CH$_3$ | 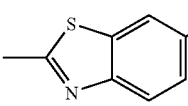 | C$_8$H$_{17}$(t) |
| a-22 |  | H | 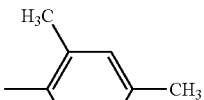 | 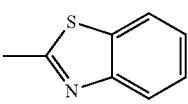 |
| a-23 | 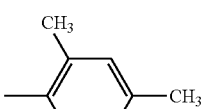 | H | 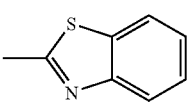 | 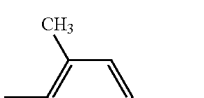 |
| a-24 | 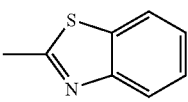 | H | 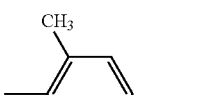 | 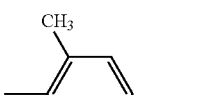 |

TABLE 4-continued
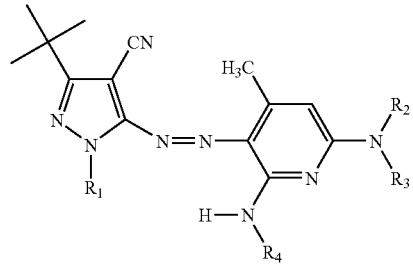
| | R₁ | R₂ | R₃ | R₄ |
|---|---|---|---|---|
| a-25 | 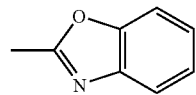 | 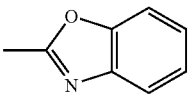 | 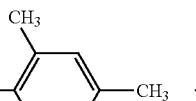 | 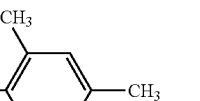 |
TABLE 5
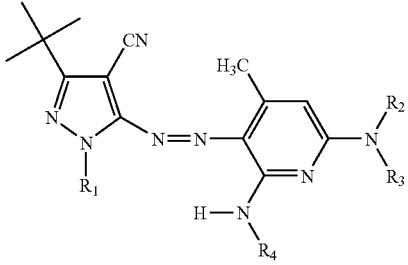
| | R₁ | R₂ |
|---|---|---|
| a-26 | 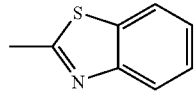 | 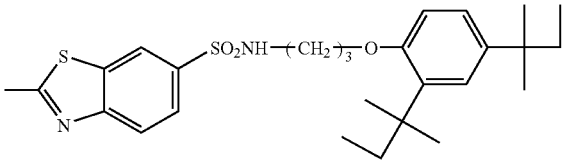 |
| a-27 | 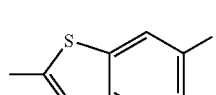 | 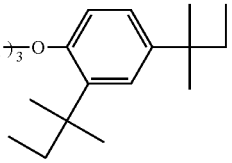 |
| a-28 | 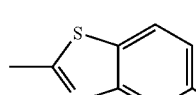 | 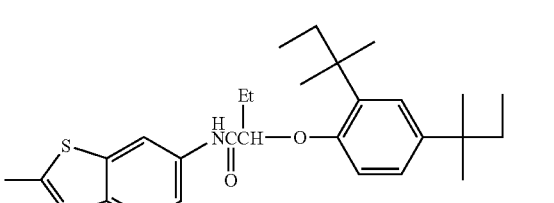 |
| a-29 | 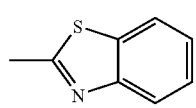 | 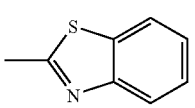 |

TABLE 5-continued
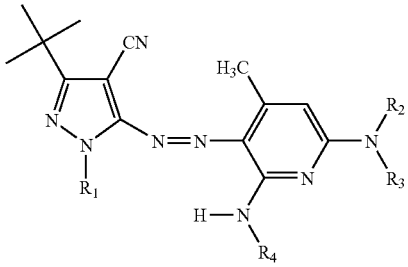
| | | R₃ | R₄ |
|---|---|---|---|
| a-30 | 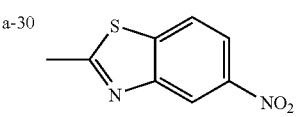 | | 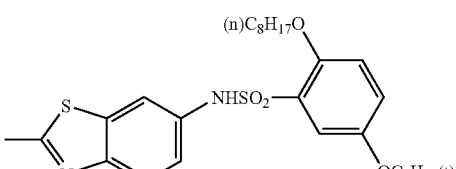 |
| a-31 | 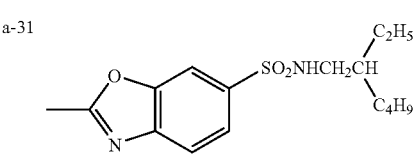 | | 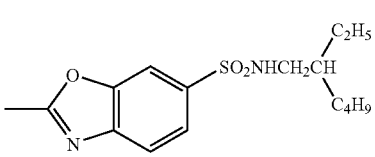 |
| | a-26 | 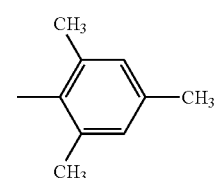 | 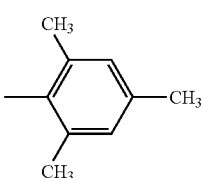 |
| | a-27 | 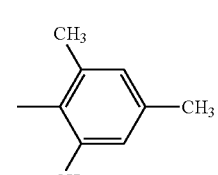 | 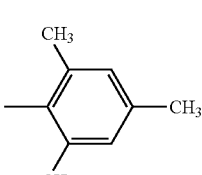 |
| | a-28 | 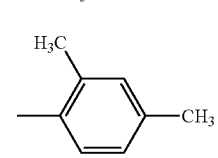 | 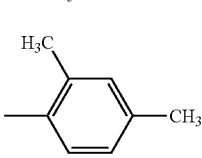 |
| | a-29 | 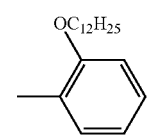 | 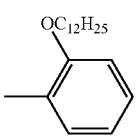 |
| | a-30 | 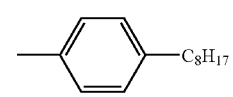 | $C_8H_{17}(t)$ |
| | a-31 | 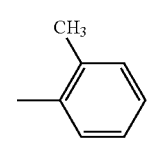 | 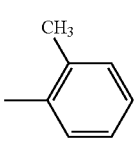 |

TABLE 6
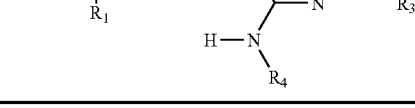
| | $R_1$ | $R_2$ |
|---|---|---|
| a-32 | 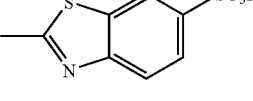 | 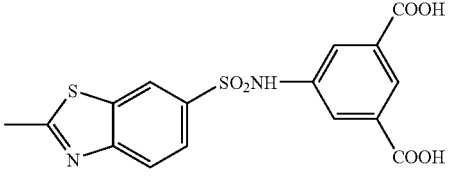 |
| a-33 | 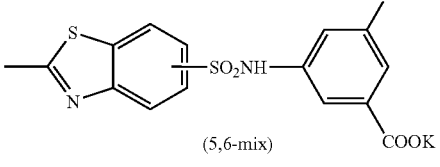 | 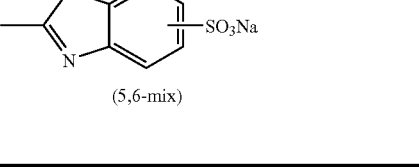 |
| a-34 | 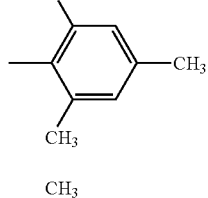 (5,6-mix) | 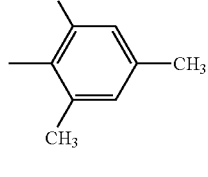 (5,6-mix) |
| a-35 | 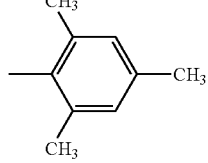 (5,6-mix) | (5,6-mix) |
| | $R_3$ | $R_4$ |
|---|---|---|
| a-32 | mesityl (2,4,6-triMe-C6H2) | mesityl |
| a-33 | mesityl | mesityl |
| a-34 | mesityl | mesityl |

TABLE 6-continued

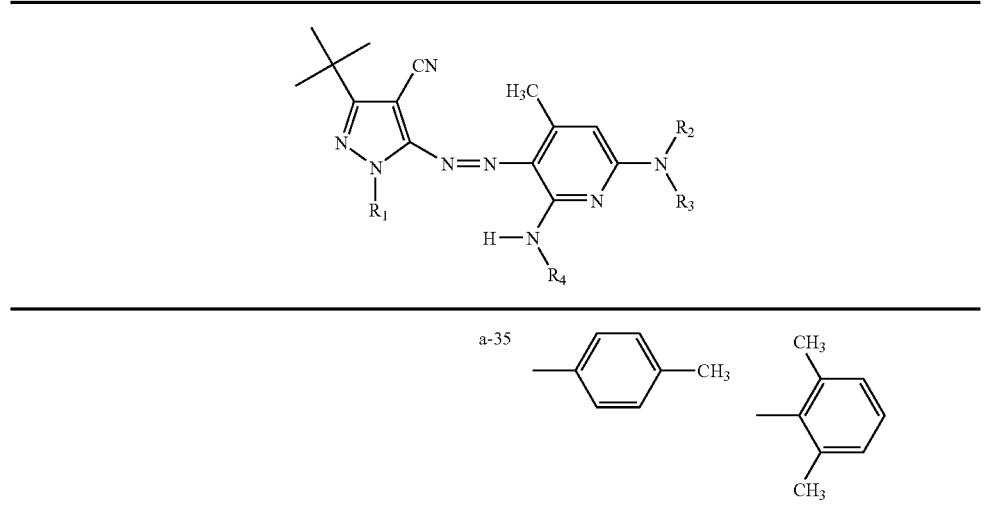

| | | |
|---|---|---|
| a-35 | ![p-tolyl] | ![2,6-dimethylphenyl] |

TABLE 7

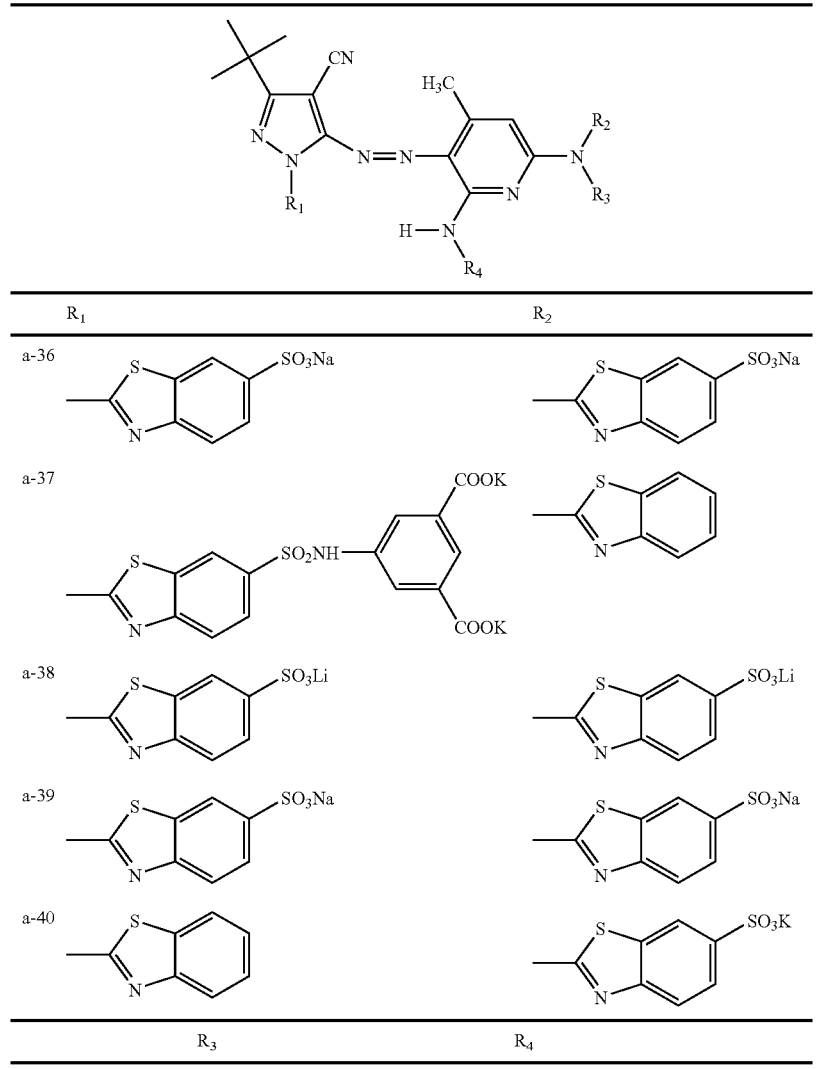

| | $R_1$ | $R_2$ |
|---|---|---|
| a-36 | 2-methylbenzothiazole-6-SO$_3$Na | 2-methylbenzothiazole-6-SO$_3$Na |
| a-37 | 2-methylbenzothiazole-6-SO$_2$NH-(3,5-di-COOK-phenyl) | 2-methylbenzothiazole |
| a-38 | 2-methylbenzothiazole-6-SO$_3$Li | 2-methylbenzothiazole-6-SO$_3$Li |
| a-39 | 2-methylbenzothiazole-6-SO$_3$Na | 2-methylbenzothiazole-6-SO$_3$Na |
| a-40 | 2-methylbenzothiazole | 2-methylbenzothiazole-6-SO$_3$K |

| $R_3$ | $R_4$ |
|---|---|

TABLE 7-continued
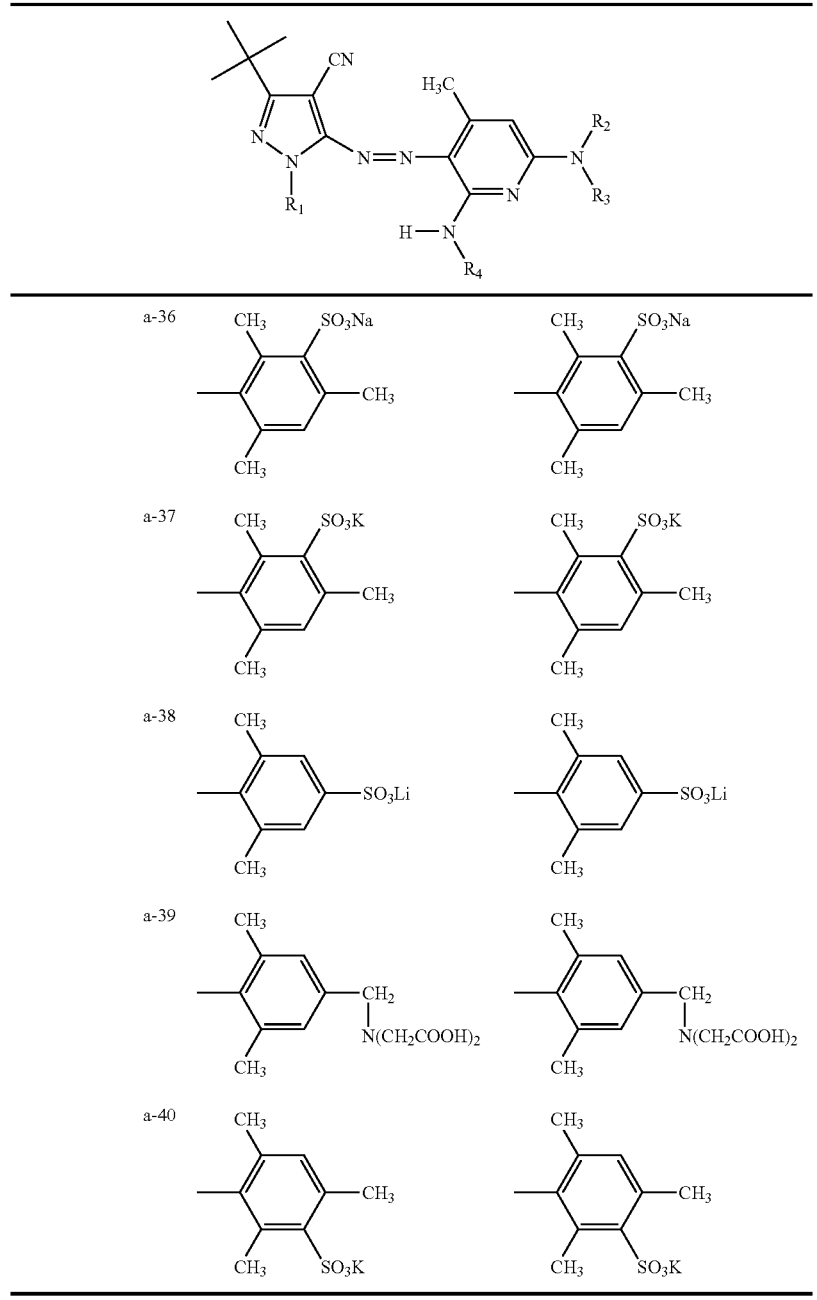
TABLE 8
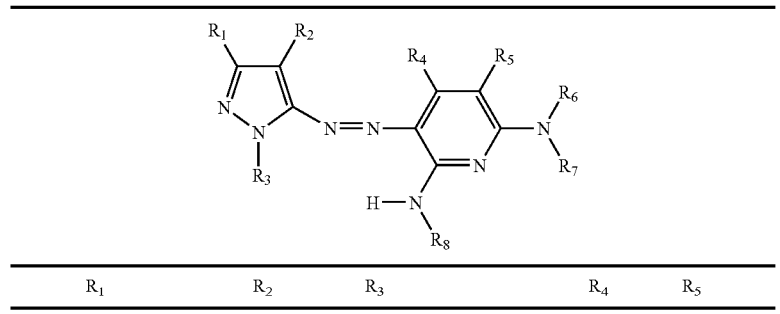
| $R_1$ | $R_2$ | $R_3$ | $R_4$ | $R_5$ |
|---|---|---|---|---|

TABLE 8-continued
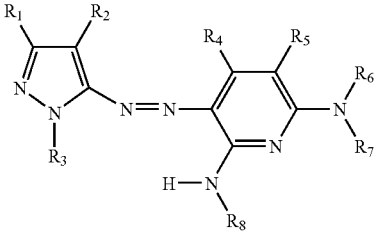
| | R₁ | R₂ | R₄ | R₅ |
|---|---|---|---|---|
| a-41 | 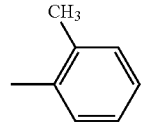 | CN | 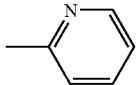 | H | CONH₂ |
| a-42 | 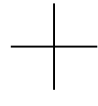 | Br | 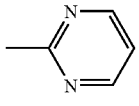 | COOEt | H |
| a-43 | 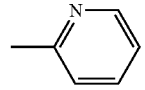 | SO₂CH₃ | 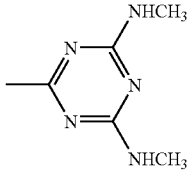 | CONH₂ | H |
| a-44 | 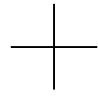 | CN | 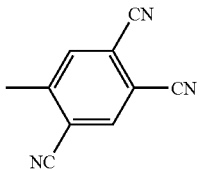 | H | H |
| a-45 | 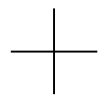 | Br | 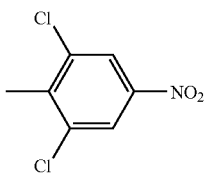 | H | CONH₂ |
| a-46 | 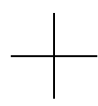 | CN | 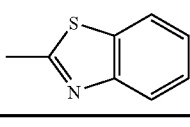 | CH₃ | H |
| | R₆ | R₇ | R₈ |
|---|---|---|---|
| a-41 | SO₂CH₃ | 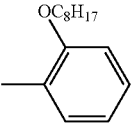 | 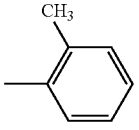 |
| a-42 | 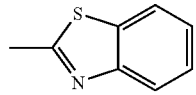 | C₈H₁₇(t) | COCH₂ |
| a-43 | 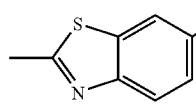 | 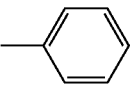 | 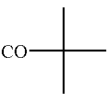 |

TABLE 8-continued
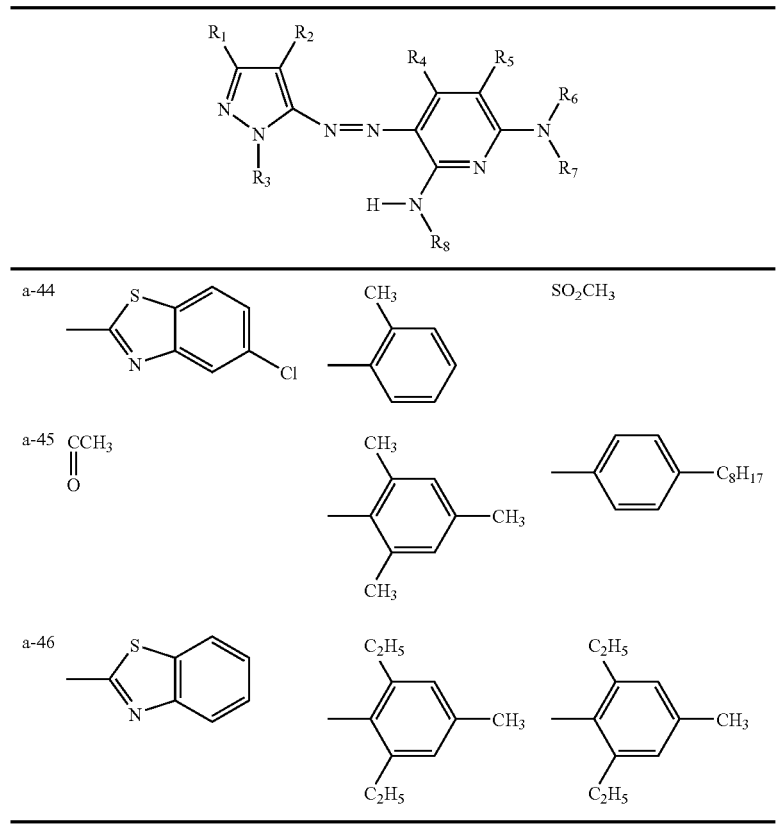
TABLE 9
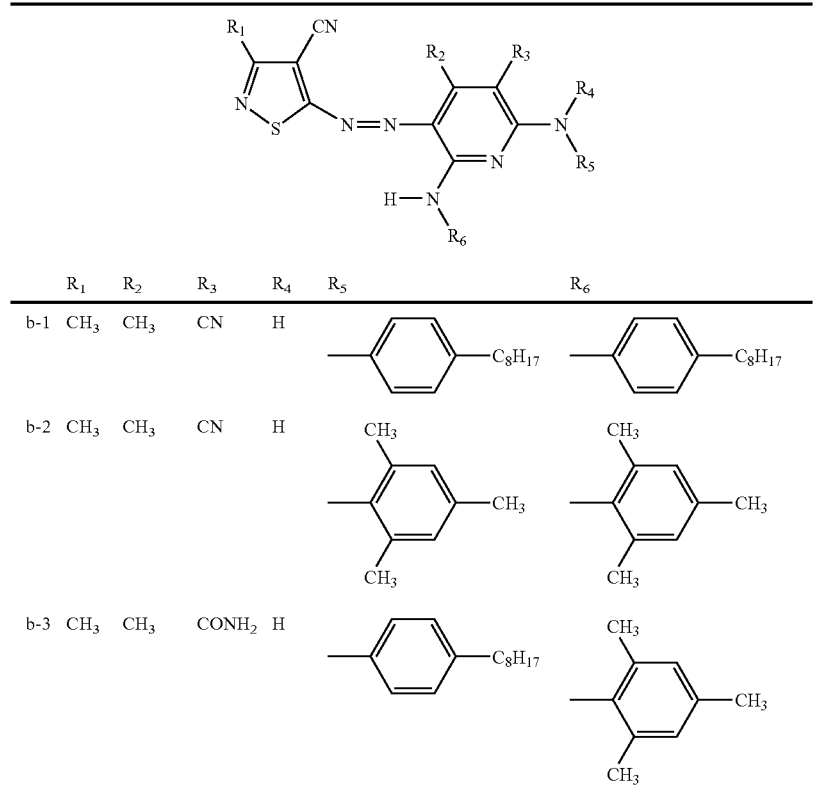

TABLE 9-continued

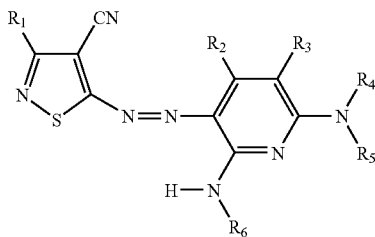

| | $R_1$ | $R_2$ | $R_3$ | $R_4$ | $R_5$ | $R_6$ |
|---|---|---|---|---|---|---|
| b-4 | CH$_3$ | CH$_3$ | H | H | 2,3,4,6-tetramethyl-5-SO$_3$U-phenyl | 2,3,4,6-tetramethyl-5-SO$_3$U-phenyl |
| b-5 | CH$_3$ | H | CN | H | 4-SO$_2$Na-phenyl | 4-SO$_2$Na-phenyl |

TABLE 10

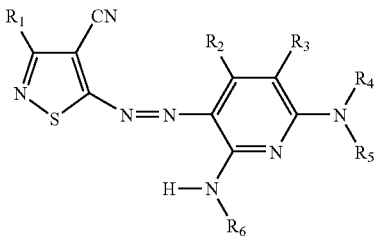

| | $R_1$ | $R_2$ | $R_3$ | $R_4$ | $R_5$ | $R_6$ |
|---|---|---|---|---|---|---|
| b-6 | CH$_3$ | CH$_3$ | H | benzothiazol-2-yl | 2,3,4,6-tetramethyl-5-CH$_2$N(CH$_2$CO$_2$K)$_2$-phenyl | 2,3,4,6-tetramethyl-5-CH$_2$N(CH$_2$CO$_2$K)$_2$-phenyl |
| b-7 | CH$_3$ | CH$_3$ | H | benzothiazol-2-yl | 2,4,5-trimethylphenyl | 4-C$_8$H$_{17}$-phenyl |
| b-8 | CH$_3$ | H | H | SO$_2$CH$_3$ | 3-methyl-4-SO$_3$Na-phenyl | 3-methyl-4-SO$_3$Na-phenyl |

TABLE 11
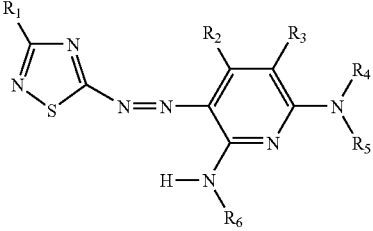
| | $R_1$ | $R_2$ | $R_3$ | $R_4$ |
|---|---|---|---|---|
| c-1 | —SCH$_3$ | CH$_3$ | CN | H |
| c-2 | 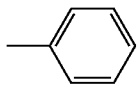 | H | CONH$_2$ | H |
| c-3 |  | CH$_3$ | H | 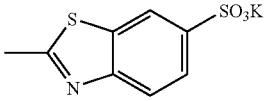 |
| c-4 | —CH$_3$ | CH$_3$ | H | 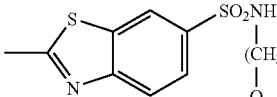 |
| c-5 | 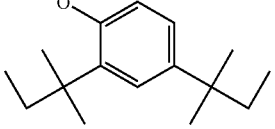 | H | H | 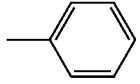 |
| | $R_5$ | $R_6$ |
|---|---|---|
| c-1 | C$_8$H$_{17}$(t) | 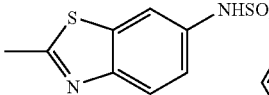 |
| c-2 | 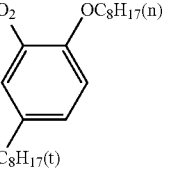 |  |
| c-3 | 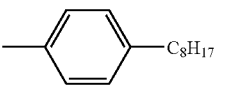 | 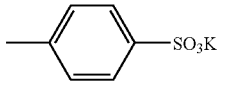 |
| c-4 |  | 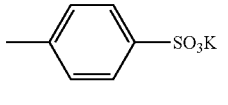 |

TABLE 11-continued

[Structure: 1,2,4-thiadiazole (R₁ at 3-position) connected via N=N azo linkage to pyridine ring having R₂, R₃, NR₄R₅, and NHR₆ substituents]

| | R₁ | R₂ | R₃ | R₄ | R₅ | R₆ |
|---|---|---|---|---|---|---|
| c-5 | | | | | CH₃ | 2,4,6-trimethylphenyl | C₈H₁₇(t) |

Note: c-5 row — R₄ = 2,4,6-trimethylphenyl (mesityl), R₅ = C₈H₁₇(t)

TABLE 12

[Structure: 1,3,4-thiadiazole (R¹ at 5-position) connected via N=N azo linkage to pyridine ring having R², R³, NR⁴R⁵, and NHR⁶ substituents]

| | $R_1$ | $R_2$ | $R_3$ | $R_4$ | $R_5$ | $R_6$ |
|---|---|---|---|---|---|---|
| d-1 | Me | CH₃ | CN | H | 4-(SO₃K)phenyl | 4-(SO₃K)phenyl |
| d-2 | Me | CH₃ | CN | H | 3,5-diethyl-4-methylphenyl | 3,5-diethyl-4-methylphenyl |
| d-3 | Me | H | H | 2-benzothiazolyl | 2,4,6-trimethyl-3-sulfo(K)phenyl | 2,4,6-trimethyl-3-sulfo(K)phenyl |
| d-4 | Ph | CH₃ | CONH₂ | H | 4-C₈H₁₇-phenyl | 4-C₈H₁₇-phenyl |

TABLE 12-continued

[Structure: thiadiazole-azo-pyridine with R1 on thiadiazole; R2, R3 on pyridine; R4, R5 on amine; R6 on NH]

| | R₁ | R₂ | R₃ | R₄ | R₅ | R₆ |
|---|---|---|---|---|---|---|
| d-5 | Ph | CH₃ | H | 2-methylbenzothiazol-6-yl-SO₂NH-(CH₂)₃-O-(2,4-di-tert-pentylphenyl) | 4-(n-OC₄H₉)phenyl | 2,4-di(C₂H₅)-3,5-di(CH₃)phenyl (2,4-diethyl-3,5-dimethylphenyl... actually 2,5-di-C₂H₅-3,4,6-tri... ) |

TABLE 13

[Structure: benzothiazole-azo-pyridine, R1 on benzothiazole ring, R2, R3 on pyridine, R4, R5 on amine, R6 on NH]

| | R₁ | R₂ | R₃ | R₄ | R₅ | R₆ |
|---|---|---|---|---|---|---|
| e-1 | 5-Cl | CH₃ | CONH₂ | H | C₈H₁₇(t) | C₈H₁₇(t) |
| e-2 | 5,6-diCl | H | H | 2-methylbenzothiazol-yl | 4-C₈H₁₇-phenyl | 4-C₈H₁₇-phenyl |
| e-3 | 5,6-diCl | CH₃ | H | 2-methylbenzothiazol-yl | 2,3,5-tri(CH₃)phenyl | COCH₃ |
| e-4 | 5-CH₃ | H | CN | H | 4-(SO₃K)phenyl | 4-(SO₃K)phenyl |
| e-5 | 5-NO₂ | CH₃ | H | SO₂CH₃ | 2-methylphenyl | 3,5-di(CH₃)phenyl |

TABLE 13-continued

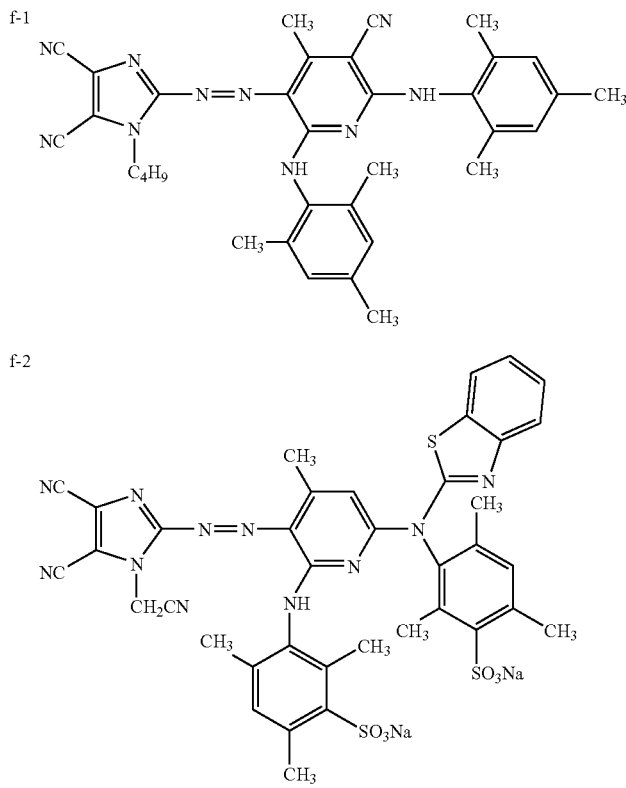

The preferred magenta ink composition comprises at least one of the azo dyes (M-1) dissolved and/or dispersed in an aqueous medium preferably in an amount of from 0.2% to 20% by weight, more preferably from 0.5% to 15% by weight.

The azo dye (M-1) to be used in the invention is substantially water-soluble. The term "substantially water-soluble" as used herein is meant to indicate that the azo dye is dissolved in 20° C. water in an amount of not smaller than 2% by weight.

The magenta ink composition may comprise other magenta dyestuffs incorporated therein in combination with the azo dye (M-1).

Examples of magenta dyestuffs include aryl or heterylazo dyestuffs (other than the azo dye of the general formula (M-I) of the invention) having phenols, naphthols or anilines as coupling components, azomethine dyestuffs having pyrazolones or pyrazolotriazoles as coupling components, methine dyestuffs such as arylidene dyestuff, styryl dyestuff, melocyanine dyestuff and oxonol dyestuff, carbonium dyestuffs such as diphenylmethane dyestuff, triphenylmethane dyestuff and xanthene dyestuff, quinone-based dyestuffs such as naphthoquinone, anthraquinone and anthrapyridone, and condensed polycyclic dyestuffs such as dioxazine dyestuff. These dyestuffs may assumes magenta only when chromophore is partly dissociated. In this case, the counter cation may be an inorganic cation such as alkaline metal ion and ammonium ion or an organic cation such as pyridinium ion and quaternary ammonium salt ion or may be contained in a polymer cation as a partial structure.

The coloring agent to be used as a cyan ink in the invention preferably comprises an electron-withdrawing group incorporated in its phthalocyanine skeleton to have an oxidation potential of higher than 1.0 V (vs SCE) in order to deteriorate the reactivity with an oxidizing gas such as ozone gas. The oxidation potential of the coloring agent is preferably higher, more preferably higher than 1.1 V (vs SCE), most preferably higher than 1.2 V (vs SCE).

The oxidation potential value (Eox) can be easily measured by those skilled in the art. For the details of the method for measuring the oxidation potential, reference can be made to P. Delahay, "New Instrumental Methods in Electrochemistry", Interscience Publishers, 1954, A. J. Bard, "Electrochemical Methods", John Wiley & Sons, 1980, and Akiya Fujishima, "Denki Kagaku Sokuteiho (Electrochemical Measuring Method)", Gihodo Shuppansha, 1984.

In some detail, the measurement of oxidation potential is carried out by dissolving the test specimen in a solvent containing a supporting electrolyte such as sodium perchlorate and tetrapropylammonium perchlorate in a concentration of from $1\times10^{-4}$ to $1\times10^{-6}$ mol/l, and then measuring the test solution for oxidation potential with respect to SCE (saturated calomel electrode) using cyclic voltammetry or DC polarography. This value may deviate by scores of millivolts due to the effect of difference in potential between solutions or resistivity of test solution. However, the incorporation of a standard specimen (e.g., hydroquinone) makes it possible to assure the reproducibility of potential.

In order to unequivocally define potential, the potential (vs SCE) measured in dimethylformamide containing 0.1 mol dm$^{-3}$ of tetrapropylammonium perchlorate as a supporting electrolyte (concentration of dye: 0.001 mol dm$^{-3}$) using DC polarography is defined as oxidation potential of dye.

The value of Eox (oxidation potential) indicates the transferability of electrons from the specimen to the electrode. The greater this value is (the higher the oxidation potential is), the more difficultly can be transferred electrons from the specimen to the electrode, i.e., the more difficultly can be oxidized the specimen. With regard to the structure of the compound, the incorporation of electron-withdrawing group causes the oxidation potential to be higher while the incorporation of electron-donative group causes the oxidation potential to be lower. In the invention, in order to deteriorate the reactivity with ozone, which is an electron-withdrawing agent, it is preferred that an electron-withdrawing group be incorporated in the phthalocyanine skeleton to cause the oxidation potential to be higher. The use of Hammett's substituent constant σp, which is a measure of the electron withdrawing properties or electron providing properties of substituents, makes it possible to tell that the incorporation of substituents having a great σp value such as sulfinyl group, sulfonyl group and sulfamoyl group makes it possible to cause the oxidation potential to be higher.

In the invention, the phthalocyanine dye represented by the general formula (C-I) is particularly preferred.

The compound of the general formula (C-I) to be used in the invention will be further described hereinafter.

In the general formula (C-I), $X_1$, $X_2$, $X_3$ and $X_4$ each independently represent —SO—Z, —SO$_2$—Z, —SO$_2$NR$_1$R$_2$, sulfo group, —CONR$_1$R$_2$ or —CO$_2$R$_1$. Preferred among these substituents are —SO—Z, —SC—Z, —SO$_2$NR$_1$R$_2$ and —CONR$_1$R$_2$. Particularly preferred among these substituents are —SO$_2$—Z and —SO$_2$NR$_1$R$_2$. Most desirable among these substituents is —SO$_2$—Z. In the case where any of $a_1$ to $a_4$ and $b_1$ to $b_4$, which represent the number of substituents on $X_1$ to $X_4$ and $Y_1$ to $Y_4$, represents a number of not smaller than 2, the plurality of $X_1$'s to $X_4$'s may be the same or different and each independently represent any of the aforementioned groups. Alternatively, $X_1$, $X_2$, $X_3$ and $X_4$ may be the same substituent. Alternatively, $X_1$, $X_2$, $X_3$ and $X_4$ each may be —SO$_2$—Z in which Z differs among $X_1$, $X_2$, $X_3$ and $X_4$. Thus, $X_1$, $X_2$, $X_3$ and $X_4$ each may be a substituent of the same kind but partially different. Alternatively, $X_1$, $X_2$, $X_3$ and $X_4$ may be different substituents, e.g., —SO$_2$—Z, —SO$_2$NR$_1$R$_2$.

Z each independently represents a substituted or unsubstituted alkyl group, substituted or unsubstituted cycloalkyl group, substituted or unsubstituted alkenyl group, substituted or unsubstituted aralkyl group, substituted or unsubstituted aryl group and 0substituted heterocyclic group. Preferred among these groups are substituted or unsubstituted alkyl group, substituted or unsubstituted aryl group and substituted or unsubstituted heterocyclic group. Particularly preferred among these groups are substituted alkyl group, substituted aryl group and substituted heterocyclic group.

$R_1$ and $R_2$ each independently represent a hydrogen atom, substituted or unsubstituted alkyl group, substituted or unsubstituted cycloalkyl group, substituted or unsubstituted alkenyl group, substituted or unsubstituted aralkyl group, substituted or unsubstituted aryl group or substituted or unsubstituted heterocyclic group. Preferred among these groups are hydrogen atom, substituted or unsubstituted alkyl group, substituted or unsubstituted aryl group or substituted or unsubstituted heterocyclic group. Particularly preferred among these groups are hydrogen atom, substituted alkyl group, substituted aryl group or substituted heterocyclic group. However, it is not preferred that $R_1$ and $R_2$ are a hydrogen atom at the same time.

The substituted or unsubstituted alkyl group represented by $R_1$, $R_2$ or Z is preferably a $C_1$–$C_{30}$ alkyl group. Particularly from the reason of enhancement of dye solubility or ink stability, the alkyl group is preferably branched. It is particularly preferred that the alkyl group have a symmetric carbons (used in racemate form). Examples of the substituents on the alkyl group include those listed with reference to the case where Z, $R_1$, $R_2$, $Y_1$, $Y_2$, $Y_3$ and $Y_4$ are able to have further substituents as described later. Particularly preferred among these substituents are hydroxyl group, ether group, ester group, cyano group, amide group and sulfonamide group because they enhance the association of dyes and hence the fastness thereof. Alternatively, the alkyl group may have a halogen atom or ionic hydrophilic group. The number of carbon atoms in the alkyl group doesn't include that of carbon atoms in the substituents. This can apply to other groups.

The substituted or unsubstituted cycloalkyl group represented by $R_1$, $R_2$ or Z is preferably a $C_5$–$C_{30}$ cycloalkyl group. Particularly from the reason of enhancement of dye solubility or ink stability, it is particularly preferred that the cycloalkyl group have asymmetric carbons (used in racemate form). Examples of the substituents on the cycloalkyl group include those listed with reference to the case where Z, $R_1$, $R_2$, $Y_1$, $Y_2$, $Y_3$ and $Y_4$ are able to have further substituents as described later. Particularly preferred among these substituents are hydroxyl group, ether group, ester group, cyano group, amide group and sulfonamide group because they enhance the association of dyes and hence the fastness thereof. Alternatively, the cycloalkyl group may have a halogen atom or ionic hydrophilic group.

The substituted or unsubstituted alkenyl group represented by $R_1$, $R_2$ or Z is preferably a $C_2$–$C_{30}$ alkenyl group. Particularly from the reason of enhancement of dye solubility or ink stability, the alkenyl group is preferably branched. It is particularly preferred that the alkenyl group have asymmetric carbons (used in racemate form). Examples of the substituents on the alkenyl group include those listed with reference to the case where Z, $R_1$, $R_2$, $Y_1$, $Y_2$, $Y_3$ and $Y_4$ are able to have further substituents as described later. Particularly preferred among these substituents are hydroxyl group, ether group, ester group, cyano group, amide group and sulfonamide group because they enhance the association of dyes and hence the fastness thereof. Alternatively, the alkenyl group may have a halogen atom or ionic hydrophilic group.

The substituted or unsubstituted aralkyl group represented by $R_1$, $R_2$ or Z is preferably a $C_7$–$C_{30}$ aralkyl group. Particularly from the reason of enhancement of dye solubility or ink stability, the aralkyl group is preferably branched. It is particularly preferred that the aralkyl group have asymmetric carbons (used in racemate form). Examples of the substituents on the aralkyl group include those listed with reference to the case where Z, $R_1$, $R_2$, $Y_1$, $Y_2$, $Y_3$ and $Y_4$ are able to have further substituents as described later. Particularly preferred among these substituents are hydroxyl group, ether group, ester group, cyano group, amide group and sulfonamide group because they enhance the association of dyes and hence the fastness thereof. Alternatively, the aralkyl group may have a halogen atom or ionic hydrophilic group.

The substituted or unsubstituted aryl group represented by $R_1$, $R_2$ or Z is preferably a $C_6$–$C_{30}$ aryl group. Examples of the substituents on the aryl group include those listed with reference to the case where Z, $R_1$, $R_2$, $Y_1$, $Y_2$, $Y_3$ and $Y_4$ are able to have further substituents as described later. In particular, en electron-withdrawing group is preferred because it causes the oxidation potential of the dye to be higher and thus enhances the fastness thereof. Examples of the electron-withdrawing group include those having a positive Hammett's substituent constant σp. Preferred examples of the electron-withdrawing group include halogen atom, heterocyclic group, cyano group, carboxyl group, acylamino group, sulfonamide group, sulfamoyl group, carbamoyl group, sulfonyl group, imide group, acyl group, sulfo group, and quaternary ammonium group. Particularly preferred among these electron-withdrawing groups are cyano group, carboxyl group, sulfamoyl group, carbamoyl group, sulfonyl group, imide group, acyl group, sulfo group, and quaternary ammonium group.

The heterocyclic group represented by $R_1$, $R_2$ or $Z$ is preferably a 5- or 6-membered heterocyclic group which may be further condensed. The heterocyclic group may be an aromatic heterocyclic group or non-aromaticheterocyclic group. The heterocyclic group represented by $R_1$, $R_2$ or $Z$ will be exemplified in the form of heterocyclic ring with its substitution position omitted. However, the substitution position is not limited. For example, pyridine may have substituents on the 2-, 3- or 4-position. Examples of the heterocyclic ring include pyridine, pyrazine, pyrimidine, pyridazine, triazine, quinoline, isoquinoline, quinazoline, cinnoline, phthaladine, quinoxaline, pyrrole, indole, furane, benzofurane, thiophene, benzothiophene, pyrazole, imidazole, benzimidazole, triazole, oxazole, benzoxaole, thiazole, benzothiazole, isothiazole, benzisothiazole, thiadiazole, isooxazole, benzisooxazole, pyrrolidine, piperidine, piperazine, imidazolidine, and thiazoline. In particular, aromatic heterocyclic groups are preferred. Preferred examples of the aromatic heterocyclic groups include pyridine, pyrazine, pyrimidine, pyridazine, triazine, pyrazole, imidazole, benzigdazole, triazole, thiazole, benzothiazole, isothiazole, benzisothiazole, and thiadiazole. These aromatic heterocyclic groups may have substituents. Examples of the substituents on the aromatic heterocyclic group include those listed with reference to the case where $Z$, $R_1$, $R_2$, $Y_1$, $Y_2$, $Y_3$ and $Y_4$ are able to have further substituents as described later. Preferred examples of the substituents include those listed with reference to the aforementioned aryl group. Even more desirable examples of the substituents include those listed with reference to the aforementioned aryl group.

$Y_1$, $Y_2$, $Y_3$ and $Y_4$ each independently represent a hydrogen atom, halogen atom, alkyl group, cycloalkyl group, alkenyl group, aralkyl group, aryl group, heterocyclic group, cyano group, hydroxyl group, nitro group, amino group, alkylamino group, alkoxy group, aryloxy group, acylamino group, arylamino group, ureide group, sulfamoyl group, alkylthio group, arylthio group, alkoxycarbonylamino group, sulfonamide group, carbamoyl group, sulfamoyl group, sulfonyl group, alkoxycarbonyl group, heterocyclic oxy group, azo group, acyloxy group, carbamoyloxy group, silyloxy group, aryloxycarbonyl group, aryloxycarbonylamino group, imide group, heterocyclic thio group, phosphoryl group, acyl group, carboxyl group or sulfo group which may further have substituents.

Preferred among these groups are hydrogen atom, halogen atom, alkyl group, aryl group, cyano group, alkoxy group, amide group, ureide group, sulfonamide group, carbamoyl group, sulfamoyl group, alkoxycarbonyl group, aroxyl group and sulfo group. Particularly preferred among these groups are hydrogen atom, halogen atom, cyano group, carboxyl group and sulfo group. Most desirable among these groups is hydrogen atom.

In the case where $Z$, $R_1$, $R_2$, $Y_1$, $Y_2$, $Y_3$ and $Y_4$ may further have substituents, they may further have the following substituents.

Examples of the substituents on $Z$, $R_1$, $R_2$, $Y_1$, $Y_2$, $Y_3$ and $Y_4$ include $C_1$–$C_{12}$ straight-chain or branched alkyl group, $C_7$–$C_{18}$ straight-chain or branched aralkyl group, $C_2$–$C_{12}$ straight-chain or branched alkenyl group, $C_2$–$C_{12}$ straight-chain or branched alkinyl group, $C_3$–$C_{12}$ straight-chain or branched cycloalkyl group, $C_3$–$C_{12}$ straight-chain or branched cycloalkenyl group (These groups each preferably have branches for the reason of dye solubility or ink stability. It is particularly preferred that these groups have asymmetric carbons. Specific examples of these groups include methyl group, ethyl group, propyl group, isopropyl group, sec-butyl group, t-butyl group, 2-ethylhexyl group, 2-methylsulfonylethyl group, 3-phenoxypropyl group, trifluoromethyl group, and cyclopentyl group), halogen atom (e.g., chlorine atom, bromine atom), aryl group (e.g., phenyl group, 4-t-butylphenyl group, 2,4-di-t-amylphenyl group), heterocyclic group (e.g., imidazolyl group, pyrazolyl group, triazolyl group, 2-furyl group, 2-chenyl group, 2-pyrimidinyl group, 2-benzothiazolyl group), cyano group, hydroxyl group, nitro group, carboxy group, amino group, alkyloxy group (e.g., methoxy group, ethoxy group, 2-methoxyethoxy group, 2-methanesulfohykethoxy group), aryloxy group (e.g., phenoxy group, 2-methylphenoxy group, 4-t-butylphenoxy group, 3-nitrophenoxy group, 3-t-butyloxycarbamoylphenoxy group, 3-methoxycarbamoyl group), acylaminio group (e.g., acetamide group, benzamide group, 4-(3-t-butyl-4-hydroxyphenoxy)butanamide group), alkyamino group (e.g., methylamino group, butylamino group, diethylamino group, methylbutylamino group), anilino group (e.g., phenylamino group, 2-chloroanilino group), ureide group (e.g., phenylureide group, methylureide group, N,N-dibutylureide group), sulfamoylamino group (e.g., N,N-dipropylsulfamoylamino group), alkylthio group (e.g., methylthio group, octylthio group, 2-phenoxyethylthio group), arylthio group (e.g., phenylthio group, 2-butoxy-5-t-octylphenylthio group, 2-carboxyphenylthio group), alkyloxycarbonylamino group (e.g., methoxycarbonylamino group), sulfonamide group (e.g., methanesulfonamide group, benzenesulfonamide group, p-toluenesulfonamide group), carbamoyl group (e.g., N-ethylcarbamoyl group, N,N-dibutylcarbamoyl group), sulfamoyl group (e.g., N-ethylsulfamoyl group, N,N-dipropylsulfamoyl group, N-phenylsulfamoyl group), sulfonyl group (e.g., methanesulfonyl group, octanesulfonyl group, benzenesulfonyl group, toluenesulfonyl group), alkyloxycarbonyl group (e.g., methoxycarbonyl group, butyloxycarbonyl group), heterocyclic oxy group (e.g., 1-phenyltetrazole-5-oxy group, 2-tetrahydropyranyloxy group), azo group (e.g., phenylazo group, 4-methoxyphenylazo group, 4-pivaloylaminophenylazo group, 2-hydroxy-4-propanoylphenylazo group), acyloxy group (e.g., acetoxy group), carbamoyloxy group (e.g., N-methylcarbamoyloxy group, N-phenylcarbamoyloxy group), silyloxy group (e.g., trimethylsilyloxy group, dibutylmethylsilyloxy group), aryloxycarbonylamino group (e.g., phenoxycarbonylamino group), imide group (e.g., N-succinimide group, N-phthalimide group), heterocyclic thio group (e.g., 2-benzothiazolylthio group, 2,4-di-phenoxy-1,3,5-triazole-6-thio group, 2-pyridylthio group), sulfinyl group (e.g., 3-phenoxypropylsulfinyl group), phosphonyl group (e.g., phenoxyphosphonyl group, octyloxyphosphonyl group, phenylphosphonyl group), aryloxycarbonyl group (e.g., phenoxycarbonyl group), acyl group (e.g., acetyl group, 3-phenylpropanoyl group, benzoyl group), and ionic hydrophilic group (e.g., carboxyl group, sulfo group, phosphono group, quaternary ammonium group).

The phthalocyanine dye represented by the general formula (C-I), if it is water-soluble, preferably has an ionic hydrophilic group. Examples of the ionic hydrophilic group include sulfo group, carboxyl group, phosphono group, and quaternary ammonium group. Preferred among these ionic hydrophilic groups are carboxyl group, phosphono group, and sulfo group. Particularly preferred among these ionic hydrophilic groups are carboxyl group and sulfo group. The carboxyl group, phosphono group and sulfo group may be used in the form of salt. Examples of the counter ion forming the salt include ammonium ion, alkaline metal ion (e.g., lithium ion, sodium ion, potassium ion), and organic cation (e.g., tetramethylammonium ion, tetramethylguanidium ion, tetramethylphosphonium ion). Preferred among these counter ions are alkaline metal ions. Particularly preferred among these counter ions is lithium ion because it enhances the dye solubility and hence the ink stability.

The number of ionic hydrophilic groups is preferably at least 2 per molecule of phthalocyanine-based dye. It is particularly preferred that there be contained at least two sulfo groups and/or carboxyl groups in the phthalocyanine-based dye.

The suffixes $a_1$ to $a_4$ and $b_1$ to $b_4$ represent the number of the substituents $X_1$ to $X_4$ and $Y_1$ to $Y_4$, respectively. The suffixes $a_1$ to $a_4$ each independently represent an integer of from 0 to 4, with the proviso that the suffixes $a_1$ to $a_4$ are not 0 at the same time. The suffixes $b_1$ to $b_4$ each independently represent an integer of from 0 to 4. When any of $a_1$ to $a_4$ and $b_1$ to $b_4$ its an integer of not smaller than 2, there are a plurality of any of $X_1$'s to $X_4$'s and $Y_1$'s to $Y_4$'s. They may be the same or different.

The suffixes $a_1$ and $b_1$ satisfy the equation $a_1+b_1=4$. In a particularly preferred combination, $a_1$ represents 1 or 2 while $b_1$ represents 3 or 2. In the best combination, $a_1$ represents 1 while $b_1$ represents 3.

The combinations $a_2$ and $b_2$, $a_3$ and $b_3$, and $a_4$ and $b_4$ are similar to the combination of $a_1$ and $b_1$. Preferred examples of the combinations $a_2$ and $b_2$, $a_3$ and $b_3$, and $a_4$ and $b_4$ are also similar to that of the combination of $a_1$ and $b_1$.

M represents a hydrogen atom, metal element or oxide, hydroxide or halide thereof.

Preferred examples of M other than hydrogen atom include metal elements such as Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb and Bi. Preferred examples of metal oxide include VO, and GeO. Preferred examples of metal hydroxide include $Si(OH)_2$, $Cr(OH)_2$, and $Sn(OH)_2$. Examples of metal halide include AlCl, $SiCl_2$, VCl, $VCl_2$, VOCl, FeCl, GaCl, and ZrCl. Preferred among these metal elements are Cu, Ni, Zn, and Al. Most desirable among these metal elements is Cu.

Pc (phthalocyanine ring) may form a diameter (e.g., Pc-M-L-M-Pc) or trimer with L (divalent connecting group) interposed therebetween. In this case, M's may be the same or different.

Preferred groups of the divalent connecting group represented by L include oxy group —O—, thio group —S—, carbonyl group —CO—, sulfonyl group —$SO_2$—, imino group —NH—, methylene group —CH2—, and group formed by combining these groups.

Referring to preferred combination of substituents on the compound represented by the general formula (C-I), the compound of the general formula (I-b) preferably has various substituents at least one of which is one of the preferred groups listed above. More preferably, more of the various substituents are the preferred groups listed above. Most preferably, all of the various substituents are the preferred groups listed above.

Preferred among the phthalocyanine dyes represented by the general formula (C-I) is a phthalocyanine dye having the structure represented by the general formula (C-II). The phthalocyanine dye represented by the general formula (C-II) which is particularly preferred in the invention will be described in detail hereinafter.

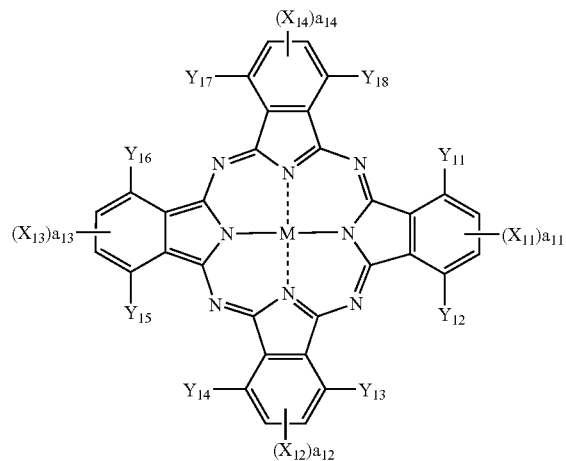

(C-II)

In the general formula (C-II), $X_{11}$ to $X_{14}$ and $Y_{11}$ to $Y_{18}$ and their preferred examples are as defined in the general formula (C-I). M and its preferred examples are as defined in the general formula (C-I).

In the general formula (C-II), $a_{11}$ to $a_{14}$ each independently represent an integer of from 1 or 2. Preferably, the sum of $a_{11}$ to $a_{14}$ is from not smaller than 4 to not greater than 6. It is particularly preferred that $a_{11}$ to $a_{14}$ be 1 at the same time.

$X_{11}$, $X_{12}$, $X_{13}$ and $X_{14}$ may be the same substituent. Alternatively, $X_{11}$, $X_{12}$, $X_{13}$ and $X_{14}$ each may be —$SO_2$—Z in which Z differs among $X_1$, $X_2$, $X_3$ and $X_4$. Thus, $X_{11}$, $X_{12}$, $X_{13}$ and $X_{14}$ each may be a substituent of the same kind but partially different. Alternatively, $X_{11}$, $X_{12}$, $X_{13}$ and $X_{14}$ may be different substituents, e.g., —$SO_2$—Z, —$SO_2NR_1R_2$.

Particularly preferred examples of the combination of substituents among the phthalocyanine dyes represented by the general formula (C-II) will be given below.

Preferably, $X_{11}$ to $X_{14}$ each independently represent —SO—Z, —$SO_2$—Z, —$SO_2NR_1R_2$ or —$CONR_1R_2$, particularly —$SO_2$—Z or —$SO_2NR_1R_2$, most preferably —$SO_2$—Z.

Z each independently represents a substituted or unsubstituted alkyl group, substituted or unsubstituted aryl group or substituted or unsubstituted heterocyclic group. Most desirable among these groups are substituted alkyl group, substituted aryl and substituted heterocyclic group. Particularly for the reason of enhancement of dye solubility or ink stability, it is preferred that the substituents have asymmetric carbons (used in racemate form). Further, for the reason of enhancement of association and hence fastness, it is preferred that the substituents have a hydroxyl group, ether group, ester group, cyano group, amide group or sulfonamide group incorporated therein.

$R_1$ and $R_2$ each independently represent a hydrogen atom, substituted or unsubstituted alkyl group, substituted or unsubstituted aryl group or substituted or unsubstituted heterocyclic group, particularly a hydrogen atom, substituted alkyl group, substituted aryl group or substituted heterocyclic group. However, it is not preferred that $R_1$ and $R_2$ each are a hydrogen atom at the same time. Particularly for the reason of enhancement of dye solubility or ink stability, it is preferred that the substituents have asymmetric carbons (used in racemate form). Further, for the reason of enhancement of association and hence fastness, it is preferred that the substituents have a hydroxyl group, ether group, ester group, cyano group, amide group or sulfonamide group incorporated therein.

$Y_{11}$ to $Y_{18}$ each independently represent a hydrogen atom, halogen atom, alkyl group, aryl group, cyano group, alkoxy group, amide group, ureide group, sulfonamide group, carbamoyl group, sulfamoyl group, alkoxycarbonyl group, carboxyl group or sulfo group, particularly hydrogen atom, halogen atom, cyano group, carboxyl group or sulfo group, most preferably hydrogen atom.

The suffixes $a_{11}$ to $a_{14}$ each independently represent 1 or 2. It is particularly preferred that $a_{11}$ to $a_{14}$ each be 1 at the same time.

M represents a hydrogen atom, metal element or oxide, hydroxide or halide thereof, particularly Cu, Ni, Zn or Al, most preferably Cu.

The phthalocyanine dye represented by the general formula (C-II), if it is water-soluble, preferably has an ionic hydrophilic group. Examples of the ionic hydrophilic group include sulfo group, carboxyl group, phosphono group, and quaternary ammonium group. Preferred among these ionic hydrophilic groups are carboxyl group, phosphono group, and sulfo group. Particularly preferred among these ionic hydrophilic groups are carboxyl group and sulfo group. The carboxyl group, phosphono group and sulfo group may be used in the form of salt. Examples of the counter ion forming the salt include ammonium ion, alkaline metal ion (e.g., lithium ion, sodium ion, potassium ion), and organic cation (e.g., tetramethylammonium ion, tetramethylguanidium ion, tetramethylphosphonium ion). Preferred among these counter ions are alkaline metal ions. Particularly preferred among these counter ions is lithium ion because it enhances the dye solubility and hence the ink stability.

The number of ionic hydrophilic groups is preferably at least 2 per molecule of phthalocyanine-based dye. It is particularly preferred that there be contained at least two sulfo groups and/or carboxyl groups in the phthalocyanine-based dye.

Referring to preferred combination of substituents on the compound represented by the general formula (C-II), the compound of the general formula (C-II) preferably has various substituents at least one of which is one of the preferred groups listed above. More preferably, more of the various substituents are the preferred groups listed above. Most preferably, all of the various substituents are the preferred groups listed above.

Referring to the chemical structure of the phthalocyanine dye according to the invention, it is preferred that at least one electron-withdrawing group such as sulfinyl group, sulfonyl group and sulfamoyl group be incorporated in each of four benzene rings in the phthalocyanine such that σp value of the substituents in the entire phthalocyanine skeleton totals not smaller than 1.6.

The Hammett's substituent constant σp as used herein will be somewhat described hereinafter. Hammett's rule is an empirical rule which L. P. Hammett proposed in 1935 to quantitatively discuss the effect of substituents on the reaction or equilibrium of benzene derivatives. The validity of this empirical rule has been widely accepted today. Substituent constants required in Hammett's rule are σp value and σm value. These values are found in many general literatures. For the details of these values, reference can be made to J. A. Dean, "Lange's Handbook of Chemistry", 12th ed., 1979 (Mc Graw-Hill), and "Kagaku no Ryoiki (Region of Chemistry)", extra edition, No. 122, pp. 96–103, 1979 (Nankodo).

The phthalocyanine derivative represented by the general formula (C-I) is normally a mixture of analogues which are unavoidably different in introduction sites of substituents Xn (n=1 to 4) and Ym(m=1 to 4) and introduced number of these substituents by synthesis method. Accordingly, the general formula of the phthalocyanine dye is mostly a statistically averaged representation of these analogous mixtures. In the invention, it was found that the classification of these analogous mixtures into the following three classes gives a specific mixture which is particularly preferred. In other words, mixtures of phthalocyanine-based dye analogues represented by the general formulae (C-I) and (C-II) are classified into the following classes for definition.

(1) β-position substitution type: Phthalocyanine dye having a specific substituent on 2- and/or 3-position, 6- and/or 7-position, 10- and/or 11-position, or 14- and/or 15-position (2) α-position substitution type: Phthalocyanine dye having a specific substituent on 1- and/or 4-position, 5- and/or 8-position, 9- and/or 12-position, or 13- and/or 16-position (3) α,β-position mixed substitution type: Phthalocyanine dye having a specific substituent irregularly on 1- to 16-position In the specification, in order to describe phthalocyanine dye derivatives having different structures (particularly different substitutionpositions), the aforementioned β-position substitution type, α-position substitution type and α,β-position mixed substitution type are used.

The phthalocyanine derivative to be used in the invention can be synthesized by, e.g., methods described or cited in Shirai and Kobayashi, "Phthalocyanine—Chemistry and Function—", IPC Co., Ltd., pp. 1 to 62, C. C. Leznoff-A. B. P. Lever, "Phthalocyanines—Properties and Applications", VCH, pp. 1–54, etc. or analogous methods in combination.

The phthalocyanine compound represented by the general formula (C-I) to be used in the invention can be synthesized by, e.g., sulfonation reaction, sulfonylchloration reaction and amidation reaction of unsubstituted phthalocyanine compound as disclosed in World Patents 00/17275, 00/08103, 00/08101 and 98/41853 and JP-A-10-36471. In this case, since sulfonation can occur on any position of the phthalocyanine nucleus, it is difficult to control the sulfonated number of substituents. Accordingly, when sulfo groups are incorporated under such a reaction condition, the position and number of sulfo groups incorporated in the reaction product cannot be predetermined, unavoidably giving a mixture of products having different numbers of substituents or substitution positions. Thus, since when this mixture is used as a starting material to synthesize the compound of the invention, a α,β-mixed substitution type mixture comprising some compounds having different numbers of substituents or substitution positions is obtained as a compound suitable for ink set of the invention because the number of heterocyclic group-substituted sulfamoyl groups or the substitution position cannot be predetermined.

As previously mentioned, when many electron-withdrawing groups such as sulfamoyl group are incorporated in the phthalocyanine nucleus, the phthalocyanine dye is provided with a higher oxidation potential and hence an enhanced ozone fastness. When synthesized according to the aforementioned method, it is unavoidable that the reaction mixture contains a phthalocyanine dye having a small number of electron-withdrawing groups incorporated therein, i.e., lower oxidation potential. Accordingly, in order to enhance the ozone fastness of the phthalocyanine dye, a synthesis method capable of inhibiting the production of a compound having a lower oxidation potential is preferably employed.

In the invention, the phthalocyanine compound represented by the general formula (C-II) can be derived from a tetrasulfophthalocyanine compound obtained by, e.g., reacting a phthalonitrile derivative (compound P) represented by the following general formula and/or a diiminoisoindoline derivative (compound Q) represented by the following general formula with a metal compound represented by the general formula (III) or reacting a 4-sulfophthalocyanine derivative (compound R) represented by the following general formula with a metal compound represented by the general formula (III).

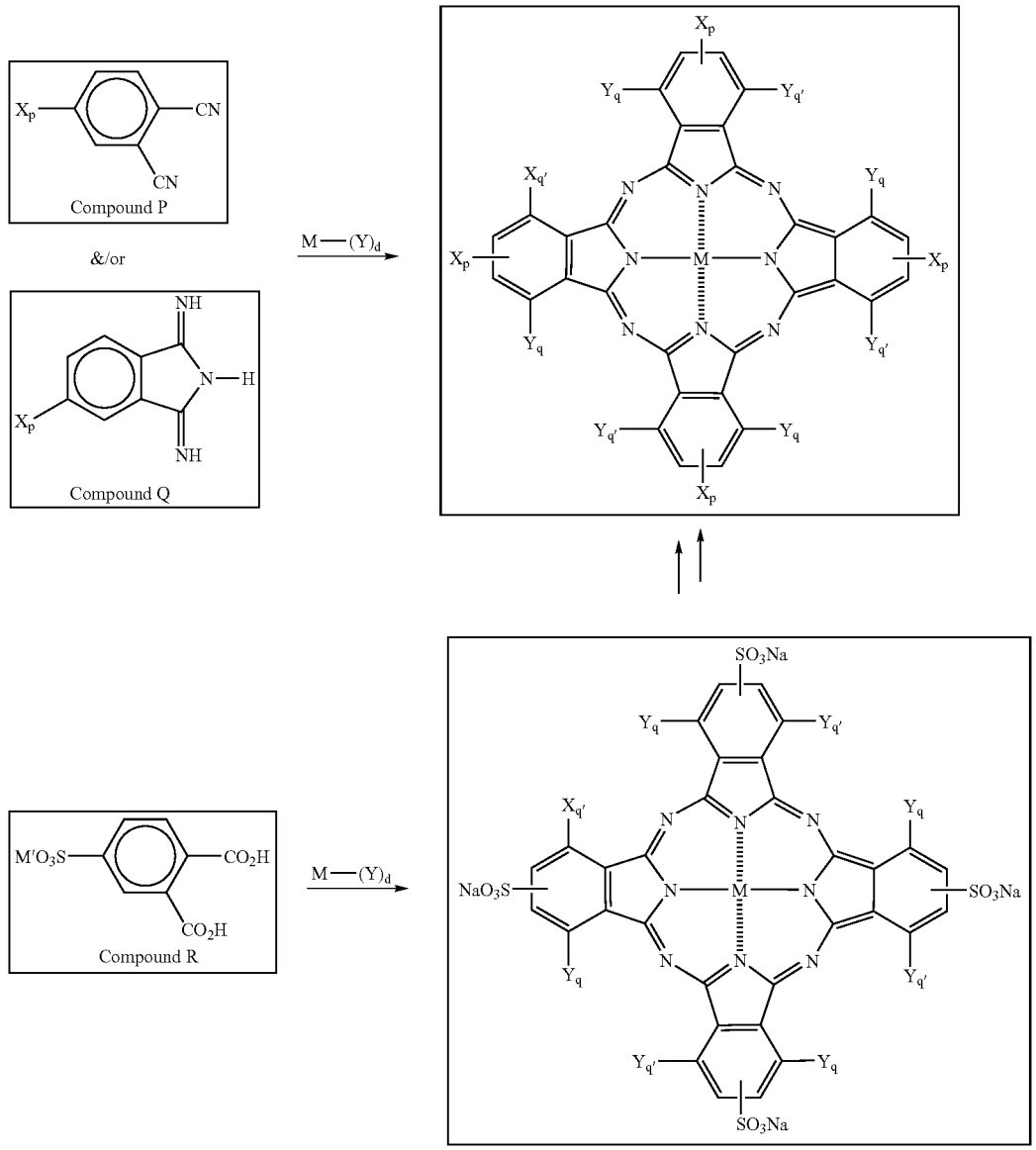

In these general formulae, Xp corresponds to $X_{11}$, $X_{12}$, $X_{13}$ or $X_{14}$ in the general formula (C-II). Yq and Yq' each correspond to $Y_{11}$, $Y_{12}$, $Y_{13}$, $Y_{14}$, $Y_{15}$, $Y_{16}$, $Y_{17}$ or $Y_{18}$ in the general formula (C-II). In the compound R, M' represents a cation.

Examples of the cation represented by M' include alkaline metal ions such as Li, Na and K ions and organic cations such as triethylammonium ion and pyridinium ion.

$$M—(Y)d \quad \text{(III)}$$

wherein M is as defined in the general formula (C-I); Y represents a monovalent or divalent ligand such as halogen atom, acetate anion, acetyl acetonate and oxygen; and d represents an integer of from 1 to 4.

In other words, when synthesized according to the aforementioned method, desired substituents can be incorporated by a predetermined number. In particular, in order to introduce many electron-withdrawing groups to make the oxidation potential higher as in the invention, the aforementioned synthesis method can be used because it is extremely excellent as compared with the aforementioned method for synthesis of the phthalocyanine compound of the general formula (C-I).

The phthalocyanine compound represented by the general formula (C-II) thus obtained is a mixture of compounds represented by the following general formulae (a)-1 to (a)-4 which are isomeric with the substitution position on Xp, i.e., β-position substitution type mixture.

(a)-1

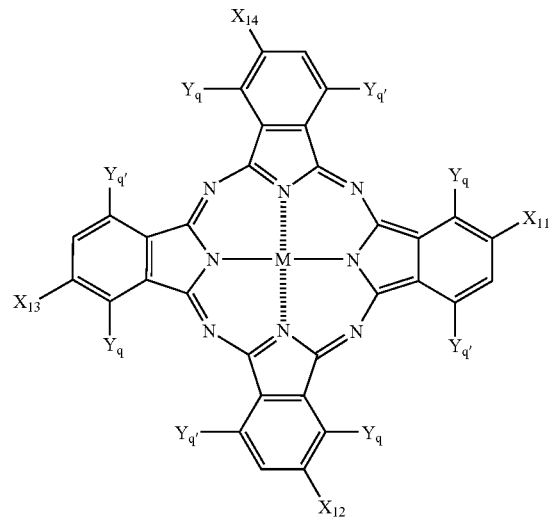

(a)-2

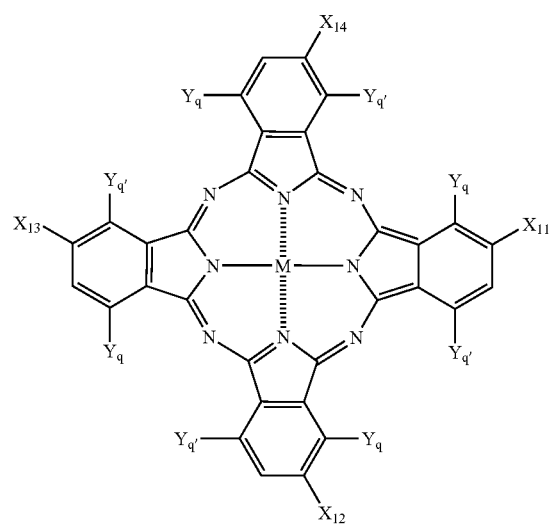

(a)-3

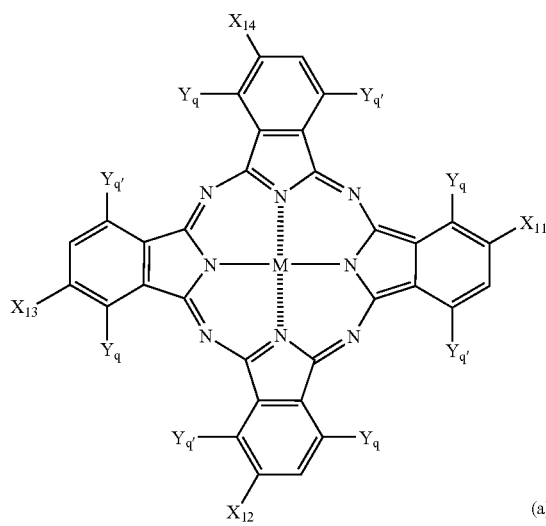

(a)-4

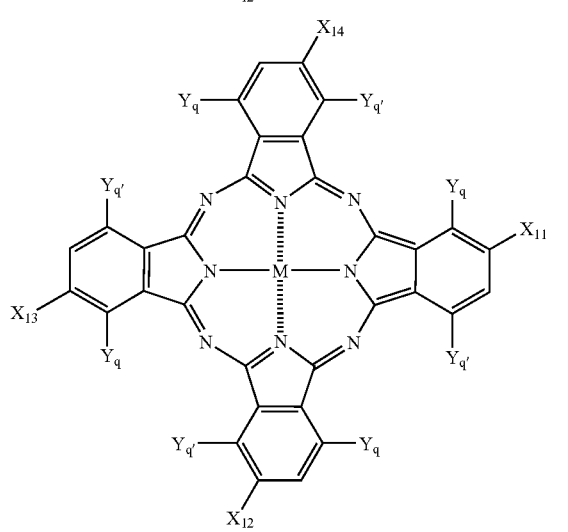

In the foregoing synthesis method, when the same compound is used as Xp, a β-position substitution type phthalocyanine dye wherein $X_{11}$, $X_{12}$, $X_{13}$ and $X_{14}$ are the same substituent can be obtained. On the contrary, when different materials are used in combination as Xp, a dye having substituents of the same kind but partially different or a dye having different substituents can be synthesized. Among the dyes of the general formula (C-II), these dyes having different electron-withdrawing substituents are particularly desirable because they can adjust the solubility and association of the dye, the age stability of the ink, etc.

In the invention, it was found very important for the enhancement of fastness that any of these substitution types has an oxidation potential of higher than 1.0 V (vs SCE). The degree of this effect could not be expected from the related art. Although its mechanism is not known in detail, a tendency was given that β-position substitution type is obviously better than α,β-position mixed substitution type in hue, light fastness, ozone fastness, etc.

Specific examples of the phthalocyanine dyes represented by the general formulae (C-I) and (C-II) (exemplary compounds I-1 to I-12 and 101 to 190) will be given below, the phthalocyanine dye to be used in the invention is not limited thereto.

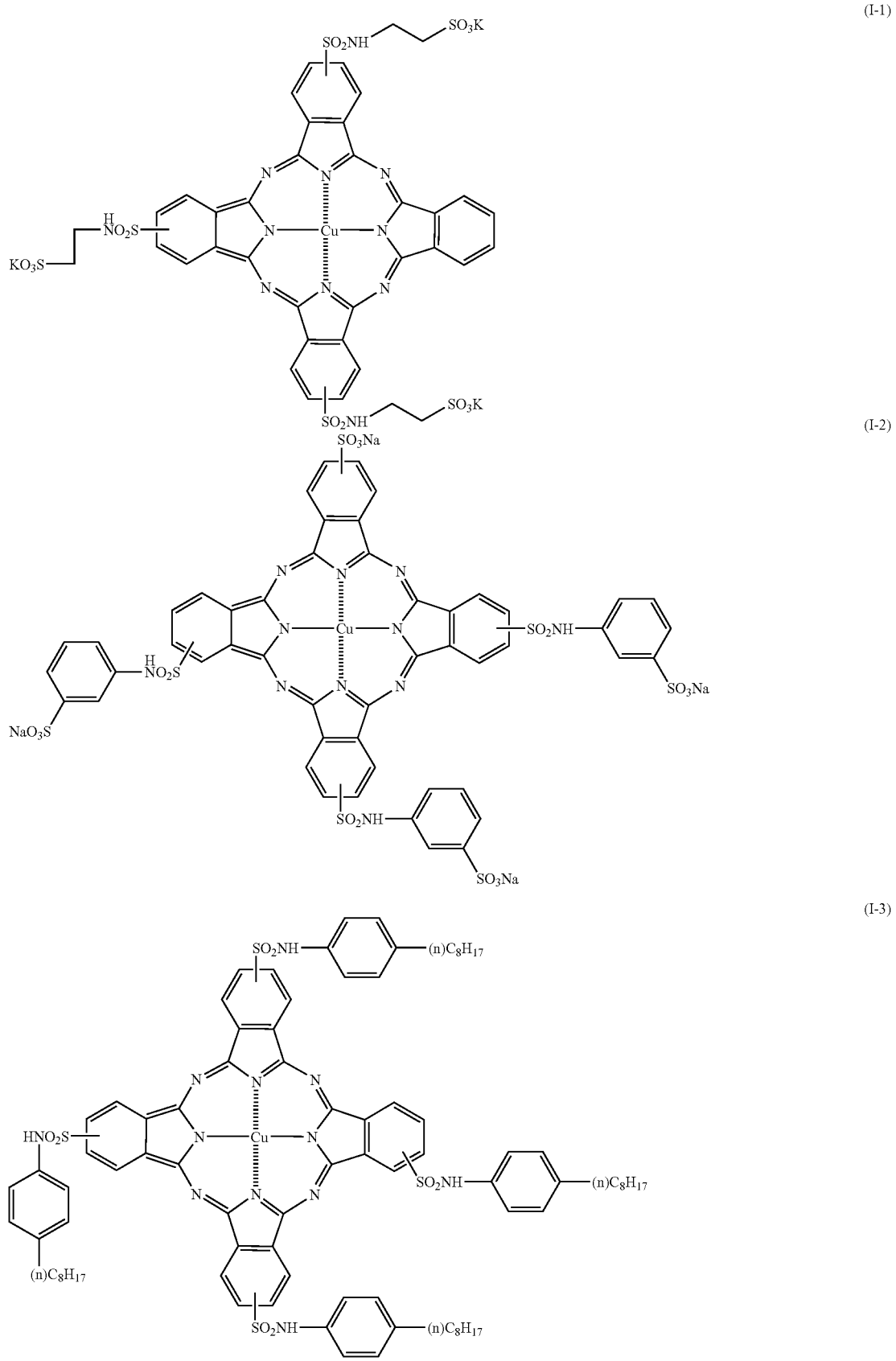
(I-1)
(I-2)
(I-3)

-continued
(I-4)
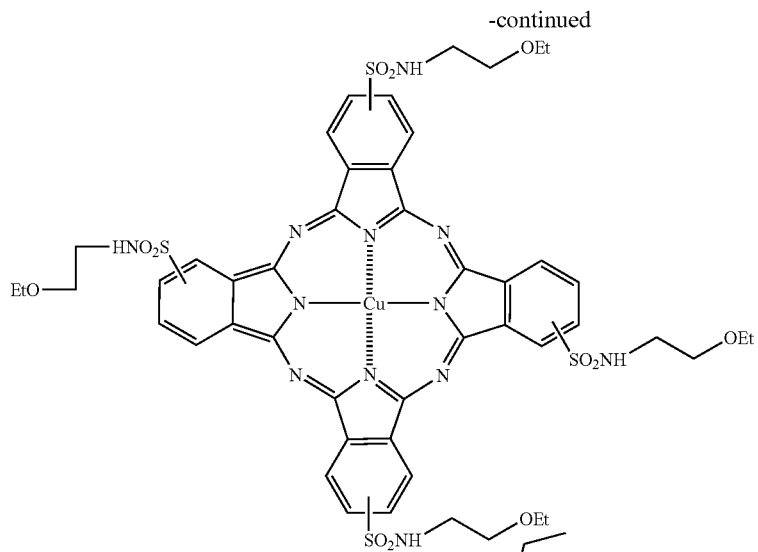
(I-5)
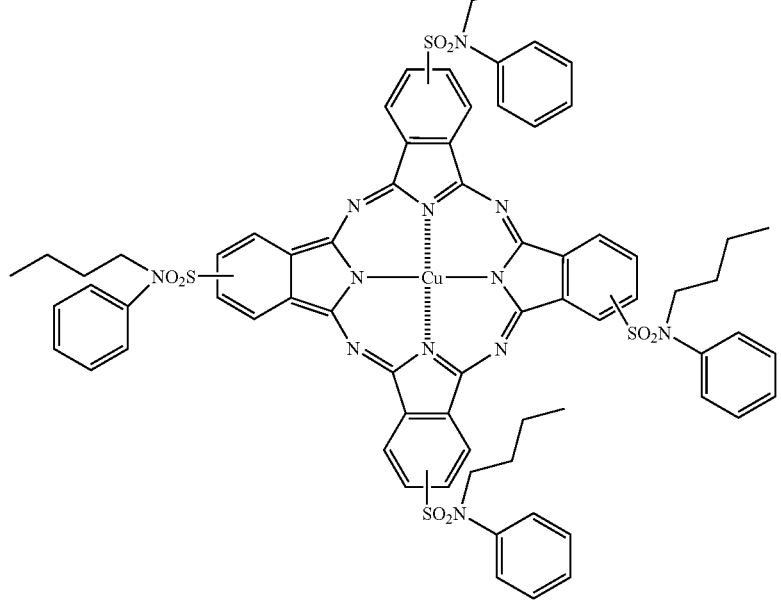
(I-6)
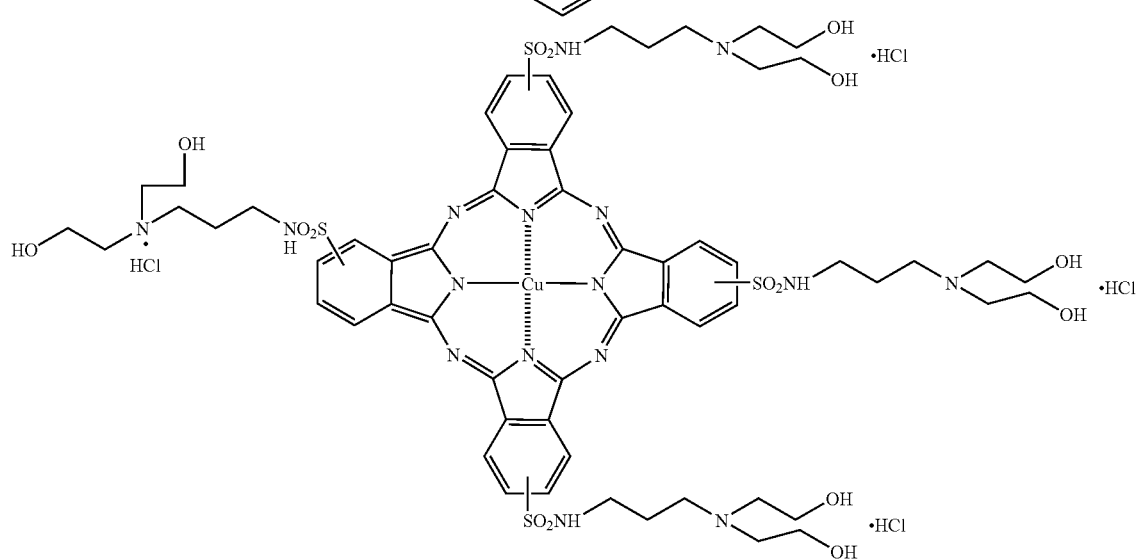

(I-7)
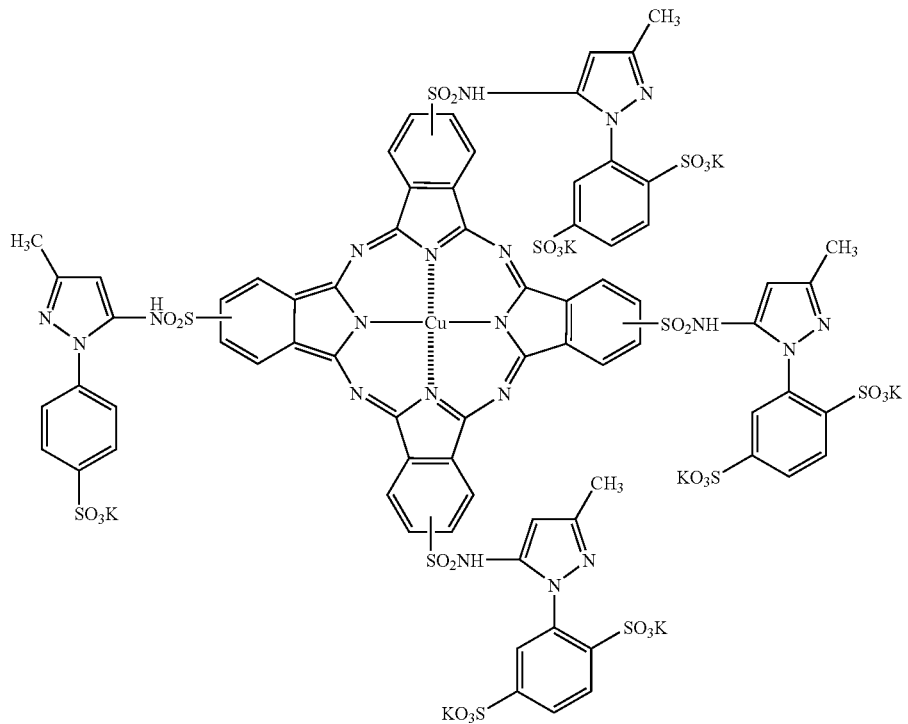
(I-8)
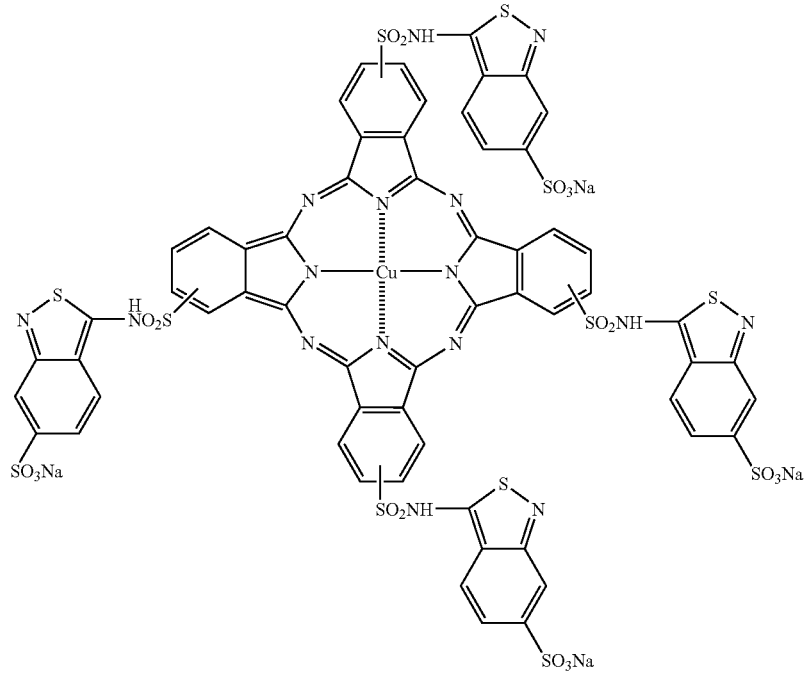

-continued
(I-9)
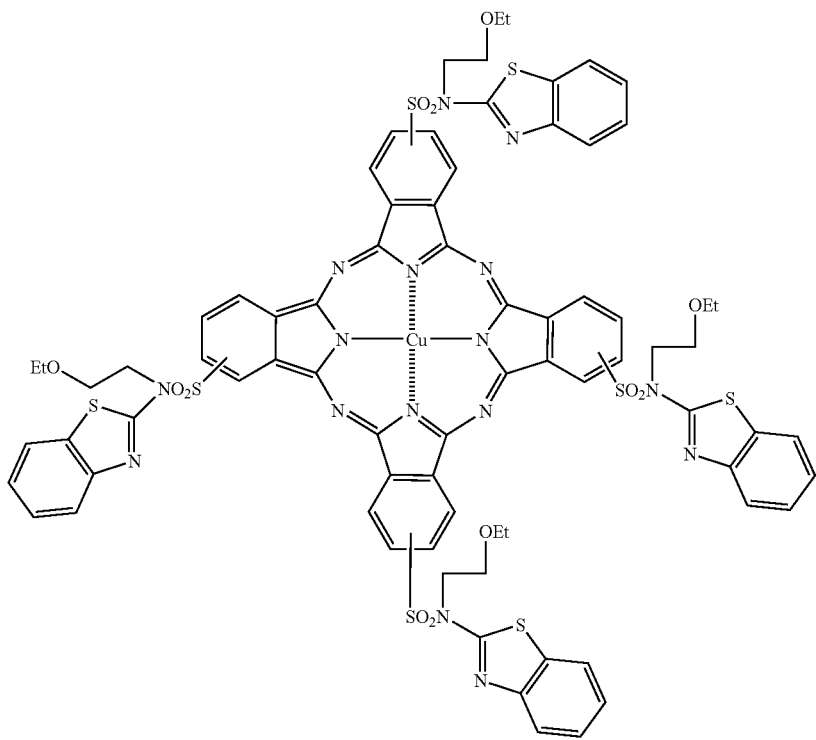
(I-10)
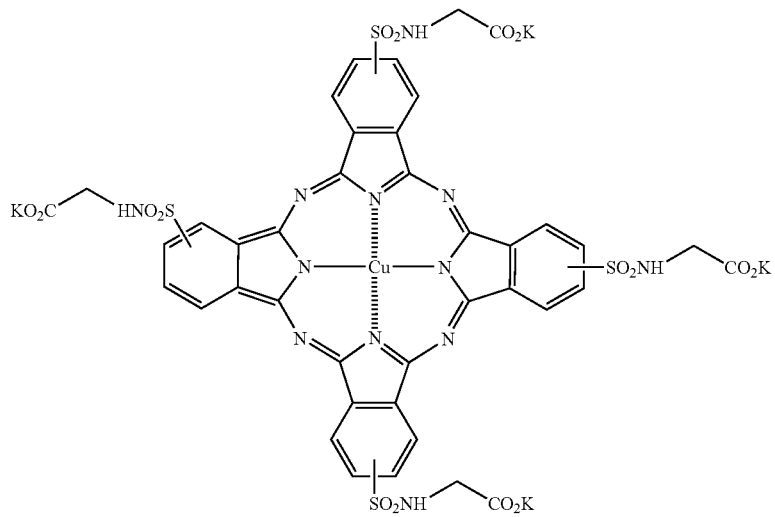

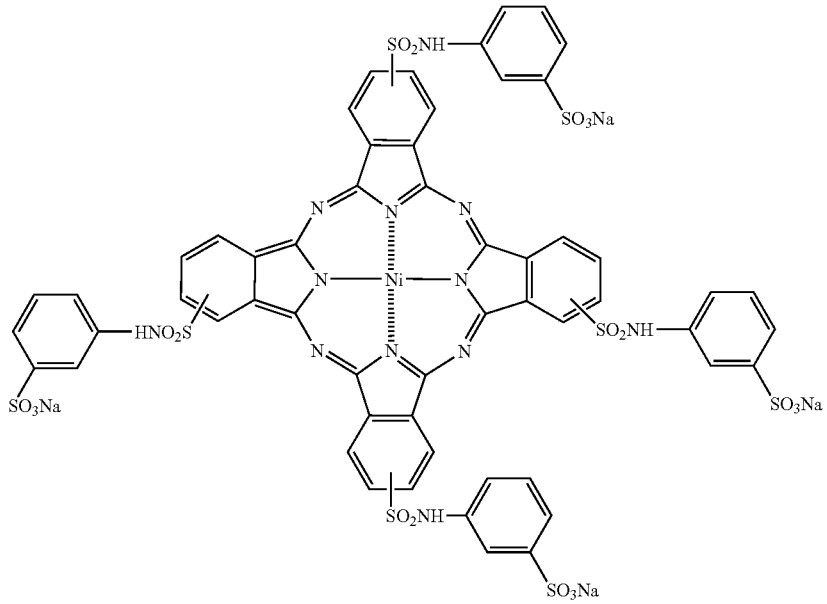
(I-11)
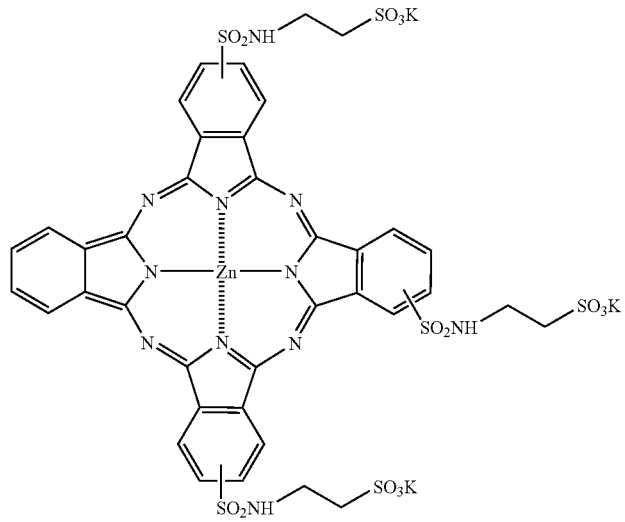
(I-12)
In the following tables, specific examples of various combinations of $(X_1, X_2)$, $(Y_{11}, Y_{12})$, $(Y_{13}, Y_{14})$, $(Y_{15}, Y_{16})$ and $(Y_{17}, Y_{18})$ are each independently not in order.

TABLE 14

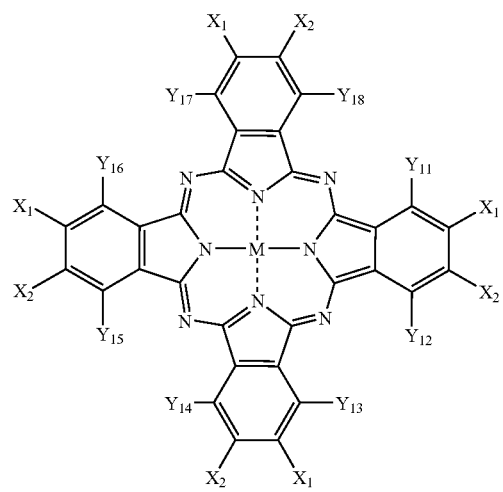

| No. | M | X₁ | X₂ | Y₁₁, | Y₁₂ | Y₁₃, | Y₁₄ | Y₁₅, | Y₁₆ | Y₁₇, | Y₁₈ |
|---|---|---|---|---|---|---|---|---|---|---|---|
| 101 | Cu | —SO₂—NH—CH₂—CH₂—SO₃Li | —H | —H, | —H | —H, | —H | —H, | —H | —H, | —H |
| 102 | Cu | —SO₂—NH—CH₂—CH(OH)—CO—NH—CH₂CH₂—SO₃Na | —H | —Cl, | —H | —Cl, | —H | —Cl, | —H | —Cl, | —H |
| 103 | Cu | —SO₂—NH—CH₂—CH₂—CH₂—SO₂NH—CH₂CH(OH)—SO₃Li | —H | —H, | —H | —H, | —H | —H, | —H | —H, | —H |
| 104 | Cu | —SO₂—NH—C₆H₄—SO₂NH—CH₂CH₂—SO₃Li | —H | —H, | —H | —H, | —H | —H, | —H | —H, | —H |
| 105 | Ni | —SO₂—NH—CH₂—CH₂—CO—NH—CH(CH₂—COONa)—COONa | —H | —Cl, | —H | —Cl, | —H | —Cl, | —H | —Cl, | —H |
| 106 | Cu | —SO₂—NH—CH₂—CH₂—SO₂—NH—CH₂—COONa | —CN | —H, | —H | —H, | —H | —H, | —H | —H, | —H |
| 107 | Cu | —SO₂—CH₂—CH₂—CH₂—SO₂—NH—CH(CH₂—OH)—COOLi | —H | —H, | —H | —H, | —H | —H, | —H | —H, | —H |
| 108 | Cu | —SO₂—CH₂—CH₂—CH₂—SO₃Li | —H | —H, | —H | —H, | —H | —H, | —H | —H, | —H |
| 109 | Cu | —SO₂—CH₂—CH₂—CH₂—SO₃K | —H | —H, | —H | —H, | —H | —H, | —H | —H, | —H |
| 110 | Cu | —SO₂—(CH₂)₃—CO₂K | —H | —H, | —H | —H, | —H | —H, | —H | —H, | —H |

TABLE 15

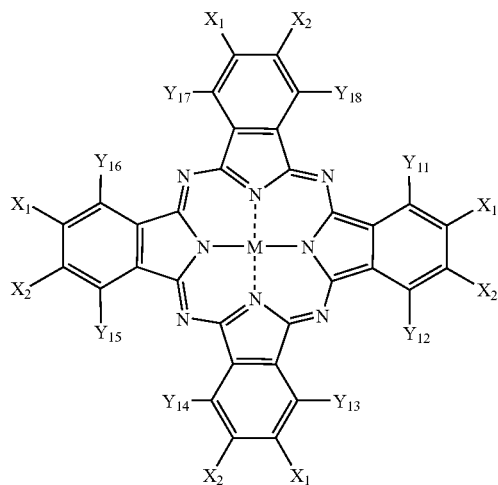

| No. | M | X$_1$ |
|---|---|---|
| 111 | Cu | —SO$_2$—NH—CH$_2$—CH$_2$—CH$_2$—SO$_2$—NH—CH$_2$CH(OH)—CH$_2$—SO$_3$Li |
| 112 | Cu | —SO$_2$—NH—CH$_2$—CH$_2$—CH$_2$—SO$_2$NH—CH$_2$CH(OH)—CH$_3$ |
| 113 | Cu | —SO$_2$—CH$_2$—CH(OH)—CH$_2$SO$_3$K |
| 114 | Cu | —SO$_2$—CH$_2$—CH(OH)—CH$_3$ |
| 115 | Cu | —SO$_2$NH(CH$_2$)$_3$N$^{\oplus}$(CH$_3$)(CH$_2$CH$_2$OH)$_2$·CH$_3$—C$_6$H$_4$—SO$_3^{\ominus}$ |
| 116 | Cu | —CO—NH—CH$_2$—CH(OH)—CH$_2$SO$_3$K |
| 117 | Cu | —CO—NH—CH(COOLi)—CH$_2$SO$_3$Li |

| No. | X$_2$ | Y$_{11}$, | Y$_{12}$, | Y$_{13}$, | Y$_{14}$, | Y$_{15}$, | Y$_{16}$, | Y$_{17}$, | Y$_{18}$ |
|---|---|---|---|---|---|---|---|---|---|
| 111 | —H | —H, | —H, | —H, | —H, | —H, | —H, | —H, | —H |
| 112 | —SO$_3$Li | —H, | —H, | —H, | —H, | —H, | —H, | —H, | —H |
| 113 | —H | —H, | —H, | —H, | —H, | —H, | —H, | —H, | —H |
| 114 | —SO$_3$Li | —H, | —H, | —H, | —H, | —H, | —H, | —H, | —H |
| 115 | —H | —H, | —H, | —H, | —H, | —H, | —H, | —H, | —H |
| 116 | —H | —H, | —H, | —H, | —H, | —H, | —H, | —H, | —H |
| 117 | —H | —H, | —H, | —H, | —H, | —H, | —H, | —H, | —H |

TABLE 16
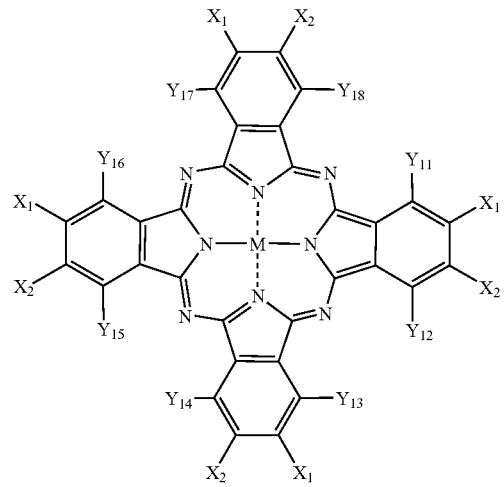
| No. | M | X₁ | X₂ | Y₁₁, | Y₁₂, | Y₁₃, | Y₁₄, | Y₁₅, | Y₁₆, | Y₁₇, | Y₁₈ |
|---|---|---|---|---|---|---|---|---|---|---|---|
| 118 | Cu | —SO₂CH₂CH₂CH(CH₃)SO₃Li | —H | —H, | —H | —H, | —H | —H, | —H | —H, | —H |
| 119 | Cu | —SO₂—CH₂—CH(OH)—CH₂—SO₃Na | —H | —H, | —H | —H, | —H | —H, | —H | —H, | —H |
| 120 | Cu | —SO₂—CH₂—CH₂—CH(CH₃)—COOLi | —H | —H, | —H | —H, | —H | —H, | —H | —H, | —H |
| 121 | Cu | —SO₂(CH₂)₃SO₂NHCH₂—CH(OH)—CH₂—SO₃Li | —H | —H, | —H | —H, | —H | —H, | —H | —H, | —H |
| 122 | Cu | —CO₂CH₂CH₂CH₂SO₂—NH—CH₂—CH(OH)—CH₂—SO₃Li | —H | —H, | —H | —H, | —H | —H, | —H | —H, | —H |
| 123 | Cu | —SO₂NH—C₅H₁₁(t) | —H | —H, | —H | —H, | —H | —H, | —H | —H, | —H |
| 124 | Cu | —SO₂—NH—CH₂—CH(CH₂CH₃)—CH₂CHCH₂—CH₃ | —H | —H, | —H | —H, | —H | —H, | —H | —H, | —H |

TABLE 17

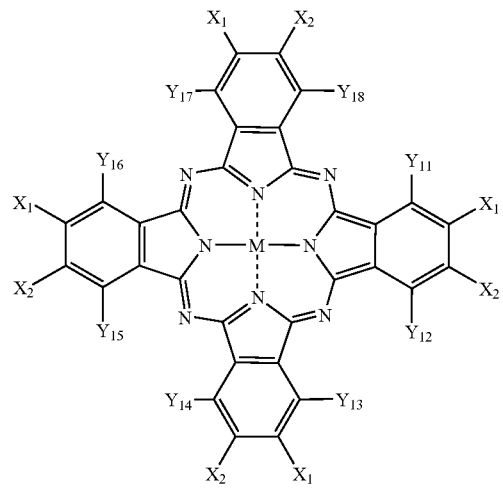

| No. | M | X₁ | X₂ | Y₁₁, Y₁₂ | Y₁₃, Y₁₄ | Y₁₅, Y₁₆ | Y₁₇, Y₁₈ |
|---|---|---|---|---|---|---|---|
| 125 | Cu | —SO₂CH₂CH₂CH₂SO₂—NH—CH₂—CH(CH₃)—CH₂—CH₃ | —H | —H, —H | —H, —H | —H, —H | —H, —H |
| 126 | Cu | —SO₂—CH₂—CH₂—CH₂—CO₂—CH(CH₃)—CH₂—O—CH₃ | —H | —H, —H | —H, —H | —H, —H | —H, —H |
| 127 | Cu | —SO₂CH₂CH₂CH₂SO₂NHCH₂CH₂CH₂O—CH(CH₃)₂ | —H | —H, —H | —H, —H | —H, —H | —H, —H |
| 128 | Zn | —SO₂—CH₂—CH(OCH₃)—CH₂—O—CH₂ | —CN | —H, —H | —H, —H | —H, —H | —H, —H |
| 129 | Cu | —CO—NH—CH₂—CH(CH₂CH₃)—CH₂—CH₂—CH₂CH₃ | —H | —Cl, —H | —Cl, —H | —Cl, —H | —Cl, —H |
| 130 | Cu | —CO—CH(CH₃)—CH₂—O—C₄H₉(t) | —H | —H, —H | —H, —H | —H, —H | —H, —H |
| 131 | Cu | —SO₂—CH₂—CH₂—CH(CH₃)—SO₂—NH—C₆H₃(SO₃Li)₂ | —H | —H, —H | —H, —H | —H, —H | —H, —H |

TABLE 18
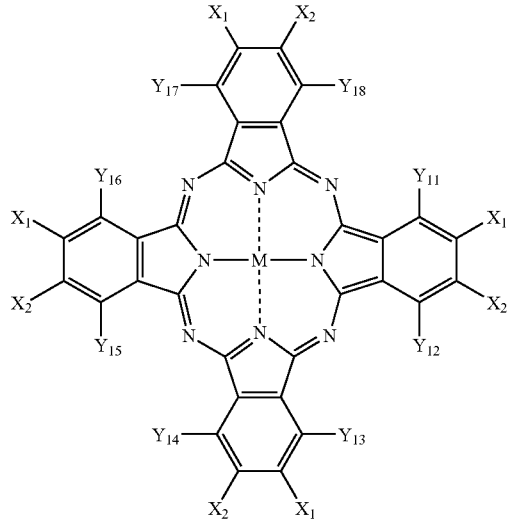
| No. | M | X₁ | X₂ | Y₁₁, Y₁₂ | Y₁₃, Y₁₄ | Y₁₅, Y₁₆ | Y₁₇, Y₁₈ |
|---|---|---|---|---|---|---|---|
| 132 | Cu | 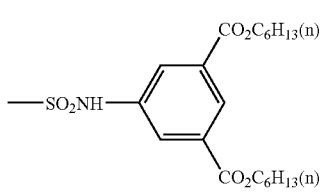 | —H | —H, —H | —H, —H | —H, —H | —H, —H |
| 133 | Cu | 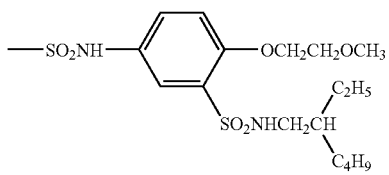 | —H | —H, —H | —H, —H | —H, —H | —H, —H |
| 134 | Cu | 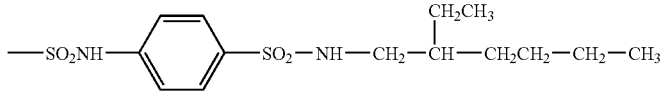 | —H | —H, —H | —H, —H | —H, —H | —H, —H |
| 135 | Cu | 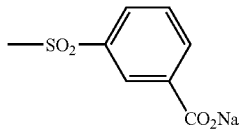 | —H | —H, —H | —H, —H | —H, —H | —H, —H |
| 136 | Cu | 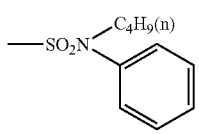 | —H | —H, —H | —H, —H | —H, —H | —H, —H |

TABLE 19
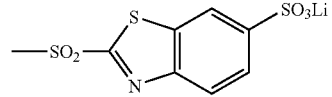
| No. | M | $X_1$ | $X_2$ | $Y_{11}$, $Y_{12}$ | $Y_{13}$, $Y_{14}$ | $Y_{15}$, $Y_{16}$ | $Y_{17}$, $Y_{18}$ |
|---|---|---|---|---|---|---|---|
| 137 | Cu | 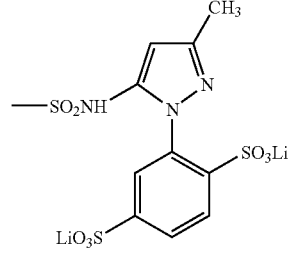 —SO$_2$—(benzothiazole)—SO$_3$Li | —H | —H, —H | —H, —H | —H, —H | —H, —H |
| 138 | Cu | 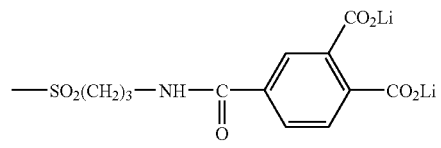 —SO$_2$NH—(pyrazole-CH$_3$)—(phenyl with SO$_3$Li, LiO$_3$S) | —H | —H, —H | —H, —H | —H, —H | —H, —H |
| 139 | Cu | —SO$_2$(CH$_2$)$_3$—NH—C(O)—(phenyl)(CO$_2$Li)(CO$_2$Li) | —Cl | —H, —H | —H, —H | —H, —H | —H, —H |
| 140 | Cu | 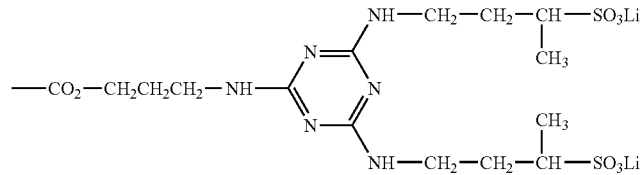 —CO$_2$—CH$_2$CH$_2$CH$_2$—NH—(triazine)(NH—CH$_2$—CH$_2$—CH(CH$_3$)—SO$_3$Li)$_2$ | —H | —H, —H | —H, —H | —H, —H | —H, —H |

TABLE 20

[Structure: phthalocyanine with M center, substituents X1, X2 at β-positions and Y11-Y18 at α-positions]

| No. | M | X₁ | X₂ | Y₁₁, Y₁₂ | Y₁₃, Y₁₄ | Y₁₅, Y₁₆ | Y₁₇, Y₁₈ |
|---|---|---|---|---|---|---|---|
| 141 | Cu | —SO₂NH—CH(COONa)—CH₂—CO—N—(CH₂CH₂OH)₂ | —H | —H, —H | —H, —H | —H, —H | —H, —H |
| 142 | Cu | —SO₂NH—(C₆H₄)—NHC(O)—(C₆H₄)—SO₃Li (3,3′-substituted) | —H | —H, —H | —H, —H | —H, —H | —H, —H |
| 143 | Cu | —CO—NH—CH₂—CH(OH)—CO—NH—CH(COOK)—CH₂CH₂—SO₃K | —H | —H, —H | —H, —H | —H, —H | —H, —H |
| 144 | Cu | —SO₂—CH₂CH₂CH₂—NH—CO—(C₆H₄)—CO—NH—CH(COOLi)—CH₂—COOLi | —H | —H, —H | —H, —H | —H, —H | —H, —H |
| 145 | Cu | —SO₂CH₂CH₂OCH₂CH₂OCH₂CH₂SO₃Li | —H | —H, —H | —H, —H | —H, —H | —H, —H |

In the following table, the introduction sites of the substituents (Xp1) and (Xp2) in the β-position substituents are not in order.

TABLE 21

M-Pc(Xp₁)ₘ(Xp₂)ₙ

| No. | M | Xp₁ | m |
|---|---|---|---|
| 146 | Cu | —SO₂—NH—CH₂—CH(CH₃)—SO₃Li | 3 |
| 147 | Cu | —SO₂—NH—CH₂—CH₂SO₃Li | 3 |
| 148 | Cu | —SO₂—NH—CH₂—CH(CH₃)—SO₃Li | 3 |

TABLE 21-continued

| | | M-Pc(Xp$_1$)$_m$(Xp$_2$)$_n$ | |
|---|---|---|---|
| 149 | Cu | —SO$_2$—NH—CH$_2$—CH(CH$_3$)—SO$_3$Li | 2 |
| 150 | Cu | —SO$_2$NH—CH$_2$—CH$_2$—SO$_2$—NH—CH$_3$CH$_2$—COONa | 3 |
| 151 | Cu | —SO$_2$—NH—C$_6$H$_4$—SO$_2$NH—CH$_2$—CH(OH)—SO$_3$Li | 3 |
| 152 | Cu | —SO$_2$—CH$_2$—CH$_2$—CH(CH$_3$)—SO$_3$Li | 2.5 |
| 153 | Cu | —SO$_2$—CH$_2$—CH$_2$—CH(CH$_3$)—SO$_3$Na | 2 |
| 154 | Cu | —SO$_2$—CH$_2$—CH$_2$—CH$_2$—SO$_3$Li | 3 |
| 155 | Cu | —SO$_2$—CH$_2$—CH$_2$—CH$_2$—COOK | 2 |
| 156 | Cu | —SO$_2$—CH$_2$—CH$_2$—CH$_2$—SO$_3$Li | 3 |
| 157 | Cu | —SO$_2$—CH$_2$—CH$_2$—O—CH$_2$—CH$_2$—SO$_3$Li | 2 |

| No. | Xp$_2$ | n |
|---|---|---|
| 146 | —SO$_2$—NH—CH$_2$—CH(OH)—CH$_3$ | 1 |
| 147 | —SO$_2$—NH—CH$_2$—CH$_2$—CH$_2$—SO$_2$—NH—CH$_2$—CH(OH)—CH$_3$ | 1 |
| 148 | —SO$_2$NH—CH$_2$—CH$_2$—CH$_2$—SO$_2$—NH—CH$_2$—CH$_2$—O—CH$_2$—CH$_2$—OH | 1 |
| 149 | —SO$_2$—NH—CH$_2$—CH$_2$—CH$_2$—CO—N(—CH$_2$—CH$_2$—OH)$_2$ | 2 |
| 150 | —SO$_2$NH—CH(CH$_3$)—CH$_2$OH | 1 |
| 151 | —SO$_2$NH—CH$_2$—CH$_2$—O—CH$_2$—CH$_2$—OH | 1 |
| 152 | —SO$_2$—CH$_2$—CH$_2$—O—CH$_2$—CH$_2$—OH | 1.5 |
| 153 | —SO$_2$—CH$_2$—CH$_2$—CH$_2$—CO—N(—CH$_2$—CH$_2$—OH)$_2$ | 2 |
| 154 | —SO$_2$—CH$_2$—CH$_2$—CH$_2$—SO$_2$—NH—CH$_2$—CH(OH)—CH$_3$ | 1 |
| 155 | —SO$_2$—CH$_2$—CH$_2$—CH$_2$—SO$_2$—NH—CH$_2$—CH(OH)—CH$_2$—COOK | 2 |
| 156 | —SO$_2$—CH$_2$—CH(OH)—CH$_2$—SO$_3$Li | 1 |
| 157 | —SO$_2$—CH$_2$—CH$_2$—CH$_2$—CO$_2$—CH$_2$—CH$_2$—CH(OH)—CH$_2$—COOK | 2 |

TABLE 22

M-Pc(Xp$_1$)$_m$(Xp$_2$)$_n$

| No. | M | Xp$_1$ | m | Xp$_2$ | n |
|---|---|---|---|---|---|
| 158 | Cu | —SO$_2$—CH$_2$—CH(OH)—CH$_2$SO$_3$Li | 3 | —SO$_2$—CH$_2$—C$_6$H$_4$—SO$_2$NH—CH$_2$—CH(OH)—CH$_2$—OH | 1 |
| 159 | Cu | —SO$_3$NHCH$_2$CH$_2$—SO$_3$Li | 3 | —SO$_2$—CH$_2$—CH$_2$—CH$_2$—SO$_2$—NH—CH$_2$—CH(OH)—CH$_3$ | 1 |
| 160 | Cu | —SO$_2$—CH$_2$—CH$_2$—O—CH$_2$—CH$_2$—SO$_3$Na | 3 | —SO$_2$—CH$_2$—CH$_2$—CH$_2$—CO—N(CH$_2$—CH$_2$—COONa)—CH$_2$—COONa | 1 |
| 161 | Cu | —SO$_2$CH$_2$CH$_2$CH$_2$SO$_3$Li | 3 | —SO$_2$CH$_2$CH$_2$CH$_2$SO$_2$NHCH$_2$—CH(OH)—CH$_2$SO$_3$Li | 1 |
| 162 | Cu | —SO$_2$CH$_2$CH$_2$CH$_2$SO$_3$Li | 2 | —SO$_2$CH$_2$CH$_2$OCH$_2$CH$_2$OCH$_2$CH$_2$OH | 2 |
| 163 | Cu | —SO$_2$CH$_2$CH$_2$CH$_2$SO$_2$K | 3 | —SO$_2$CH$_2$CH$_2$CH$_2$SO$_2$NH—CH(CH$_3$)—CH$_2$—OH | 1 |
| 164 | Cu | —SO$_2$CH$_2$CH$_3$CH$_3$SO$_3$Li | 2 | —SO$_2$CH$_2$CH$_2$CH$_2$SO$_2$N(CH$_2$CH$_2$OH)$_2$ | 2 |
| 165 | Cu | —CO—NH—CH$_2$—CH$_2$—SO$_3$K | 3 | —CO—NH—CH$_2$—CH$_2$—O—CH$_2$—CH$_2$—OH | 1 |
| 166 | Cu | —CO—NH—CH$_2$—CH$_2$—SO$_2$—NH—CH$_2$—CH$_2$—COONa | 3 | —CO—NH—CH$_2$—CH(OH)—CH$_3$ | 1 |
| 167 | Cu | —SO$_2$(CH$_2$)$_3$SO$_2$NHCH$_2$—CH(OH)—CH$_2$CO$_2$Li | 2.5 | —CO—NH—CH$_2$—CH$_2$—CH$_2$—CO—N(CH$_2$—CH$_2$—OH)$_2$ | 1.5 |
| 168 | Cu | —CO$_2$—CH$_2$—CH$_2$—CH(CH$_3$)—SO$_3$Na | 2 | —CO—CH$_2$—CH$_2$—CH$_2$—CO—N(CH$_2$—CH$_2$—OH)$_2$ | 2 |
| 169 | Cu | —CO$_2$—CH$_2$—CH$_2$—CH$_2$—SO$_3$Li | 3 | —CO$_2$—CH$_2$—CH$_2$—CH$_2$—SO$_2$—NH—CH$_2$—CH(OH)—CH$_3$ | 1 |
| 170 | Cu | —CO$_2$—CH$_2$—CH$_2$—CH$_3$COOK | 2 | —CO$_2$—CH$_2$—CH$_2$—CH$_2$—SO$_2$—NH—CH$_2$—CH(OH)—CH$_2$—COOK | 2 |

TABLE 23

M-Pc(Xp$_1$)$_m$(Xp$_2$)$_n$

| No. | M | Xp$_1$ | m |
|---|---|---|---|
| 171 | Cu | —CO$_2$—CH$_2$—CH$_2$—O—CH$_2$—CH$_2$—O—CH$_2$—CH$_2$—SO$_3$Na | 3 |
| 172 | Cu | —SO$_2$CH$_3$CH$_3$OCH$_2$CH$_2$O—CH$_2$CH$_2$SO$_3$K | 2 |
| 173 | Cu | —SO$_2$(CH$_2$)$_3$SO$_2$NHCH$_2$CH(OH)CH$_2$OH | 2 |
| 174 | Cu | —SO$_2$(CH$_2$)$_3$SO$_2$NHCH$_2$—CH(OH)—CH$_2$SO$_3$K | 3 |
| 175 | Cu | —SO$_2$(CH$_2$)$_3$SO$_2$NH(CH$_2$)$_3$N(CH$_2$CH$_2$OH)$_2$ | 2 |
| 176 | Cu | —SO$_2$—CH$_2$—CH$_2$—CH$_2$—SO$_2$—NH—CH$_2$—CH(OH)—CH$_3$ | 3 |

TABLE 23-continued

| | | $M\text{-}Pc(Xp_1)_m(Xp_2)_n$ | |
|---|---|---|---|
| 177 | Cu | $-SO_2-CH_2-CH_2-O-CH_2-CH_2-O-CH_3$ | 2 |
| 178 | Cu | $-SO_2-CH_2-CH_2-O-CH_3-CH_2-O-CH_2-CH_2-OH$ | 3 |
| 179 | Cu | $-SO_2-CH_2-\underset{\underset{CH_2CH_3}{\mid}}{CH}-CH_2CH_2-CH_2CH_3$ | 2 |
| 180 | Cu | $-SO_2-CH_2-CH_2-CH_2-SO_2-NH-CH_2-\underset{\underset{O-CH_3}{\mid}}{CH}-CH_3$ | 3 |
| 181 | Cu | $-SO_2-CH_2-CH_2-CH_2-CO_2-NH-\underset{\underset{CH_3}{\mid}}{CH}-CH_2-CH_3$ | 3 |
| 182 | Cu | $-SO_2-CH_2-CH_2-CH_2-SO_2NH-CH_2-\underset{\underset{OH}{\mid}}{CH}-CH_3$ | 2.5 |

| No. | $Xp_2$ | n |
|---|---|---|
| 171 | $-SO_2-CH_2-\text{C}_6\text{H}_4-SO_2NH-CH_2-\underset{\underset{OH}{\mid}}{CH}-CH_2-OH$ | 1 |
| 172 | $-CO_2-CH_2-CH_2-CH_2-CO_2-CH_2-CH_2-\underset{\underset{OH}{\mid}}{CH}-CH_2-COOK$ | 2 |
| 173 | $-CO_2-CH_2-\underset{\underset{OH}{\mid}}{CH}-CH_2-CH_2-SO_3Li$ | 2 |
| 174 | $-CO_2-CH_2-CH_2-CH_2-SO_2-NH-CH_2-\underset{\underset{OH}{\mid}}{CH}-CH_3$ | 1 |
| 175 | $-CO_2-CH_2-CH_2-CH_2-CO-\underset{\underset{CH_2-CH_2-COOLi}{\mid}}{N}H-CH_2-COOLi$ | 2 |
| 176 | $-SO_2-CH_2-CH_2-CH_2-SO_2-NH-CH_2-\underset{\underset{CH_2CH_3}{\mid}}{CH}-CH_2CH_2-CH_2CH_3$ | 1 |
| 177 | $-SO_2-CH_2-CH_2-CH_2-SO_2-NH-CH_2-\underset{\underset{OH}{\mid}}{CH}-CH_3$ | 1 |
| 178 | $-SO_2-CH_2-CH_2-CH_2-CO_2-CH_2-\underset{\underset{CH_2CH_3}{\mid}}{CH}-CH_2CH_2-CH_2CH_3$ | 1 |
| 179 | $-SO_2-CH_2-CH_2-CH_2-SO_2-NH-CH_2-\underset{\underset{O-CH_3}{\mid}}{CH}-CH_3$ | 2 |
| 180 | $-SO_2NH-CH_2-CH_2-SO_2NH-CH_2-CH_2-O-CH_2-CH_2-OH$ | 1 |
| 181 | $-SO_2-CH_2-CH_2-CH_2-SO_2-NH-CH-(CH_3)_2$ | 1 |
| 182 | $-SO_2-CH_2-CH_2-CH_2-CO_2-NH-\underset{\underset{CH_3}{\mid}}{CH}-CH_2-CH_3$ | 1.5 |

TABLE 24

| | | M-Pc(Xp$_1$)$_m$(Xp$_2$)$_n$ | |
|---|---|---|---|
| No. | M | Xp$_1$ | m |
| 183 | Cu | —SO$_2$—CH$_2$—CH$_2$—CH$_2$—CO$_2$—NH—CH(CH$_3$)—CH$_2$—CH$_3$ | 2 |
| 184 | Cu | —SO$_2$—CH$_2$—CH$_2$—CH$_2$—SO$_2$—NH—CH$_2$—CH(OH)—CH$_2$ | 3 |
| 185 | Cu | —SO$_2$—CH$_2$—CH$_2$—CH$_2$—SO$_2$—NH—CH$_2$—CH(OH)—CH$_3$ | 3 |
| 186 | Cu | —SO$_2$—CH$_2$—CH$_2$—CH$_2$—CO$_2$—NH—CH(CH$_3$)—CH$_2$—CH$_3$ | 3 |
| 187 | Cu | —SO$_2$—CH$_2$—CH$_2$—CH$_2$—SO$_2$—NH—CH(—CH$_3$)$_2$ | 3 |
| 188 | Cu | —CO$_2$—CH$_2$—CH$_2$—CH$_2$—CO$_2$—NH—CH(CH$_3$)—CH$_2$—CH$_3$ | 3 |
| 189 | Cu | —CO—NH—CH$_2$—CH$_2$—SO$_2$—NH—CH(—CH$_3$)$_2$ | 3 |
| 190 | Cu | —CO—NH—CH$_2$—CH(CH$_2$CH$_3$)—CH$_2$—CH$_2$—CH$_2$CH$_3$ | 3 |

| No. | Xp$_2$ | n |
|---|---|---|
| 183 | —SO$_2$—CH$_2$—CH$_2$—CH$_2$—SO$_2$—NH—(CH$_2$)$_3$—CH$_2$—O—CH$_2$CH$_2$—OH | 2 |
| 184 | —SO$_2$—CH$_2$—CH$_2$—O—CH$_2$—CH$_2$—O—CH$_3$ | 1 |
| 185 | —SO$_2$—CH$_2$—CH$_2$—O—CH$_2$—CH$_2$—O—CH$_2$—CH$_2$—O—CH$_3$ | 1 |
| 186 | —SO$_2$—CH$_2$—CH$_2$—O—CH$_2$—CH$_2$—O—CH$_2$—CH$_2$—OH | 1 |
| 187 | —CO$_2$—CH$_2$—CH(CH$_2$CH$_3$)—CH$_2$—CH$_2$—CH$_2$CH$_3$ | 1 |
| 188 | —CO$_2$—CH$_2$—CH$_2$—O—CH$_2$—CH$_2$—O—CH$_2$ | 1 |
| 189 | —CO$_2$—NH—CH$_2$—CH(CH$_2$CH$_3$)—CH$_2$—CH$_2$—CH$_2$—CH$_3$ | 1 |
| 190 | —CO—NH—CH$_2$—CH$_2$—O—CH$_2$—CH$_2$—O—CH$_3$ | 1 |

The structure of the phthalocyanine compound represented by M-Pc(Xp$_1$)m(Xp$_2$)n in Tables 21 to 24 is as follows.

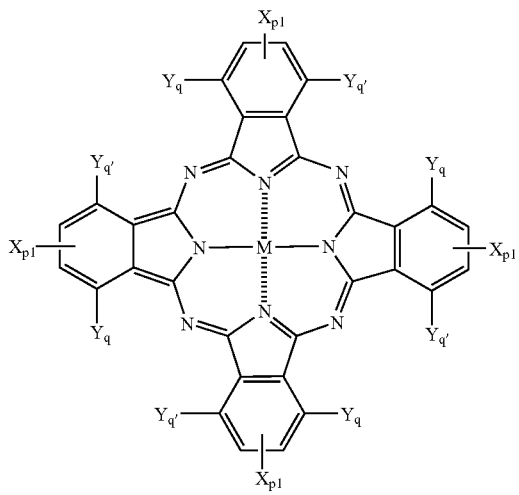

(X$_{p1}$'s each independently represent X$_{p1}$ or X$_{p2}$.)

The phthalocyanine dye represented by the general formula (C-I) can be synthesized according to the patent cited above. The phthalocyanine dye represented by the general formula (C-II) can be synthesized by the aforementioned method as well as the method disclosed in JP-A-2001-226275, JP-A-2001-96610, JP-A-2001-47013 and JP-A-2001-193638. The starting material, intermediate dye and synthesis route are not limited to those according to these methods.

The cyan ink composition comprises the phthalocyanine dye incorporated therein preferably in an amount of from 0.2% to 20% by weight, more preferably from 0.5% to 15% by weight.

The phthalocyanine dye to be used in the invention is substantially water-soluble. The term "substantially water-soluble" as used herein is meant to indicate that the dye can be dissolved in 20° C. water in an amount of not smaller than 2% by weight.

The ink composition for ink jet recording of the invention may comprise other cyan dyestuffs incorporated therein in combination with the aforementioned phthalocyanine dye (cyan dye).

Examples of cyan dyestuffs to be used in combination with the phthalocyanine dye include azomethine dyestuffs such as indoaniline dyestuff and indophenol dyestuff, polymethine dyestuffs such as cyanine dyestuff, oxonol dyestuff and melocyanine dyestuff, carbonium dyestuffs such as diphenylmethane dyestuff, triphenylmethane dyestuff and xanthene dyestuff, phthalocyanine dyestuffs other than the compound of the general formula (C-I) of the invention, anthraquinone dyestuffs, aryl or heterylazo dyestuffs having phenols, naphthols or anilines as coupling components, and indigo-thioindigo dyestuffs. These dyestuffs may assumes cyan only when chromophore is partly dissociated. In this case, the counter cation may be an inorganic cation such as alkaline metal ion and ammonium ion or an organic cation such as pyridinium ion and quaternary ammonium salt ion or may be contained in a polymer cation as a partial structure.

The phthalocyanine dye represented by the general formula (C-I) can be synthesized according to the patent cited above. The phthalocyanine dye represented by the general formula (C-II) can be synthesized by the method disclosed in JP-A-2001-226275, JP-A-2001-96610, JP-A-2001-47013 and JP-A-2001-193638. The starting material, intermediate dye and synthesis route are not limited to those according to these methods.

The various coloring agents are preferably incorporated in an amount of from not smaller than 0.2 parts by weight to not greater than 20 parts by weight based on 100 parts by weight of the cyan ink. In the invention, in the case where as inks having the same hue there are used two or more different inks, the concentration of one ink is preferably from 0.05 to 0.5 times that of the others.

The ink set of the invention may comprise the aforementioned specific yellow ink incorporated therein. Alternatively, other coloring materials may be properly used in combination with the aforementioned yellow dye to obtain a full-color image or adjust the colortone, thereby preparing black, cyan, magenta, yellow, red, green and blue inks of the invention which can be then combined to provide an ink set suitable for the formation of a color image. As coloring agents to be used in the preparation of other inks which form an ink set in combination with the yellow ink there may be used various dyestuffs (dye, pigment).

Examples of the dyestuffs which can be used in the ink for ink jet recording of the invention will be given below.

Examples of yellow dyestuffs include aryl or heterylazo dyestuffs having phenols, naphthols, anilines, pyrazolones, pyridones or closed-chain type active methylene compounds as coupling components, azomethine dyestuffs having closed-chain type active methylene compounds as coupling components, methine dyestuffs such as benzylidene dyestuff and monomethine oxonol dyestuff, and quinone-based dyestuffs such as naphthoquinone dyestuff and anthraquinone dyestuff. Other examples of yellow dyestuffs include quinophthalone dyestuff, nitro-nitroso dyestuff, acridine dyestuff, and acridinone dyestuff. These dyestuffs may assumes yellow only when chromophore is partly dissociated. In this case, the counter cation may be an inorganic cation such as alkaline metal ion and ammonium ion or an organic cation such as pyridinium ion and quaternary ammonium salt ion or maybe contained in a polymer cation as a partial structure.

Examples of magenta dyestuffs include aryl or heterylazo dyestuffs having phenols, naphthols or anilines as coupling components, azomethine dyestuffs having pyrazolones or pyrazolotriazoles as coupling components, methine dyestuffs such as arylidene dyestuff, styryl dyestuff, melocyanine dyestuff and oxonol dyestuff, carbonium dyestuffs such as diphenylmethane dyestuff, triphenylmethane dyestuff and xanthene dyestuff, quinone-based dyestuffs such as naphthoquinone, anthraquinone and anthrapyridone, and condensed polycyclic dyestuffs such as dioxazine dyestuff. These dyestuffs may assumes magenta only when chromophore is partly dissociated. In this case, the counter cation may be an inorganic cation such as alkaline metal ion and ammonium ion or an organic cation such as pyridinium ion and quaternary ammonium salt ion or may be contained in a polymer cation as a partial structure.

Examples of cyan dyestuff include azomethine dyestuffs such as indoaniline dyestuff and indophenol dyestuff, polymethine dyestuffs such as cyanine dyestuff, oxonol dyestuff and melocyanine dyestuff, carbonium dyestuffs such as diphenylmethane dyestuff, triphenylmethane dyestuff and xanthene dyestuff, phthalocyanine dyestuffs, anthraquinone dyestuffs, aryl or heterylazo dyestuffs having phenols, naphthols or anilines as coupling components, and indigo-thioindigo dyestuffs. These dyestuffs may assumes cyan only when chromophore is partly dissociated. In this case, the counter cation may be an inorganic cation such as alkaline metal ion and ammonium ion or an organic cation such as pyridinium ion and quaternary ammonium salt ion or may be contained in a polymer cation as a partial structure.

Alternatively, a black dye such as polyazo dye or a carbon black dispersion may be used.

In the invention, the dye, if it is oil-soluble, is preferably used in combination with a high boiling organic solvent. The boiling point of the high boiling organic solvent to be used in the invention is not lower than 150° C., preferably not lower than 170° C.

Examples of the high boiling organic solvent employable herein include phthalic acid esters (e.g., dibutyl phthalate, dioctyl phthalate, dicyclohexyl phthalate, di-2-ethylhexyl phthalate, decyl phthalate, bis(2,4-di-tert-amylphenyl) isophthalate, bis(1,1-diethylpropyl)phthalate), phosphoric or phosphonic acid esters (e.g., diphenyl phosphate, triphenyl phosphate, tricresyl phosphate, 2-ethylhexyl diphenyl phosphate, dioctyl butyl phosphate, tricyclohexyl phosphate, tri-2-ethylhexyl phosphate, tridodecyl phosphate, di-2-ethylhexyl phenyl phosphate), benzoic acid esters (e.g, 2-ethylhexyl benzoate, 2,4-dichlorobenzoate, dodecyl benzoate, 2-ethylhexyl-p-hydroxybenzoate), amides (e.g., N,N-diethyldodecaneamide, N,N-diethyllaurylamide), alcohols or phenols (e.g., isostearyl alcohol, 2,4-di-tert-amylphenol), aliphatic esters (e.g., dibutoxyethyl succinate, di-2-ethylhexyl succinate, 2-hexyldecyl tetradecanoate, tributyl citrate, diethyl azelate, isostearyl lactate, trioctyl citrate), aniline derivatives (e.g., N,N-dibutyl-2-butoxy-5-tert-octylaniline), chlorinated paraffins (e.g., paraffins having a chlorine content of from 10% to 80%), trimesic acid esters (e.g., tributyl trimesate), dodecyl benzene, diisopropylene naphthalene, phenols (e.g., 2,4-di-tert-amylphenol, 4-dodecyloxyphenol, 4-dodecyloxycarbonylphenol, 4-(4-dodecyloxy phenylsulfonyl)phenol), carboxylic acids (e.g., 2-(2,4-di-tert-amylphenoxybutyric acid, 2-ethoxyoctanedecanoic acid), and alkylphosphoric acids (e.g., di-2(ethylhexyl)phosphoric acid, dipheylphosphoric acid). As an auxiliary solvent there may be additionally used an organic solvent having a boiling point of from not lower than 30° C. to not higher than about 160° C. (e.g., ethyl acetate, butyl acetate, ethyl propionate, methyl ethyl ketone, cyclohexanone, 2-ethoxyethyl acetate, dimethylformamide). The high boiling organic solvent may be used in an amount of from 0 to 2.0 times, preferably from 0 to 1.0 times that of the coupler.

These high boiling organic solvents may be used singly or in admixture of two or more thereof (e.g., tricresyl phosphate and dibutyl phthalate, trioctyl phosphate and di(2-ethylhexyl) sebacate, dibutyl phthalate and poly(N-t-butylacrylamide)).

For examples of compounds other than the aforementioned high boiling organic solvents to be used in the invention and/or methods for the synthesis of these high boiling organic solvents, reference can be made U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321, 5,013,639, European Patents 276, 319A, 286,253A, 289,820A, 309,158A, 309,159A, 309, 160A, 509,311A, 510,576A, East German Patents 147,009, 157,147, 159,573, 225,240A, British Patent 2,091,124A, JP-A-48-47335, JP-A-50-26530, JP-A-51-25133, JP-A-51- 26036, JP-A-51-27921, JP-A-51-27922, JP-A-51-149028, JP-A-52-46816, JP-A-53-1520, JP-A-53-1521, JP-A-53-15127, JP-A-53-146622, JP-A-54-91325, JP-A-54-106228, JP-A-54-118246, JP-A-55-59464, JP-A-56-64333, JP-A-56-81836, JP-A-59-204041, JP-A-61-84641, JP-A-62-118345, JP-A-62-247364, JP-A-63-167357, JP-A-63-214744, JP-A-63-301941, JP-A-64-9452, JP-A-64-9454, JP-A-64-68745, JP-A-1-101543, JP-A-1-102454, JP-A-2-792, JP-A-2-4239, JP-A-2-43541, JP-A-4-29237, JP-A-4-30165, JP-A-4-232946, and JP-A-4-346338.

The aforementioned high boiling organic solvents are used in an amount of from 0.1 to 3.0 times, preferably from 0.5 to 1.0 times that of the dye by weight.

In the invention, the hydrophobic dye or the high boiling organic solvent or other additives, if they are hydrophobic, are used in the form of emulsion dispersion in an aqueous medium. During emulsion dispersion, a low boiling organic solvent may be used in some cases from the standpoint of emulsifiability. As such a low boiling organic solvent there may be used an organic solvent having a boiling point of from about 30° C. to 150° C. at atmospheric pressure. Preferred examples of the organic solvent employable herein include esters (e.g., ethyl acetate, butyl acetate, ethyl propionate, β-ethoxyethyl acetate, methyl cellosolve acetate), alcohols (e.g., isopropyl alcohol, n-butyl alcohol, secondary butyl alcohol), ketones (e.g., methyl isobutyl ketone, methyl ethyl ketone, cyclohexanone), amides (e.g., dimethylformamide, N-methylpyrrolidone), and ethers (e.g., tetrahydrofurane, dioxane). However, the invention is not limited to these organic solvents.

The emulsion dispersion is effected to disperse an oil phase having a dye dissolved in a high boiling organic solvent optionally mixed with a low boiling organic solvent in an aqueous phase mainly composed of water to make minute oil droplets of oil phase. During this procedure, additives such as surface active agent, wetting agent, dye stabilizer, emulsion stabilizer, preservative and antifungal agent described later may be added to either or both of the aqueous phase and the oil phase as necessary.

The emulsification is normally accomplished by adding the oil phase to the aqueous phase. Alternatively, a so-called phase inversion emulsification method involving the dropwise addition of an aqueous phase to an oil phase is preferably used.

The emulsion dispersion of the invention may be effected with various surface active agents. Preferred examples of the surface active agents employable herein include anionic surface active agents such as aliphatic acid salt, alkylsulfuric acid ester, alkylbenzenesulfonate, alkylnaphthalenesulfonate, dialkylsulfosuccinate, alkylphosphoric acid esters, naphthalenesulfonic acid-formalin condensate and polyoxyethylenealkylsulfuric acid ester, and nonionic surface active agents such as polyoxyethylenealkyl ether, polyoxyethylenealkylallyl ether, polyoxyethylenealiphatic acid ester, sorbitanaliphatic acid ester, polyoxyethylenesorbitanaliphatic acid ester, polyoxyethylenealkylanine, glycerinaliphatic acid ester and oxyethyleneoxypropylene block copolymer. Alternatively, SURFYNOLS (produced by Air Products & Chemicals Inc.), which are acetylene-based polyoxyethylene oxide surface active agents, are preferably used as well. Further, amine oxide-based amphoteric surface active agents such as N,N-dimethyl-N-alkylamine oxide may be used. Those listed as surface active agents in JP-A-59-157,636, pp. 37–38, Research Disclosure No. 308119 (1989), Japanese Patent Application No. 2001-11821, Japanese Patent Application No. 2001-11822, Japanese Patent Application No. 2001-80690, and Japanese Patent Application No. 2001-80659 may be used.

For the purpose of stabilizing the ink shortly after emulsification, the aforementioned surface active agents may be used in combination with a water-soluble polymer. As such a water-soluble polymer there may be preferably used a polyvinyl alcohol, polyvinyl pyrrolidone, polyethylene oxide, polyacrylic acid, polyacrylamide or copolymer thereof. Further, natural water-soluble polymers such as polysaccharides, casein and gelatin may be preferably used. For the purpose of stabilizing the dye dispersion, polyvinyls obtained by the polymerization of acrylic acid esters, methacrylic acid esters, vinyl esters, acrylamides, methacrylamides, olefins, styrenes, vinylethers or acrylonitriles, polyurethanes, polyesters, polyamides, polyureas, polycarbonates, etc., which are substantially insoluble in an aqueous medium, may be used. These polymers preferably have —$SO_3^-$ or —$COO^-$. In the case where these polymers substantially insoluble in an aqueous medium are used, they are preferably used in an amount of not greater than 20% by weight, preferably not greater than 10% by weight based on the amount of the high boiling organic solvent.

In the case where emulsion dispersion is effected to disperse the hydrophobic dye in the solvent to make an aqueous ink, a particularly important factor is control over the particle size of the aqueous ink. In order to enhance the color purity or density during the formation of an image by ink ejection, it is essential to reduce the average particle size. The volume-average particle diameter of the aqueous ink is preferably from not smaller than 5 nm to not greater than 100 nm.

It was also made obvious that the presence of coarse particles has an extremely great effect on the printing properties. In other words, coarse particles clog the head nozzle. Even if coarse particles don't go so far as to clog the head nozzle, the ink cannot be ejected or can be deviated when ejected, giving a serious effect on the printing properties. In order to prevent this trouble, it is important to keep the number of particles having a diameter of not smaller than 5 μm and not smaller than 1 μm in the resulting ink to 10 or less and 1,000 or less, respectively.

The removal of these coarse particles can be accomplished by any known method such as centrifugal separation method and precision filtration method. The separation step may be effected shortly after emulsion dispersion or shortly before the filling of the emulsion dispersion comprising various additives such as wetting agent and surface active agent in the ink cartridge.

As an effective unit for reducing the average particle diameter of particles and eliminating coarse particles there may be used a mechanical emulsifier.

As such an emulsifier there may be used any known device such as simple stirrer, impeller type agitator, in-line agitator, mill type agitator (e.g., colloid mill) and ultrasonic agitator. The use of a high pressure homogenizer is particularly preferred.

For the details of the mechanism of high pressure homogenizer, reference can be made to U.S. Pat. No. 4,533,254, JP-A-6-47264, etc. Examples of commercially available high pressure homogenizers include Gaulin homogenizer (produced by A. P. V GAULLN INC.), microfluidizer (produced by MICROFLUIDEX INC.) and altimizer (produced by SUGINO MACHINE LIMITED).

In recent years, a high pressure homogenizer having a mechanism for atomizing a material in a ultrahigh pressure jet stream as disclosed in U.S. Pat. No. 5,720,551 is particularly useful in the emulsion dispersion of the invention. An example of the emulsifier using a ultrahigh jet stream is De BEE2000 (produced by BEE INTERNATIONAL LTD.).

The pressure at which emulsion is carried out by a high pressure emulsion disperser is not lower than 500 bar ($5 \times 10^7$ Pa), preferably not lower than 600 bar ($6 \times 10^7$ Pa), more preferably not lower than 1,800 bar ($1.8 \times 10^8$ Pa).

For example, the combined use of two or more emulsifiers as in a method involving the emulsification by an agitated emulsifier followed by the passage through a high pressure homogenizer is particularly preferred. Alternatively, a method is preferably used which comprises effecting the emulsion of the material using such an emulsifier, adding additives such as wetting agent and surface active agent, and then passing the ink composition again through the high pressure homogenizer before being filled in the cartridge.

In the case where the dye composition comprises a low boiling organic solvent incorporated therein in addition to the high boiling organic solvent, it is preferred to remove the low boiling organic solvent from the standpoint of emulsion stability and safety/hygiene. The removal of the low boiling solvent can be accomplished by any known method such as evaporation method, vacuum evaporation method and ultrafiltration method depending on the solvent to be removed. The step of removing the low boiling organic solvent is preferably effected as rapidly as possible shortly after emulsification.

Examples of the water-soluble organic solvent employable herein include alcohols (e.g., methanol, ethanol, propanol, isopropanol, butanol, isobutanol, sec-butanol, t-butanol, pentanol, hexanol, cyclohexanol, benzyl alcohol), polyvalent alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycolderivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), amines (e.g., ethanolamine, diethanolamine, triethanolamine, N-methyldiethanolamine, N-ethyldiethanolamine, morpholine, N-ethylmorpholine, ethylene diamine, diethylene triamine, triethylene tetramine, polyethyleneimine, tetramethylpropylenediamine), and other polar solvents (e.g., formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone). Two or more of the water-miscible organic solvents may be used in combination.

The dispersion of colored particles obtained in the invention, if used as an ink for ink jet recording, may comprise properly selected additives incorporated therein in a proper amount such as drying inhibitor for preventing the clogging of the ejection nozzle with dried ink, penetration accelerator for helping the ink to penetrate in the page, ultraviolet absorber, oxidation inhibitor, viscosity adjustor, surface tension adjustor, dispersant, dispersion stabilizer, antifungal agent, rust preventive, pH adjustor, anti-foaming agent and chelating agent.

As the drying inhibitor there is preferably used a water-soluble organic solvent having a lower vapor pressure than water. Specific examples of the water-soluble organic solvent include polyvalent alcohols such as ethylene glycol, propylene glycol, diethylene glycol, polyethylene glycol, thiodiglycol, dithiodigycol, 2-methyl-1,3-propanediol, 1,2,6-hexanetriol, acetylene glycol derivative, glycerin and trimethylolpropane, lower alkylethers of polyvalent alcohol such as ethylene glycolmonomethyl (or ethyl) ether, diethylene glycol monomethyl (or ethyl) ether and triethylene glycol monoethyl (or butyl) ether, heterocyclic compounds such as 2-pyrrolidone, N-methyl-2-pyrrolidone, 1,3-dimethyl-2-imidazolidinone and N-ethylmorpholine, sulfur-containing compounds such as sulfolane, dimethylsulfoxide and 3-sulfolene, polyfunctional compounds such as diacetone alcohol and diethanolamine, and urea derivatives. Preferred among these water-soluble organic solvents are polyvalent alcohols such as glycerin and diethylene glycol. These drying inhibitors may be used singly or in combination of two or more thereof. These drying inhibitors are preferably incorporated in the ink in an amount of from 10% to 50% by weight.

Examples of the penetration accelerator employable herein include alcohols such as ethanol, isopropanol, butanol, di(tri) ethylene glycol monobutyl ether and 1,2-hexanediol, sodium laurylsulfate, sodium oleate, and non-ionic surface active agents. These penetration accelerators can exert a sufficient effect when incorporated in the ink in an amount of from 10% to 30% by weight. These penetration accelerators are preferably used in an amount such that no printing run or print through occurs.

Examples of the ultraviolet absorber to be used to enhance the preservability of the image include benzotriazole-based compounds as disclosed in JP-A-58-185677, JP-A-61-190537, JP-A-2-782, JP-A-5-197075 and JP-A-9-34057, benzophenone-based compounds as disclosed in JP-A-46-2784, JP-A-5-194483 and U.S. Pat. No. 3,214,463, cinnamic acid-based compounds as disclosed in JP-B-48-30492, JP-A-56-21141 and JP-A-10-88106, triazine-based compounds as disclosed in JP-A-4-298503, JP-A-8-53427, JP-A-8-239368, JP-A-10-182621 and JP-T-1-543210, compounds as disclosed in Research Disclosure No. 24239, and compounds which absorb ultraviolet rays to emit fluorescence, i.e., so-called fluorescent brighteners, such as stilbene-based and benzoxazole-based compounds.

As the oxidation inhibitor to be used to enhance the image preservability there may be used any of various organic and metal complex-based discoloration inhibitors. Examples of the organic discoloration inhibitors include hydroquinones, alkoxyphenols, dialkoxyphenols, phenols, anilines, amines, indanes, chromans, alkoxyanilines, and heterocyclic compounds. Examples of the metal complex-based discoloration inhibitors include nickel complex, and zinc complex. Specific examples of these oxidation inhibitors include compounds listed in the patents cited in Research Disclosure No. 18716, Articles VI-I and J, Research Disclosure No. 15162, Research Disclosure No. 18716, left column, page 650, Research Disclosure No. 36544, page 527, Research Disclosure No. 307105, page 872, and Research Disclosure No. 15162, and compounds included in the general formula and examples of representative compounds listed in JP-A-62-215272, pp. 127–137.

Examples of the antifungal agent include sodium dehydroacetate, sodium benzoate, sodium pyridinethione-1-oxide, ethyl p-hydroxybenzoate, 1,2-benzoisothiazoline-3-one, and salts thereof. These antifungal agents are preferably incorporated in the ink in an amount of from 0.02% to 5.00% by weight. For the details of these antifungal agents, reference can be made to "Bokin Bobizai Jiten (Dictionary of Anti-bacterial and Antifungal Agents")", compiled by Dictionary Compilation Committee of The Society for Antibacterial and Antifungal Agents, Japan.

Examples of the rust preventive employable herein include acidic sulfites, sodium thiosulfate, ammonium thioglycolate, diisopropylammonium nitrite, pentaerthyritol tetranitrate, dicyclohexylammonium nitrite, and benzotriazole. These rust preventives are preferably incorporated in the ink in an amount of from 0.02% to 5.00% by weight.

The pH adjustor is preferably used from the standpoint of pH adjustment, provision of dispersion stability, etc. The pH adjustor is preferably added to make pH 4.5 to 10.0, more preferably pH 6 to 10.0. Examples of the pH adjustor employable herein include basic pH adjustors such as organic base and inorganic alkali, and acidic pH adjustors such as organic acid and inorganic acid.

Examples of the organic base include triethanolamine, diethanolamine, N-methyldiethanolamine, and diethanolamine. Examples of the inorganic alkali include hydroxide of alkali metal (e.g., sodium hydroxide, lithium hydroxide, potassium hydroxide), carbonate of alkali metal (e.g., sodium carbonate, sodium hydrogencarbonate), and ammonia.

Examples of the organic acid include acetic acid, propionic acid, trifluoroacetic acid, and alkylsulfonic acid. Examples of the inorganic acid include hydrochloric acid, sulfuric acid, and phosphoric acid.

Examples of the surface tension adjustor employable herein include nonionic, cationic and anionic surface active agents. Examples of the anionic surface active agent include aliphatic acid salts, alkylsulfuric acid esters, alkylbenzenesulfonates, alkylnapthalenesulfonates, dialkylsulfosuccinates, alkylphosphoric acid esters, naphthalenesulfonic acid-formalin condensates, and polyoxyethylenealkylsulfuric acid esters. Examples of the nonionic surface active agent include polyoxyethylenealkyl ethers, polyoxyethylenealkylallyl ethers, polyoxyethylenealiphatic acid esters, sorbitanaliphatic acid esters, polyoxyethylenesorbitanaliphatic acid esters, polyoxyethylenealkylamines, glycerinaliphatic acid esters, and oxyethyleneoxypropylene block copolymers. SURFYNOLS (produced by Air Products & Chemicals Inc.), which are acetylene-based polyoxyethylene oxide surface active agents, are preferably used as well. Further, amine oxide-based amphoteric surface active agents such as N,N-dimethyl-N-alkylamine oxide are preferred. Moreover, those listed as surface active agents in JP-A-59-157,636, pp. 37–38, and Research Disclosure No. 308119, 1989, may be used.

The surface tension, regardless of which it is static or dynamic, of the ink to be used in the invention is preferably from 20 to not greater than 50 mN/m, more preferably from 20 to not greater than 40 mN/m at 25° C. When the surface tension of the ink exceeds 50 mN/m, the resulting ink exhibits a drastic deterioration in print quality such as ejection stability and resistance to running and whisker during color mixing. On the contrary, when the surface tension of the ink falls below 20 mN/m, the resulting ink can be attached to hard surface when ejected, causing defective printing.

The ink of the invention exhibits a viscosity of from 1 to 20 mPa·s, more preferably from 2 to 15 mPa·s, particularly from 2 to 10 mPa·s at 25° C. When the viscosity of the ink exceeds 30 mPa·s, the resulting recorded image can be fixed only at a reduced rate. Further, the resulting ink exhibits a deteriorated ejectability. On the contrary, when the viscosity of the ink falls below 1 mPa·s, the resulting recorded image runs and thus exhibits a reduced quality.

The adjustment of viscosity can be arbitrarily carried out by controlling the added amount of the ink solvent. Examples of the ink solvent employable herein include glycerin, diethylene glycol, triethanolamine, 2-pyrrolidone, diethylene glycol monobutyl ether, and triethylene glycol monobutyl ether.

Further, a viscosity adjustor nay be used. Examples of the viscosity adjustor employable herein include celluloses, water-soluble polymers such as polyvinyl alcohol, and nonionic surface active agents. For the details of these viscosity adjustors, reference can be made to "Nendo Chousei Gijutsu (Technology for Viscosity Adjustment)", Gijutsu Joho Kyoukai, Article 9, 1999, and "Inku Jetto Purintayou Kemikaruzu (98 zouho)—Zairyou no Kaihatsu Doko/Tenbo Chousa (chemicals for Ink Jet Printer (98 enlarged edition)—Research on Trend and View of Development of Materials)", CMC, pp. 162–174, 1997.

In the invention, a dispersion of polymer particles may be used. For the details of the dispersion of polymer particles, reference can be made to Japanese Patent Application No. 2001-63780.

In the invention, as the dispersant and dispersion stabilizer there may be used the aforementioned various cationic, anionic and nonionic surface active agents as necessary. As the anti-forming agent there may be used a fluorine-based or silicone-based compound or a chelating agent such as EDTA as necessary.

The ink jet recording method to which the ink of the invention is applied is not limited. The ink of the invention may be used in any known recording method such as electrostatic control method which utilizes electrostatic attraction to eject ink, drop-on-demand method (pressure pulse method) utilizing vibrational pressure of piezoelectric element, acoustic ink jet method which comprises converting electrical signal to acoustic beam with which the ink is irradiated to produce a radiation pressure that is utilized to eject the ink and thermal ink jet (bubble jet) method which comprises heating the ink to form bubbles that raise the pressure to eject the ink.

Examples of the ink jet recording method include a method which comprises ejecting many portions of an ink having a low concentration called photoink in a small volume, a method which comprises using a plurality of inks having substantially the same hue but different densities to improve the image quality, and a method involving the use of a colorless transparent ink.

As the ink jet recording method and ink cartridge suitable for use in the invention there may be used any known ink jet recording method and ink cartridge. For the details of the ink jet recording method and ink cartridge, reference can be made to JF-A-2000-198958.

The ink set and ink cartridge of the invention can be used to form an image on a known recording material, i.e., ordinary paper, resin-coated paper such as paper dedicated for ink jet recording disclosed in JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, 7P-A-10-217597 and JP-A-10-337947, film, electrophotographic paper, cloth, glass, metal, porcelain, etc.

The recording paper and recording film which is a reflection type medium to be used in the ink jet recording method using the ink of the invention will be described hereinafter.

As the support in the recording paper or recording film there may be used one obtained by processing a chemical pulp such as LBKP and NBKP, a mechanical pulp such as GP, PGW, RMP, TMP, CTMP, CMP and CGP, used paper pulp such as DIP or the like, optionally mixed with known additives such as pigment, binder, sizing agent, fixing agent, cationic agent and paper strength improver, through various paper machines such as foundrinier paper machine and cylinder paper machine. As the support there may be used either a synthetic paper or plastic film sheet besides these support materials. The thickness of the support is preferably from 10 µm to 250 µm. The basis weight of the support is preferably from 10 to 250 g/m$^2$. An ink-receiving layer and a back coat layer may be provided on the support directly or with a size press or anchor coat layer of starch, polyvinyl alcohol or the like interposed therebetween to prepare material for receiving the ink of the invention. The support may be further subjected to leveling using a calendering machine such as machine calender, TG calender and soft calender. As the support there is preferably used a paper or plastic film laminated with a polyolefin (e.g., polyethylene, polystyrene, polybutene, copolymer thereof) or polyethylene terephthalate on both sides thereof. The polyolefin preferably comprises a white pigment (e.g., titanium oxide, zinc oxide) or a tinting dye (e.g., cobalt blue, ultramarine, neodymium oxide) incorporated therein.

The ink-receiving layer to be provided on the support comprises a pigment or aqueous binder incorporated therein. As such a pigment there is preferably used a white pigment. Examples of the white pigment employable herein include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfate and zinc carbonate, and organic pigments such as styrene-based pigment, acrylic pigment, urea resin and melamine resin. As the white pigment to be incorporated in the ink-receiving layer there is preferably used a porous inorganic pigment, particularly a synthetic amorphous silica having a large pore area, etc. As the synthetic amorphous silica there may be also used anhydrous silicate obtained by dry method or hydrous silicate obtained by wet method, particularly hydrous silicate. These pigments may be used in combination of two or more thereof.

Examples of the aqueous binder to be incorporated in the ink-receiving layer include water-soluble polymers such as polyvinyl alcohol, silanol-modified polyvinyl alcohol, starch, cationated starch, casein, gelatin, carboxymethyl cellulose, hydroxyethyl cellulose, polyvinyl pyrrolidone, polyalkylene oxide and polyalkylene oxide derivative, and water-dispersible polymers such as styrene butadiene latex and acryl emulsion. These aqueous binders may be used singly or in combination of two or more thereof. In the invention, particularly preferred among these aqueous binders are polyvinyl alcohol and silanol modified polyvinyl alcohol from the standpoint of adhesion to pigment and exfoliation resistance of ink-receiving layer.

The ink-receiving layer may comprise a mordant, a waterproofing agent, a light-resistance improver, a surface active agent, a film hardener and other additives incorporated therein besides the pigments and aqueous binders.

The mordant to be incorporated in the ink-receiving layer is preferably passivated. To this end, a polymer mordant is preferably used.

For the details of the polymer mordant, reference can be made to JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JF-A-60-235134, JP-A-1-

161236, U.S. Pat. Nos. 2,484,430, 2,548,564, 3,148,061, 3,309,690, 4,115,124, 4,124,386, 4,193,800, 4,273,853, 4,282,305 and 4,450,224. An image-receiving material containing a polymer mordant disclosed in JP-A-1-161236, pp. 212 to 215. The use of the polymer mordant disclosed in the above cited patent makes it possible to obtain an image having an excellent quality and hence improve the light-resistance of the image.

The waterproofing agent can be used to render the image waterproof. As such a waterproofing agent there is preferably used a cationic resin in particular. Examples of such a cationic resin include polyamide polyamine epichlorohydrin, polyethylenimine, polyaminesulfone, dimethyl diallyl ammonium chloride polymer, cation polyacrylamide, and colloidal silica. Particularly preferred among these cationic resins is polyamide polyamine epichlorohydrin. The content of such a cation resin is preferably from 1% to 15% by weight, particularly from 3% to 10% by weight based on the total solid content of the ink-receiving layer.

Examples of the light-resistance improver employable herein include zinc sulfate, zinc oxide, hindered amine-based oxidation inhibitor, benzophenone-based ultraviolet absorber, and benzotriazole-based ultraviolet absorber. Particularly preferred among these light-resistance improvers is zinc sulfate.

The surface active agent acts as a coating aid, releasability improver, slipperiness improver or antistat. For the details of the surface active agent, reference can be made to JP-A-62-173463 and JP-A-62-183457.

An organic fluoro-compounds may be used instead of the surface active agent. The organic fluoro-compound is preferably hydrophobic. Examples of the organic fluoro-compound include fluorine-based surface active agents, oil-based fluorine compounds (e.g., fluorine-based oil), and solid fluorine-based compound resins (e.g., tetrafluoroethylene resin). For the details of the organic fluoro-compound, reference can be made to JP-B-57-9053 (8th to 17th columns), JP-A-61-20994, and JP-A-62-135826.

As the film hardener there maybe used any of materials disclosed in JP-A-1-161236, page 222.

Other examples of additives to be incorporated in the ink-receiving layer include pigment dispersants, thickening agents, antifoaming agents, dyes, fluorescent brighteners, preservatives, pH adjustors, matting agents, and film hardeners. There may be provided one or two ink-receiving layers.

The recording paper and recording film may comprise a back coat layer provided thereon. Examples of the components which can be incorporated in the back coat layer include white pigments, aqueous binders, and other components. Examples of the white pigments to be incorporated in the back coat layer include inorganic white pigments such as light calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, hydrated halloysite, magnesium carbonate and magnesium hydroxide, and organic pigments such as styrene-based plastic pigment, acrylic plastic pigment, polyethylene, microcapsule, urea resin and melamine resin.

Examples of the aqueous binder to be incorporated in the back coat layer include water-soluble polymers such as styrene/maleate copolymer, styrene/acrylate copolymer, polyvinyl alcohol, silanol-modified polyvinyl alcohol, starch, cationated starch, casein, gelatin, carboxymethyl cellulose, hydroxyethyl cellulose and polyvinylpyrrolidone, and water-dispersible polymers such as styrenebutadiene latex and acryl emulsion. Examples of other components to be incorporated in the back coat layer include antifoaming agents, foaming inhibitors, dyes, fluorescent brightening agents, preservatives, and waterproofing agents.

The layers (including back layer) constituting the ink jet recording paper and film may comprise a polymer latex incorporated therein. The polymer latex is used for the purpose of improving physical properties of film, e.g., stabilizing dimensions inhibiting curling, adhesion and film cracking. For the details of the polymer latex, reference can be made to JP-A-62-245258, JP-A-62-1316648, and JP-A-62-110066. The incorporation of a polymer latex having a glass transition temperature as low as not higher than 40° C. in a layer containing a mordant makes it possible to prevent the cracking or curling of the layer. The incorporation of a polymer latex having a high glass transition temperature, too, in the back layer makes it possible to prevent the curling of the back layer.

The image formed on the aforementioned recording paper or film with the ink set or ink cartridge of the invention exhibits a high fastness and thus can provide an extremely excellent ink-recorded matter.

EXAMPLE

The invention will be further described in the following examples, but the invention is not construed as being limited thereto.

Example 1

To the following components was added deionized water to make 1 l. The mixture was then heated to a temperature of from 30° C. to 40° C. with stirring for 1 hour. Thereafter, the solution was adjusted to pH 9 with a 10 mol/l potassium hydroxide, and then filtered through a microfilter having an average pore diameter of 0.25 μm under reduced pressure to prepare a yellow ink solution.

| | |
|---|---:|
| Dye (T-3) | 14.7 g |
| Dye (T-4) | 14.0 g |
| Diethylene glycol | 85 g |
| Urea | — |
| Glycerin | 150 g |
| Triethylene glycol monobutyl ether | 180 g |
| Diethylene glycol monobutyl ether | — |
| 2-Pyrrolidone | — |
| Surfynol 465 (produced by Air Products & Chemicals Inc.) | — |
| Surfynol STG | 8.5 g |
| Triethanolamine | 0.9 g |
| Benzotriazole | 0.06 g |
| PROXEL XL2 | 1.5 g |

Subsequently, to these components were added dyes and additives to prepare a light cyan, a cyan ink, a light magenta ink, a magenta ink and a black ink from which ink sets 101 having the concentration set forth in Table A were then prepared.

TABLE A
|  | Light cyan | Cyan | Light magenta | Magenta | Yellow | Black |
|---|---|---|---|---|---|---|
| Dye (g/l) | T-2 (8.75) | T-2 (35.0) | T-1 (7.5) | T-1 (30.0) | T-3 (14.7) | T-5 (20.0) |
|  |  |  |  |  | T-4 (14.0) | T-6 (20.0) |
|  |  |  |  |  |  | T-7 (20.0) |
|  |  |  |  |  |  | T-3 (20.0) |
| Diethylene glycol (g/l) | 200 | 130 | 150 | 110 | 85 | 20 |
| Urea | — | — | 37 | 46 | — | — |
| Glycerin (g/l) | 150 | 180 | 130 | 160 | 150 | 120 |
| Triethy-lene glycol monobutyl ether (g/l) | 130 | 140 | 130 | 140 | 180 | — |
| Diethylene glycol monobutyl ether (g/l) | — | — | — | — | — | 230 |
| 2-Pyrrolidone (g/l) | — | — | — | — | — | 81 |
| Surfynol 465 (g/l) | 9.8 | 10.5 | 10.5 | 10.0 | — | — |
| Surfynol STG (g/l) | — | — | — | — | 8.5 | 9.8 |
| Triethanol amine (g/l) | 6.0 | 6.3 | 6.9 | 7.0 | 0.9 | 17.9 |
| Benzotriazole (g/l) | 0.08 | 0.08 | 0.08 | 0.07 | 0.06 | 0.06 |
| Proxel XL2 (g/l) | 1.1 | 1.2 | 3.5 | 1.5 | 1.5 | 1.1 |
T-1
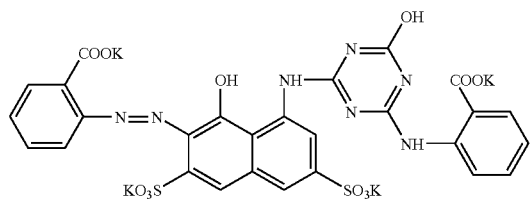
T-2
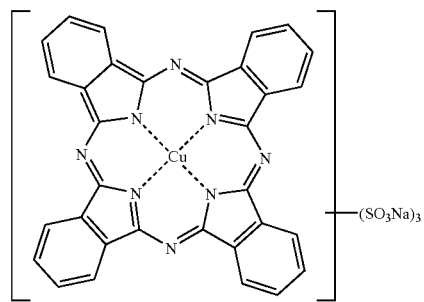
T-3
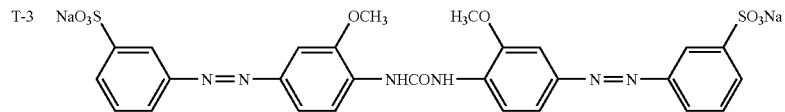
T-4
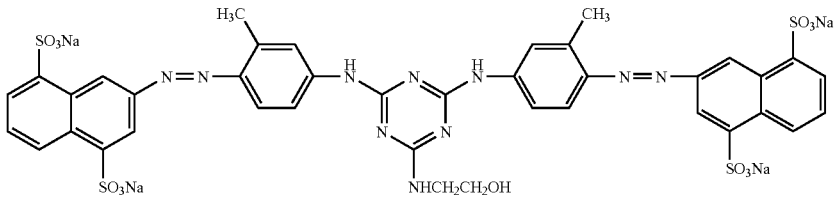
T-5
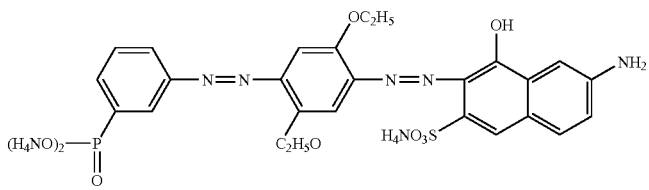

TABLE A-continued

|  | Light cyan | Cyan | Light magenta | Magenta | Yellow | Black |
|---|---|---|---|---|---|---|

T-6: [chemical structure with H₄NOOC groups, naphthalene, azo linkages, OH, NH₂, H₄NO₃S]

T-7: [chemical structure with H₄NOOC, OC₂H₅, C₂H₅O, azo linkages, OH, NH₂, H₄NO₃S]

Subsequently, ink sets 102 to 105 were prepared in the same manner as in the ink set 101 except that the formulation of the dyes used were changed as set forth in Table B. In the case where the dyes were changed, they were used in equimolecular amounts and their concentration was adjusted such that the transmission density of the various ink solutions was the same as in the ink set 101. In the case where a plurality of dyes were used in combination, they were used in equimolecular amounts.

TABLE B

| Ink set | Light cyan | Cyan | Light magenta | Magenta | Yellow | Remarks |
|---|---|---|---|---|---|---|
| 101 | T-2 | T-2 | T-1 | T-1 | T-3 T-4 | Comparative |
| 102 | 144 | 144 | a-36 | a-36 | YI-50 | Inventive |
| 103 | 145 | 144 | a-36 | a-36 | YT-51 | Inventive |
| 104 | 144 | 137 142 | b-5 c-3 | d-1 e-4 | YI-50 YI-51 | Inventive |
| 105 | T-2 144 | T-2 144 | T-1 a-36 | T-1 a-36 | T-3 YI-58 | Inventive |

Subsequently, the ink sets 101 to 105 were each packed in the cartridge of a Type PM770C ink jet printer (produced by EPSON Co., LTD.) by which an image was then printed on a PM photographic paper for inkjet printer produced by EPSON CO., LTD.). Then, the following properties were evaluated.

1) For the evaluation of printing properties (1), the cartridge was mounted on the printer. The ejection of ink through all the nozzles was then confirmed. An image was then printed on 50 sheets of A4 size paper. The printer matter was then evaluated for disturbance in print.
   A: No disturbance in print between the beginning and the end of printing;
   B: Some disturbance in print
   C: Disturbance in print between the beginning and the end of printing
2) For the evaluation of printing properties (2), the cartridge was allowed to stand at 60° C. for 10 days. The printed matter was then evaluated for disturbance in print in the same manner as in the printing properties (1).
3) For the evaluation of dryability, the images which had just been formed were touched with a finger. The finger was then visually observed for stain.
4) For the evaluation of running of fine line, fine line patterns of yellow, magenta, cyan and black were printed. These fine line patterns were then visually evaluated according to the criterion (1). For the evaluation of running of black line, the magenta ink was solid-printed before the printing of fine black line. The print was then observed for running due to contact of the two colors according to the criterion (2).
5) For the evaluation of waterproofness, the image obtained was dipped in deionized water for 5 seconds. The image was then visually observed for running.
6) For the evaluation of image preservability, a black-printed sample was prepared. The sample thus prepared was then evaluated for the following properties.

For the evaluation of light-fastness, the print which had just been formed was measured for chromaticity (a*1, b*1) and brightness (L1) using SPM100-II(produced by Gretag Inc.), irradiated with light from a xenon lamp (850,000 lux) using a weatherometer produced by Atlas Inc. for 7 days, and then again measured for chromaticity (a*1, b*1) and brightness (L2). The color difference (ΔE) between before and after irradiation was then determined and evaluated as follows:

$$\Delta E = \{(a*1-a*2)^2 + (b*1-b*2)^2 + (L1-L2)^2\}^{1/2}$$

The color difference was evaluated at three points of reflection density, i.e., 1, 1.3 and 1.6. Those showing a color difference of not greater than 5 at any of these reflection density points were ranked A. Those showing a color difference of not smaller than 5 at two of these reflection density points were ranked B. Those showing a color difference of not smaller than 5 at any of these reflection density points were ranked C.

For the evaluation of heat fastness, the color difference between before and after storage at 80° C. for 6 days was determined in the sane manner as in the evaluation of light-fastness. The percent dye remaining was evaluated at three points of reflection density, i.e., 1, 1.3 and 1.6. Those showing a color difference of not greater than 3 at any of these reflection density points were ranked A. Those showing a color difference of not smaller than 3 at two of these reflection density points were ranked B. Those showing a color difference of not smaller than 5 at any of these reflection density points were ranked C.

For the evaluation of gas fastness, the color difference between before and after storage in ozone having a concentration of 0.5 ppm for 7 days was determined in the same manner as in the evaluation of light-fastness. The percent dye remaining was evaluated at three points of reflection density, i.e., 1, 1.3 and 1.6. Those showing a color difference of not greater than 10 at any of these reflection density points were ranked A. Those showing a color difference of not smaller than 10 at two of these reflection density points were ranked B. Those showing a color difference of not smaller than 10 at any of these reflection density points were ranked C. The results are set forth in Tables C and D.

TABLE C

| Ink set | Printing properties (1) | Printing properties (2) | Dryability | Running of fine line (1) | Running of fine line (2) | Water-proofness |
|---------|---|---|---|---|---|---|
| 101 | A | A | G (good) | G | G | G |
| 102 | A | A | G | G | G | G |
| 103 | A | A | G | G | G | G |
| 104 | A | A | G | G | G | G |
| 105 | A | A | G | G | G | G |

TABLE D

| Ink set | Light-fastness | Heat fastness | Gas fastness |
|---------|---|---|---|
| 101 | B | C | C |
| 102 | A | A | B |
| 103 | A | A | A |
| 104 | A | A | B |
| 105 | A | A | B |

As can be seen in these results, the use of the ink composition of the invention makes it possible to prevent the clogging of the nozzle and hence provide an excellent ejection stability as well as an excellent waterproofness and fastness. It can be also seen that the ink composition of the invention doesn't run when printed in fine line to advantage.

Even when the image-receiving paper to be used in the invention was changed to a color photographic paper (photographic finish) for ink jet recording produced by Fuji Photo Film Co., Ltd. or PR101 (produced by Canon Inc.), the same results as mentioned above were obtained. The same effects were obtained also when Surfynol 465 was replaced by or used in combination with a surface active agent as disclosed in Japanese Patent Application No. 2001-80090, Japanese Patent Application No. 2001-11821 or Japanese Patent Application No. 2001-11822.

Example 2

The same inks as prepared in Example 1 were each packed in a Type BJ-F850 ink jet printer (produced by Canon Inc.) by which an image was then printed on a color ink jet paper (photographic finish) produced by Fuji Photo Film Co., Ltd. These printed matters were each then evaluated in the same manner as in Example 1. As a result, the sane results as obtained in Example 1 were obtained. The same effects were obtained also when the image-receiving paper was changed to a PM photographic paper produced by EPSON CO., LTD. or PR101 (produced by Canon Inc.).

Example 3

An ink set 201 was prepared in the same manner as in Example 1 except that the yellow, light magenta, magenta, light cyan and cyan inks were changed to oil-soluble dye-containing inks prepared in the following manner.

8 g of Dye (A-1) and 19.2 g of a surface active agent (Emal 20C, produced by Kao Corp.) were dissolved in a mixture of 6 g of a high boiling organic solvent (S-1), 10 g of a high boiling organic solvent (S-2), 1.9 g of an additive (W-1) and 50 ml of ethyl acetate at 70° C. To this solution was then added 500 ml of deionized water with stirring by a magnetic stirrer to prepare a oil-in-water type coarse dispersion.

Subsequently, the coarse dispersion was passed through a microfluidizer (produced by MICROFLUIDEX INC.) at 60 MPa five times to undergo fine division. The resulting emulsion was then subjected to desolvation using a rotary evaporator until there occurred no odor of ethyl acetate.

To the fine emulsion of hydrophobic dye thus obtained were then added 140 g of diethylene glycol, 64 g of glycerin and additives such as urea. To the emulsion was then added deionized water to make 1 l. The emulsion was then adjusted to pH 9 with 10 mol/l KOH to prepare a light magenta ink having a concentration set forth in Table E. The emulsion dispersion ink thus obtained was then measured for volume-average particle size using a Type UPA microtrack (produced by NIKKISO CO., LTD.). The result was 40 nm.

An ink set 201 was prepared by changing the kind and amount of dyes used, the amount of high boiling solvents used and the kind and amount of various additives used as set forth in Table E. Table E indicates the formulation of the final composition obtained after the evaporation of solvent.

TABLE E

|  | Light magenta | Magenta | Light cyan | Cyan | Yellow | Black |
|---|---|---|---|---|---|---|
| Dye (g/l) | A-1 (5.00) | A-1 (20.0) | A-2 (11.2) | A-2 (44.6)) | A-3 (27.2) | A-1 (10.0) A-2 (18.6) A-3 (13.6) |
| High boiling organic solvent (g/l) | S-1 (3.75) S-2 (6.25) | 14.52 25.52 | 8.1 14.3 | 32.4 57.1 | 19.7 34.7 | 30.6 53.8 |
| Additive W-1 (g/l) | 0.625 | 2.5 | 1.2 | 4.8 | 3.4 | 5.2 |
| Emal 20c (g/l) | 12.0 | 40 | 15.5 | 62 | 50 | 72.4 |
| Diethylene glycol (g/l) | 87.5 | 87.5 | 87.5 | 87.5 | 87.5 | 87.5 |
| Glycerin (g/l) | 40.0 | 40.0 | 40.0 | 46.0 | 46.0 | 46.0 |
| Surfynol 465 (g/l) | 10.0 | 10.0 | 10.0 | 10.0 | 10.0 | 10.0 |
| Triethanol-amine (g/l) | 7.5 | 7.5 | 7.5 | 7.5 | 7.5 | 7.5 |

TABLE E-continued
|  | Light magenta | Magenta | Light cyan | Cyan | Yellow | Black |
|---|---|---|---|---|---|---|
| Benzo-triazole (g/l) | 0.075 | 0.075 | 0.075 | 0.075 | 0.075 | 0.075 |
| Proxel XL2 (g/l) | 2.5 | 2.5 | 2.5 | 2.5 | 2.5 | 2.5 |
| Deionized water to make 1 litter | | | | | | |
| Volume-average particle size | 40 nm | 43 | 31 | 41 | 45 | 60 |
S-1
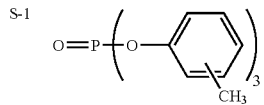
S-2
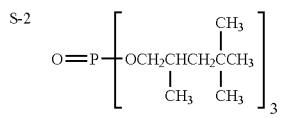
W-1
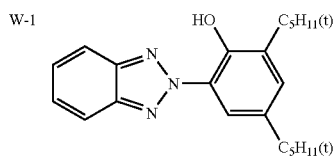
A-1
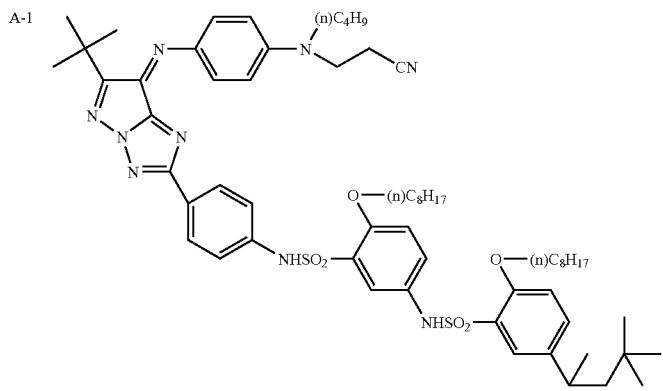
A-2
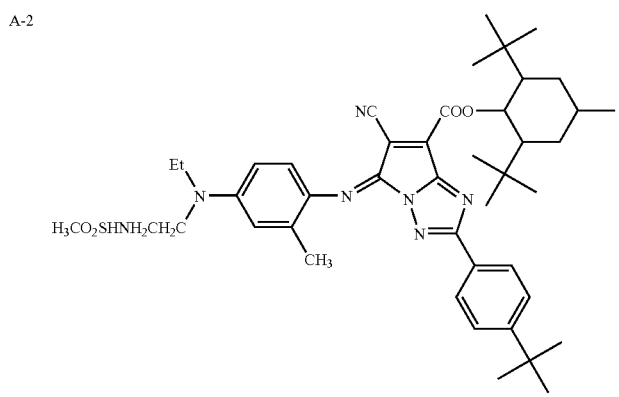

TABLE E-continued

| | Light magenta | Magenta | Light cyan | Cyan | Yellow | Black |
|---|---|---|---|---|---|---|

A-3: [chemical structure showing a compound with COCCONH, Cl, CH₃, NHCOCHO, C₂H₅, Et, N, CH₂CH₂NHSO₂CH₃ groups]

Ink sets 202 to 205 were prepared in the same manner as in the ink set 201 except that the kind of dyes to be incorporated in the various inks were changed as set forth in Table F. In the case where the dyes were changed, they were used in equimolecular amounts and their concentration was adjusted such that the transmission density of the various ink solutions was the same as in the ink set 201. In the case where a plurality of dyes were used in combination, they were used in equimolecular amounts.

TABLE F

| Ink set | Light cyan | Cyan | Light magenta | Magenta | Yellow | Remarks |
|---|---|---|---|---|---|---|
| 201 | A-2 | A-2 | A-1 | A-1 | A-3 | Comparative |
| 202 | (103) | (103) | a-24 | a-24 | YI-57 | Inventive |
| 203 | (103) | (109) | a-24 | a-24 | YI-104 | Inventive |
| 204 | 144 | 137 | b-3 | d-3 | YI-105 | Inventive |
|  |  | 142 | c-5 | e-1 | YI-56 |  |
| 205 | A-2 | A-2 | A-1 | A-1 | A-3 | Inventive |
|  | (103) | (103) | (a-24) | a-24 | YI-57 |  |

Subsequently, the ink sets 201 to 208 were each packed in the cartridge of a Type PM670C ink jet printer (produced by EPSON Co., LTD.) by which an image was then printed on a color ink jet paper photographic finish) produced by Fuji Photo Film Co., Ltd. Then, the following properties were evaluated.

1) For the evaluation of printing properties (1), the cartridge was mounted on the printer. The ejection of ink through all the nozzles was then confirmed. An image was then printed on 30 sheets of A4 size paper. The printer matter was then evaluated for disturbance in print.

A: No disturbance in print between the beginning and the end of printing;

B: Some disturbance in print

C: Disturbance in print between the beginning and the end of printing

2) For the evaluation of printing properties (2), the cartridge was allowed to stand at 60° C. for 2 days. The printed matter was then evaluated for disturbance in print in the same manner as in the printing properties (1).

3) For the evaluation of dryability, the images which had just been formed were touched with a finger. The finger was then visually observed for stain.

4) For the evaluation of running of fine line, fine line patterns of yellow, magenta, cyan and black were printed. These fine line patterns were then visually evaluated according to the criterion (1). For the evaluation of running of black line, the magenta ink was solid-printed before the printing of fine black line. The print was then observed for running due to contact of the two colors according to the criterion (2).

5) For the evaluation of waterproofness, the image obtained was dipped in deionized water for 5 seconds. The image was then visually observed for running.

6) For the evaluation of image preservability, a black-printed sample was prepared. The sample thus prepared was then evaluated for the following properties.

For the evaluation of light-fastness, the print which had just been formed was measured for chromaticity ($a^*1$, $b^*1$) and brightness (L1) using a chromaticity meter produced by Gretag Inc., irradiated with light from a xenon lamp (850,000 lux) using a weatherometer produced by Atlas Inc. for 10 days, and then again measured for chromaticity ($a^*1$, $b^*1$) and brightness (L2). The color difference (ΔE) between before and after irradiation was then determined and evaluated as follows:

$$\Delta E = \{(a^*1-a^*2)^2+(b^*1-b^*2)^2+(L1-L2)^2\}^{1/2}$$

The color difference was evaluated at three points of reflection density, i.e., 1, 1.3 and 1.6. Those showing a color difference of not greater than 5 at any of these reflection density points were ranked A. Those showing a color difference of not smaller than 5 at two of these reflection density points were ranked A. Those showing a color difference of not smaller than 5 at any of these reflection density points were ranked C.

For the evaluation of heat fastness, the color difference between before and after storage at 80° C. for 4 days was determined in the same manner as in the evaluation of light-fastness. The percent dye remaining was evaluated at three points of reflection density, i.e., 1, 1.3 and 1.6. Those showing a color difference of not greater than 5 at any of these reflection density points were ranked A. Those showing a color difference of not smaller than 5 at two of these reflection density points were ranked B. Those showing a color difference of not smaller than 5 at any of these reflection density points were ranked C.

For the evaluation of gas fastness, the color difference between before and after storage in ozone having a concentration of 1.0 ppm for 2 days was determined in the same manner as in the evaluation of light-fastness. The percent dye remaining was evaluated at three points of reflection density, i.e., 1, 1.3 and 1.6. Those showing a color difference of not greater than 10 at any of these reflection density points were ranked A. Those showing a color difference of not smaller than 10 at two of these reflection density points were ranked B. Those showing a color difference of not smaller than 10 at any of these reflection density points were ranked C. The results are set forth in Tables G and H.

TABLE G

| Ink set | Printing properties (1) | Printing properties (2) | Dryability | Running of fine line (1) | Running of fine line (2) | Water-proof-ness |
|---|---|---|---|---|---|---|
| 201 | A | A | G (good) | G | G | G |
| 202 | A | A | G | G | G | G |
| 203 | A | A | G | G | G | G |
| 204 | A | A | G | G | G | G |
| 205 | A | A | G | G | G | G |

TABLE H

| Ink set | Light-fastness | Heat fastness | Gas fastness |
|---|---|---|---|
| 201 | B | C | C |
| 202 | A | A | B |
| 203 | A | A | A |
| 204 | A | A | B |
| 205 | B | B | B |

As can be seen in these results, the use of the ink composition of the invention makes it possible to prevent the clogging of the nozzle and hence provide an excellent ejection stability as well as an excellent waterproofness. Referring to fastness, the ink composition of the invention shows little chromaticity change at black area. It can be also seen that the ink composition of the invention doesn't run when printed in fine line to advantage.

Even when the image-receiving paper to be used in the invention was changed to a PM photographic paper produced by EPSON CO., LTD. or PR101 (produced by Canon Inc.), the same results as mentioned above were obtained.

As can be seen in these results, the use of the ink composition of the invention makes it possible to prevent the clogging of the nozzle and hence provide an excellent ejection stability as well as an excellent waterproofness and fastness. It can be also seen that the ink composition of the invention doesn't run when printed in fine line to advantage.

Even when the image-receiving paper to be used in the invention was changed to a PM photographic paper produced by EPSON CO., LTD. or PR101 (produced by Canon Inc.), the same results as mentioned above were obtained. The same effects were obtained also when Surfynol 465 was replaced by or used in combination with a surface active agent as disclosed in Japanese Patent Application No. 2001-80090, Japanese Patent Application No. 2001-11821 or Japanese Patent Application No. 2001-11822.

Example 4

The same inks as prepared in Example 1 were each packed in a Type BJ-F850 ink jet printer (produced by Canon Inc.) by which an image was then printed on a color ink jet paper (photographic finish) produced by Fuji Photo Film Co., Ltd. These printed matters were each then evaluated in the same manner as in Example 3. As a result, the same results as obtained in Example 1 were obtained. The same effects were obtained also when the image-receiving paper was changed to a PM photographic paper produced by EPSON CO., LTD. or PR101 (produced by Canon Inc.).

The use of the ink set of the invention makes it possible to provide excellence in handleability, odor, safety, etc., and a high ejection stability and give an image having an excellent hue, light-resistance and waterproofness free of defectives of image quality such as running of fine line and improve the image preservability under severe conditions. Accordingly, the ink set and ink cartridge of the invention and the printer having them mounted therein can maintain an excellent ejection stability over an extended period of time even after aged under severe conditions. The resulting printed matters, too, exhibit a high fastness.

The entire disclosure of each and every foreign patent application: Japanese Patent Applications No. 2002-242238, from which the benefit of foreign priority has been claimed in the present application is incorporated herein by reference, as if fully set forth.

What is claimed is:

1. An ink set comprising a plurality of inks different in hues, wherein the plurality of inks includes a yellow ink containing a coloring agent that is a dye represented by the following general formula (1), $$A-N=N-B \quad (1)$$

wherein A and B each independently represent a heterocyclic group which may be substituted, the dye having:

a $\lambda$max of from 390 nm to 470 nm;

an I($\lambda$max+70 nm)/I($\lambda$max) ratio of not greater than 0.4, in which I($\lambda$max) is the absorbance at $\lambda$max and I($\lambda$max+70 nm) is the absorbance at ($\lambda$max+70 nm); and a forced fading rate constant of not greater than $5.0 \times 10^{-2}$ [hour$^{-1}$], in which the forced fading rate constant is decided by dissolving and/or dispersing the dye in an aqueous medium to form an ink composition for ink jet recording, printing the ink composition on a reflection type medium, thereafter measuring a reflection density through a Status A filter, specifying one point having a reflection density (DB) in an yellow region of 0.90 to 1.10 as an initial density of the ink, forcedly fading the printed matter by use of an ozone fading tester that can regularly generate 5 ppm of ozone, and determining the time taken until the reflection density reaches 80% of the initial density.

2. The ink set as described in claim 1, wherein the dye has the $\lambda$max of from 390 nm to 470 nm and the I($\lambda$max+70 nm)/I($\lambda$max) ratio of not greater than 0.2.

3. The ink set as described in claim 1, wherein the dye has an oxidation potential of higher than 1.0 V (vs SCE).

4. The ink set described in claim 1, which further comprises at least a coloring agent represented by the following general formula (M-I) as the magenta ink:

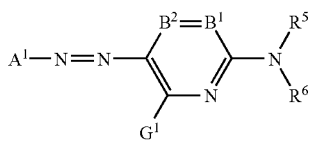

(M-I)

wherein $A^1$ represents a residue of a 5-membered heterocyclic group; $B^1$ and $B^2$ each represent a nitrogen atom, —$CR^1$= or $CR^2$=, and when one of $B^1$ and $B^2$ represents a nitrogen atom, the other represents —$CR^1$= or —$CR^2$=; $R^5$ and $R^6$ each independently represents a hydrogen atom, an aliphatic group, an aromatic group, a heterocyclic group, an acyl group, an alkoxycarbonyl group, an aryloxycarbonyl group, a carbamoyl group, an alkyl- or arylsulfonyl group or a sulfamoyl group, which may further have a substituent group; $G^1$, $R^1$ and $R^2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxyl group, an aryloxy group, a heterocyclic oxy group, a silyloxy group, an acyloxy group, a carbamoyloxy group, an alkoxycarbonyloxy group, an aryl-oxycarbonyloxy group, an unsubstituted amino group, an alkylamino group, an arylamino group, a hetercyclic amino group, acylamino group, a ureido group, a sulfamoylamino group, an alkoxycarbonylamino group, an aryloxycarbonylamino group, an alkyl- or arylsulfonylamino group, a heterocyclic sulfonylamino group, a nitro group, an alkyl- or arylthio group, an alkyl- or arylsulfonyl group, a heterocyclic sulfonyl group, an alkyl- or arylsulfinyl group, a heterocyclic sulfinyl group, a sulfamoyl group, a sulfo group or a heterocyclic thio group, which may be further substituted; and $R^1$ and $R^5$, or $R^5$ and $R^6$ may combine with each other to form a 5- or 6-membered ring.

5. The ink set described in claim 1 which further comprises a coloring agent represented by the following general formula (C-I) as the cyan ink:

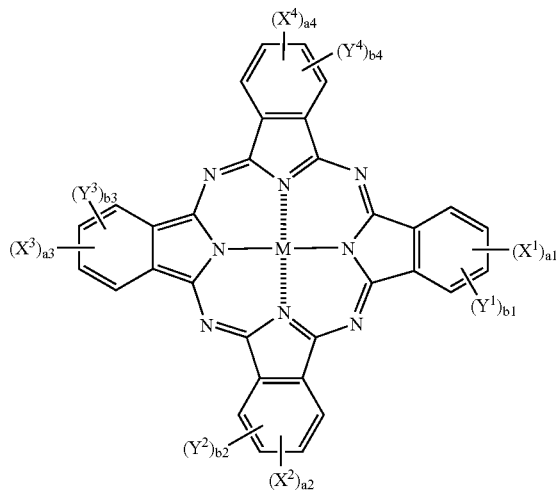

(C-I)

wherein $X^1$, $X^2$, $X^3$ and $X^4$ each independently represent —SO—$Z^1$, —$SO_2Z^1$, —$SO_2NR^{21}R^{22}$, —$CONR^{21}R^{22}$ or —$CO_2R^{21}$ in which $Z^1$ represents a substituted or unsubstituted alkyl, cycloalkyl, alkenyl, aralkyl, aryl or heterocyclic group; and $R^{21}$ and $R^{22}$ each independently represent a hydrogen atom or a substituted or unsubstituted alkyl, cycloalkyl, alkenyl, aralkyl, aryl or heterocyclic group; $Y^1$, $Y^2$, $Y^3$ and $Y^4$ each independently represent a monovalent substituent; a1 to a4 and b1 to b4 each independently represent an integer of from 0 to 4 indicating the number of substituents $X^1$ to $X^4$ and $Y^1$ to $Y^4$, with the proviso that a1 to a4 are not 0 at the same time and when a1 to a4 and b1 to b4 each represent an integer of not smaller than 2, the plurality of $X^1$'s to $X^4$'s and $Y^1$'s to $Y^4$'s may be the same or different; and M represents a hydrogen atom or a metal atom, or oxide, hydroxide or halide thereof.

6. The ink set as described in claim 4, wherein the magenta ink includes a set of two or more inks different in ink concentration, and the ink concentration of one magenta ink is 0.05 to 0.5 times that of the other magenta ink.

7. The ink set as described in claim 5, wherein the cyan ink includes a set of two or more inks different in ink concentration, and the ink concentration of one cyan ink is 0.05 to 0.5 times that of the other magenta ink.

8. A color ink cartridge comprising at least a yellow ink, wherein the yellow ink includes the coloring agent described in claim 1.

9. The ink cartridge described in claim 8, which further comprises: a coloring agent represented by the following general formula (M-I) as the magenta ink; and a coloring agent represented by the following general formula (C-I) as the cyan ink:

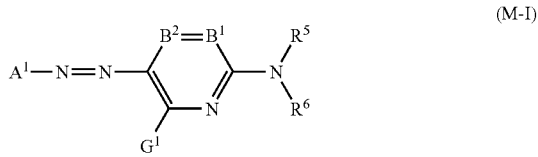

(M-I)

wherein $A^1$ represents a residue of a 5-membered heterocyclic group; $B^1$ and $B^2$ each represent a nitrogen atom, —$CR^1$= or —$CR^2$=, and when one of $B^1$ and $B^2$ represents a nitrogen atom, the other represents —$CR^1$= or —$CR^2$=; $R^5$ and $R^6$ each independently represents a hydrogen atom, an aliphatic group, an aromatic group, a heterocyclic group, an acyl group, an alkoxycarbonyl group, an aryloxycarbonyl group, a carbamoyl group, an alkyl- or arylsulfonyl group or a sulfamoyl group, which may further have a substituent group; $G^1$, $R^1$ and $R^2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxyl group, an aryloxy group, a heterocyclic oxy group, a silyloxy group, an acyloxy group, a carbamoyloxy group, an alkoxycarbonyloxy group, an aryl-oxycarbonyloxy group, an unsubstituted amino group, an alkylamino group, an arylamino group, a heterocyclic amino group, an acylamino group, a ureido group, a sulfamoylamino group, an alkoxycarbonylamino group, an aryloxycarbonylamino group, an alkyl- or arylsulfonylamino group, a heterocyclic sulfonylamino group, a nitro group, an alkyl- or arylthio group, an alkyl- or arylsulfonyl group, a heterocyclic sulfonyl group, an alkyl- or arylsulfinyl group, a heterocyclic sulfinyl group, a sulfamoyl group, a sulfo group or a heterocyclic thio group, which may be further substituted; and $R^1$ and $R^5$, or $R^5$ and $R^6$ may combine with each other to form a 5- or 6-membered ring,

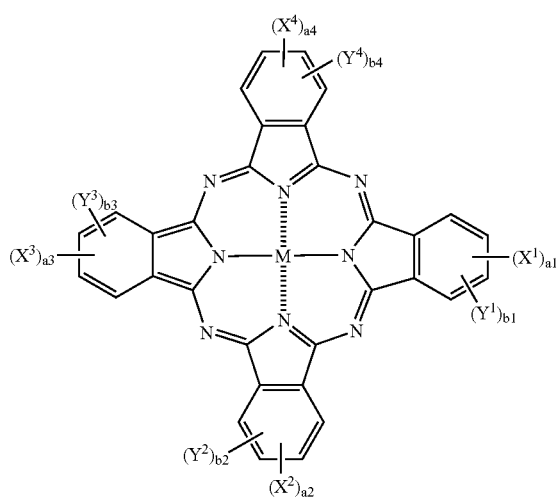

(C-I)

wherein $X^1$, $X^2$, $X^3$ and $X^4$ each independently represent —SO—$Z^1$, —SO$_2Z^1$, —SO$_2$NR$^{21}$R$^{22}$, —CONR$^{21}$R$^{22}$ or —CO$_2$R$^{21}$ in which $Z^1$ represents a substituted or unsubstituted alkyl, cycloalkyl, alkenyl, aralkyl, aryl or heterocyclic group; and R$^{21}$ and R$^{22}$ each independently represent a hydrogen atom or a substituted or unsubstituted alkyl, cycloalkyl, alkenyl, aralkyl, aryl or heterocyclic group; $Y^1$, $Y^2$, $Y^3$ and $Y^4$ each independently represent a monovalent substituent; a1 to a4 and b1 to b4 each independently represent an integer of from 0 to 4 indicating the number of substituents $X^1$ to $X^4$ and $Y^1$ to $Y^4$, with the proviso that a1 to a4 are not 0 at the same time and when a1 to a4 and b1 to b4 each represent an integer of not smaller than 2, the plurality of $X^1$'s to $X^4$'s and $Y^1$'s to $Y^4$'s maybe the same or different; and M represents a hydrogen atom or a metal atom, or oxide, hydroxide or halide thereof.

10. An ink jet printer comprising the ink set as described in claim 1.

11. An image recording method which comprises forming an ink jet image by inkjet printing with the ink set described in claim 1 to conduct color printing.

* * * * *